United States Patent
Robertson

[15] 3,700,379
[45] Oct. 24, 1972

[54] MOTOR DRIVE POSITION MOVEMENT PROFILE CALIBRATION

[72] Inventor: James D. Robertson, Pittsburgh, Pa.
[73] Assignee: Westinghouse Electric Corporation, Pittsburgh, Pa.
[22] Filed: June 14, 1971
[21] Appl. No.: 152,787

[52] U.S. Cl. ............................. 444/1, 318/561, 72/6
[51] Int. Cl. ........ B21b 37/12, G06f 9/00, H02p 3/00
[58] Field of Search ............ 318/7; 235/151.1; 444/1

[56] References Cited

UNITED STATES PATENTS 2,066,872  1/1937  Adams et al. ............ 318/7 X
3,574,280  4/1971  Smith, Jr. ..................... 72/8

Primary Examiner—Eugene G. Botz
Attorney—F. H. Henson et al.

[57] ABSTRACT

A slowdown profile calibration method and apparatus for a position regulated motor drive system is disclosed, including a programmed digital computer as the position controlling component of such a system that is calibrated to optimize the operation of said motor drive system in regard to distance error points and corresponding to a defined operational speed pattern relative to those distance error points.

25 Claims, 30 Drawing Figures

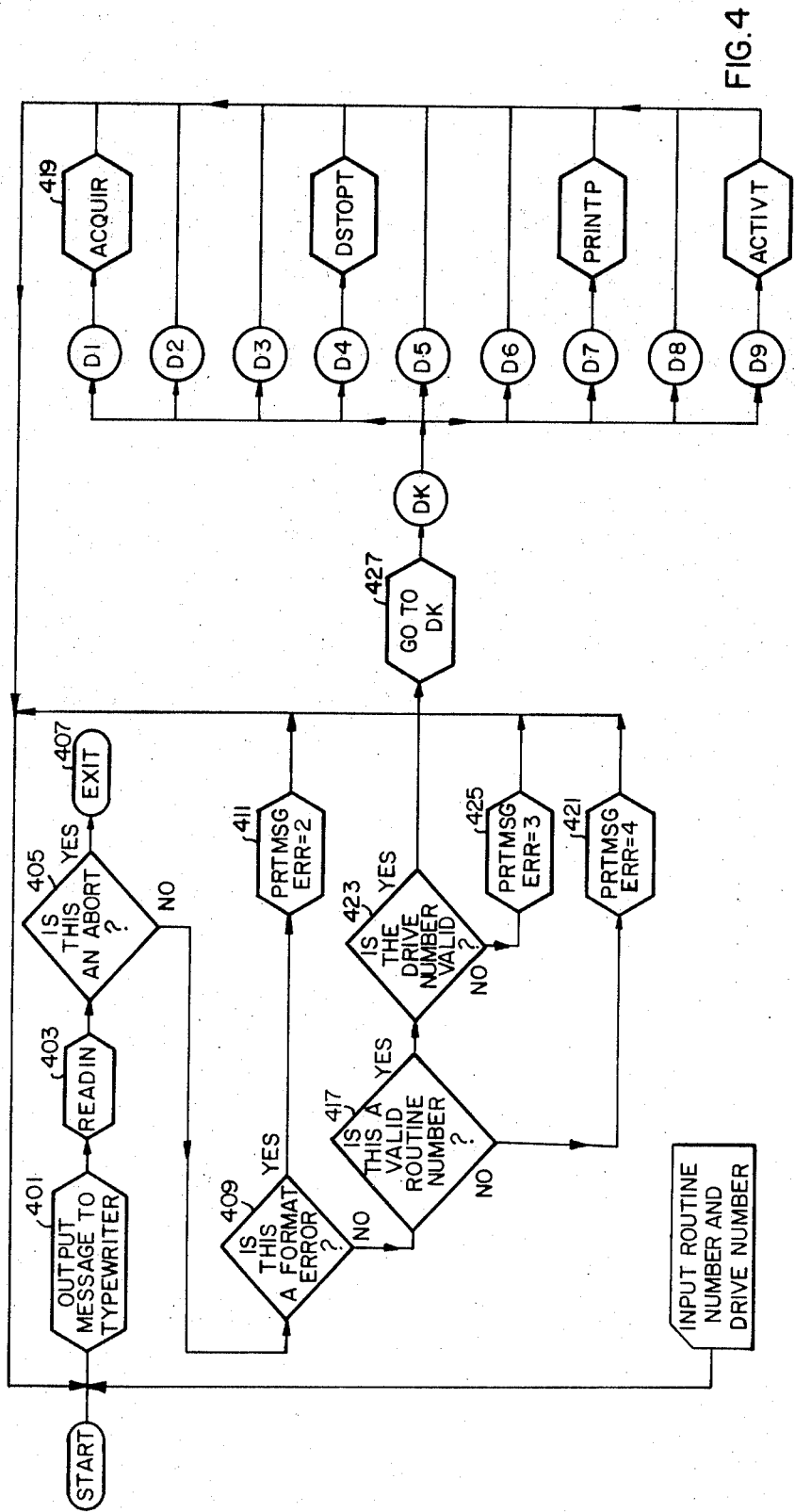

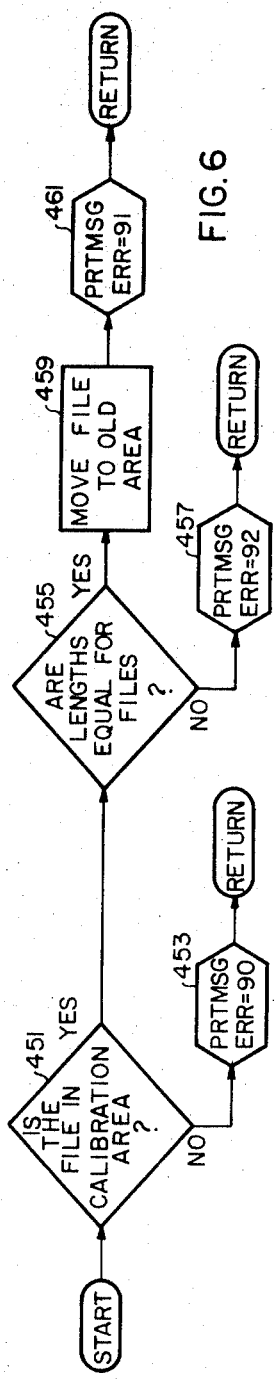
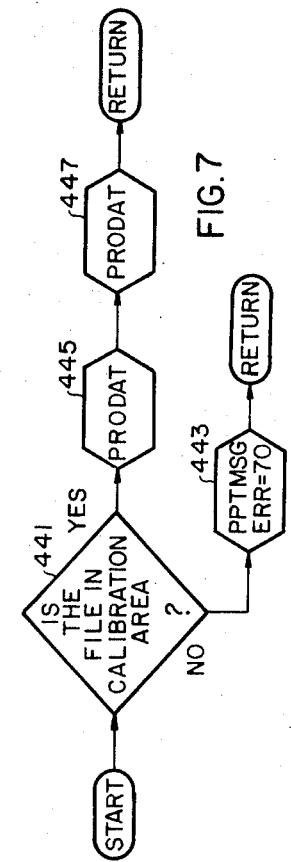
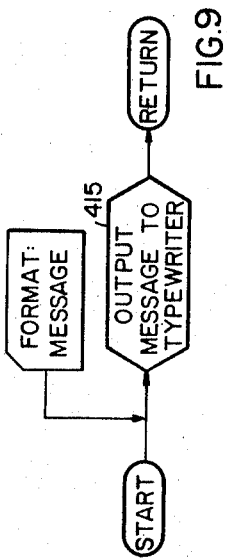
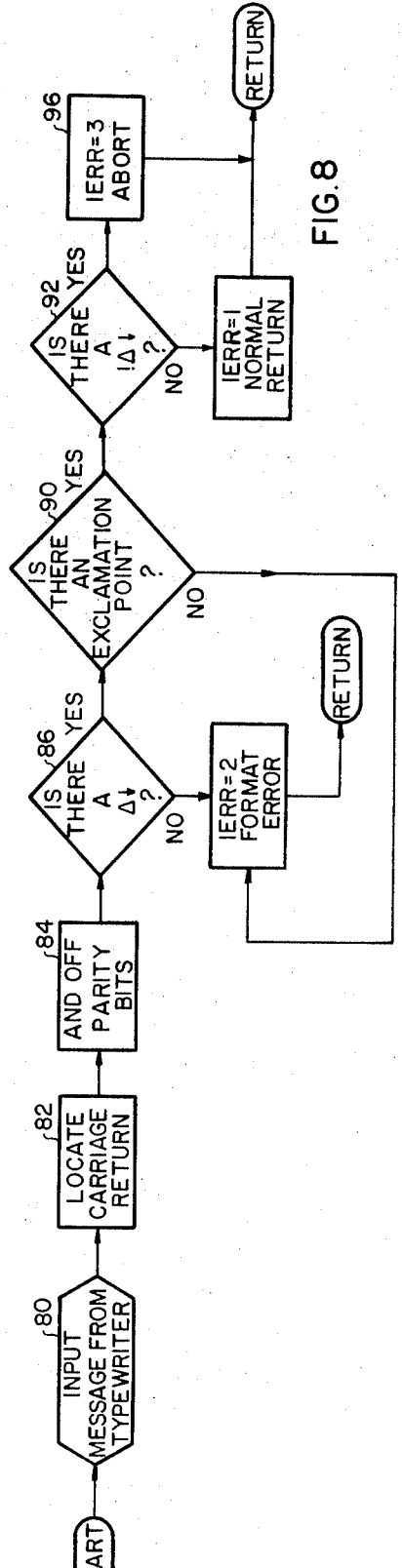

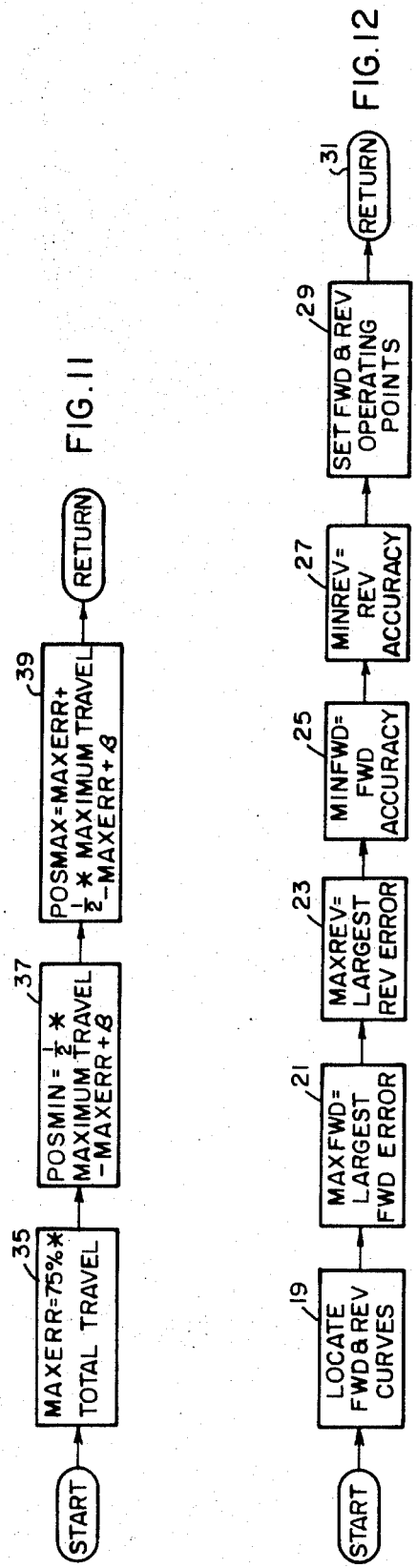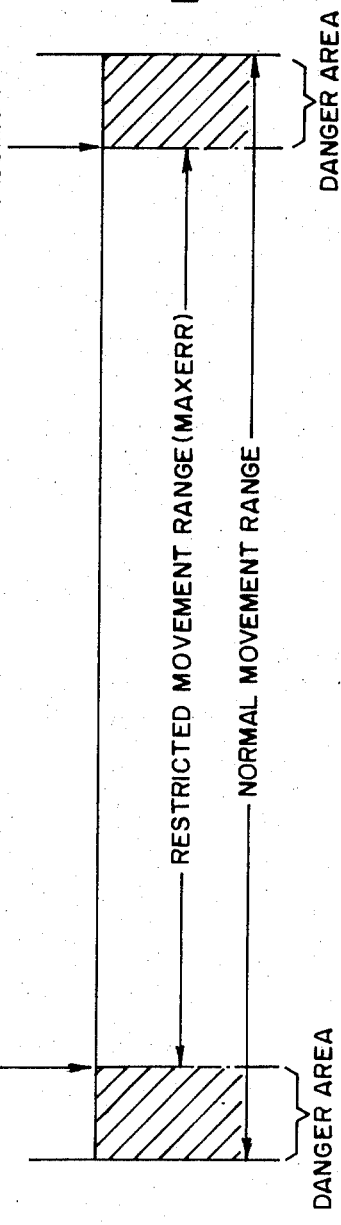
FIG. 11
FIG. 12
FIG. 16

1

MOTOR DRIVE POSITION MOVEMENT PROFILE CALIBRATION

BACKGROUND OF THE INVENTION

It is known by persons skilled in this particular art that a digital computer control system can include a central integrated process control or set up processor operative with at least one software sequentially stepped instruction program, which is entered into and stored within the storage memory unit of the computer, and associated input and output equipment such as generally described in a published article entitled "Understanding Digital Computer Process Control" by B. H. Murphy, which appeared in Automation Magazine for January 1965 at pages 71 to 76, and as generally described in a published article entitled "Small Control Computers—A New Concept" by F. G. Willard which appeared in the Westinghouse Engineer for November 1964 at pages 174 to 179. Two other published articles of interest here in regard to providing a background understanding of the programming of a process control computer should be noted; one article was published in the January 1965 Westinghouse Engineer at pages 13 to 19 by Paul E. Lego, and the other article was published in the 1966 Iron and Steel Engineer Yearbook at pages 328 to 334, by J. S. Deliyannides and A. H. Green.

Each such computer control system is typically associated with predetermined input systems, which can include an input system that scans process signals representing the status of various process operating conditions, a conventional analog input system which scans and converts process analog signals and operator controlled and other input devices and systems which could include paper tape, teletypewriter and dial input apparatus. Various kinds of information are entered into the computer control system through information input devices, including detected process operational signals, hardware oriented programs and control programs for the programming system and so forth. The input system interfaces the computer control system with the controlled process through the medium of measured or detected signals. To effect desired output control actions, control devices are operated directly by means of an output or by means of analog signals derived from the output system through a digital to analog converter. One such control action could output from the computer control system the desired speed control signal for controlling the operation of the speed regulator operative with the drive motor in the screwdown motor drive for each stand of a rolling mill operative in accordance with the teachings of the present invention. A suitable output display can be provided for operation with the computer control system in order to keep a human operator generally informed about the controlled process operation and in order to signal that operator regarding an event or condition relative to any particular happening which may require some action on his part.

When a given rolling mill stand is first assembled and made ready to begin the thickness reduction of workpieces passed between the rolls of that stand, it is desired to calibrate the slowdown profile curve, such as illustrated by the data stored in TABLE THREE, to compensate for operational factors of the position regulated screwdown motor drive system such as inertia, friction, response of speed regulator and response times of any associated programmed digital control computer. It may later become desirable to again calibrate the provided slowdown profile curve in relation to subsequent wear of mechanism parts, such as bearings, screws and so forth, as well as changed lubrication and friction conditions.

SUMMARY OF THE INVENTION

The position regulated motor drive system slowdown profile calibration operation in accordance with the present invention can be operative as the normal day-to-day recalibration or as a technique for optimizing the correlation of selected distance error points to correspond with defined speed points for controlling the operation of a given position regulated motor drive system, such as the screwdown motor drive of a rolling mill stand, when no workpiece is present between the rolls. The optimization is accomplished relative to a predetermined data file for the particular motor drive system to be calibrated by modifying the forward and reverse slowdown profile curves of that data file so that the desired accuracy band is stored in the last error point and the desired travel movements are stored throughout the remainder of the profile in predetermined locations respectively.

When a given distance error point, corresponding to a defined speed point, is being calibrated, the motor drive system is positioned so that a theoretical position error exists which is equivalent to the present error point minus one. Thusly, for a given distance error point S to be calibrated, the present error point S is made equivalent for the purpose of this calibration to the previous calibrated error point (S–1). The motor drive is then positioned relative to the present distance error point, and each time an overshoot occurs the present error point is corrected by a first factor corresponding to a predetermined portion such as three-fourths of the resulting position overshoot or undershoot plus a second factor of one encoder bit increment for stability. After no overshoot or undershoot occurs, a predetermined number, such as five, of consecutive positioning attempts are completed to make certain that no position overshoot or undershoot occurs, and thereafter the minimum or optimum distance calibration is considered to be found relative to this particular defined speed point. This calibration operation is continued until all the desired position error points for each slowdown curve are calibrated in both the up movement direction and the down movement direction for the motor drive system to be calibrated.

BRIEF DESCRIPTION OF THE DRAWINGS, TABLES AND PROGRAM LISTINGS

FIG. 4 shows an illustrative functional flow chart of the operator's function initiation routine program LOADER in accordance with PROGRAM LISTING ONE;

FIG. 5 shows an illustrative functional flow chart of the data file transfer to calibration area routine program ACQUIR in accordance with PROGRAM LISTING TWO;

FIG. 6 shows an illustrative functional flow chart of the data file transfer from calibration area routine program ACTIVT in accordance with PROGRAM LISTING THREE;

FIG. 7 shows an illustrative functional flow chart of the slowdown curve printout routine program PRINTP in accordance with PROGRAM LISTING FOUR;

FIG. 8 shows an illustrative functional flow chart of the read in operator input routine program READIN called by the distance optimization program and in accordance with PROGRAM LISTING FIVE;

FIG. 9 shows an illustrative functional flow chart of the message output routine program PRTMSG in accordance with PROGRAM LISTING SIX;

FIG. 11 shows an illustrative functional flow chart of the allowable travel determination routine program TRAVEL called by the distance optimization program and in accordance with PROGRAM LISTING EIGHT;

FIG. 12 shows an illustrative functional flow chart of the profile data location routine program PRODAT called by the distance optimization program and in accordance with PROGRAM LISTING NINE;

FIG. 16 illustrates the restricted movement range operative with the TRAVEL program;

TABLE ONE at the end of the specification illustrates the initial distance error points for which it is desired to calibrate a typical motor drive system in relation to the operating speed of the motor for each of said distance error points.

TABLE TWO at the end of the specification illustrates the operator defined motor speed points corresponding to the initial distance error points shown in TABLE ONE.

TABLE THREE at the end of the specification illustrates the calibrated distance error points for each of the defined motor speed points and which calibration results from the operation of the slowdown profile calibration method and apparatus of the present invention.

TABLE FOUR at the end of the specification illustrates the arrangement of the data file stored in the memory of the control computer for a typical motor drive system.

PROGRAM LISTING ONE at the end of the specification illustrates a suitable LOADER program in accordance with the flow chart of FIG. 4.

PROGRAM LISTING TWO at the end of the specification illustrates a suitable ACQUIR program in accordance with the flow chart of FIG. 5.

PROGRAM LISTING THREE at the end of the specification illustrates a suitable ACTIVT program in accordance with the flow chart of FIG. 6.

PROGRAM LISTING FOUR at the end of the specification illustrates a suitable PRINTP program in accordance with the flow chart of FIG. 7.

PROGRAM LISTING FIVE at the end of the specification illustrates a suitable READIN program in accordance with the flow chart of FIG. 8.

PROGRAM LISTING SIX at the end of the specification illustrates a suitable PRTMSG program in accordance with the flow chart of FIG. 9.

Figure 10:
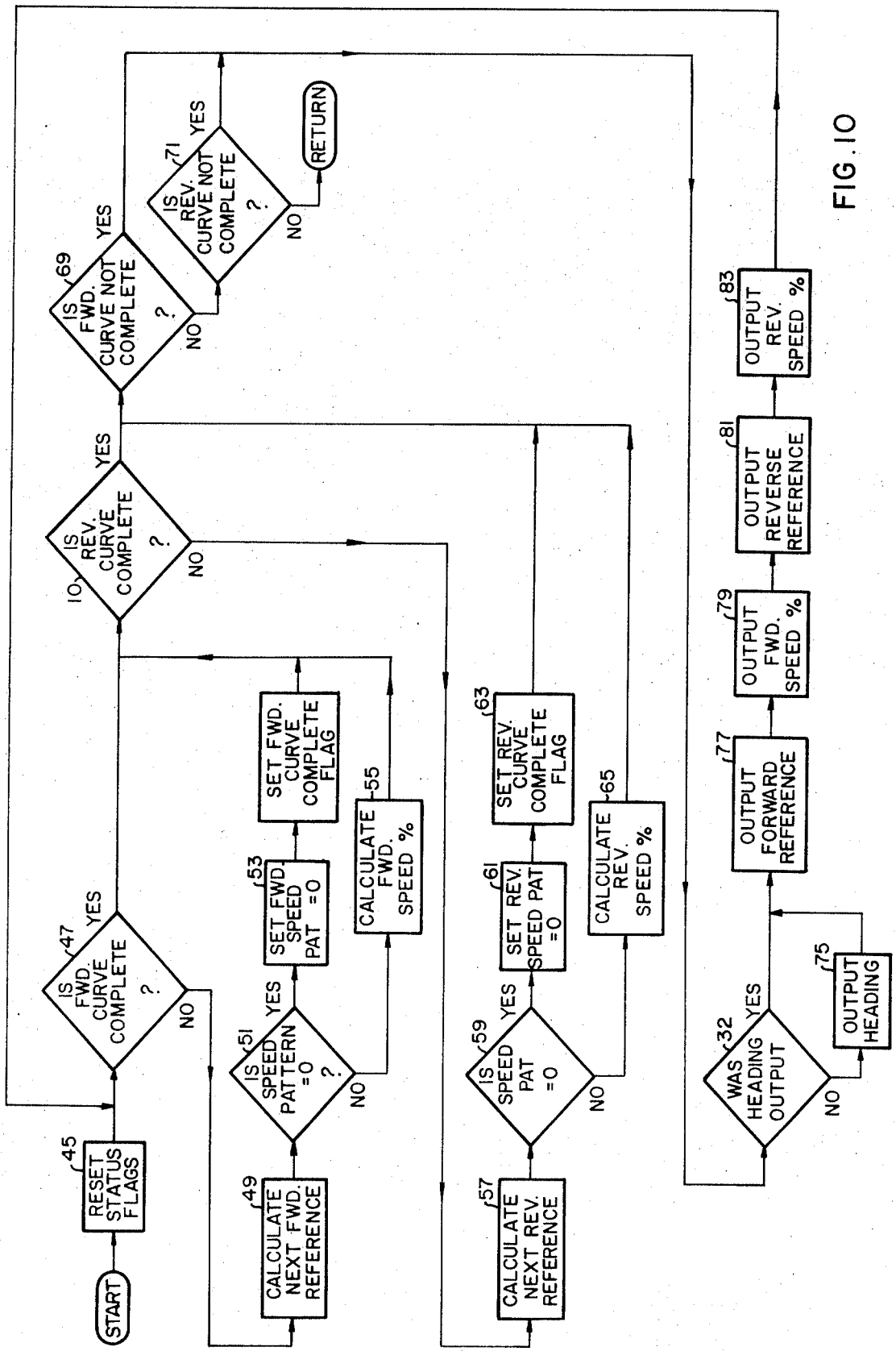
FIG. 10 shows an illustrative functional flow chart of the print curves routine program PRTPRF called by the distance optimization calibration program and in accordance with PROGRAM LISTING SEVEN.

PROGRAM LISTING SEVEN at the end of the specification illustrates a suitable PRTPRF program in accordance with the flow chart of FIG. 10. PROGRAM LISTING EIGHT at the end of the specification illustrates a suitable TRAVEL program in accordance with the flow chart of FIG. 11.

PROGRAM LISTING NINE at the end of the specification illustrates a suitable PRODAT program in accordance with the flow chart of FIG. 12.

PROGRAM LISTING TEN at the end of the specification illustrates a suitable DSTOPT program in accordance with the flow chart of FIGS. 3A and 3B.

PROGRAM LISTING ELEVEN at the end of the specification illustrates a suitable DATA program within the understanding of persons skilled in this particular art.

Figure 13:
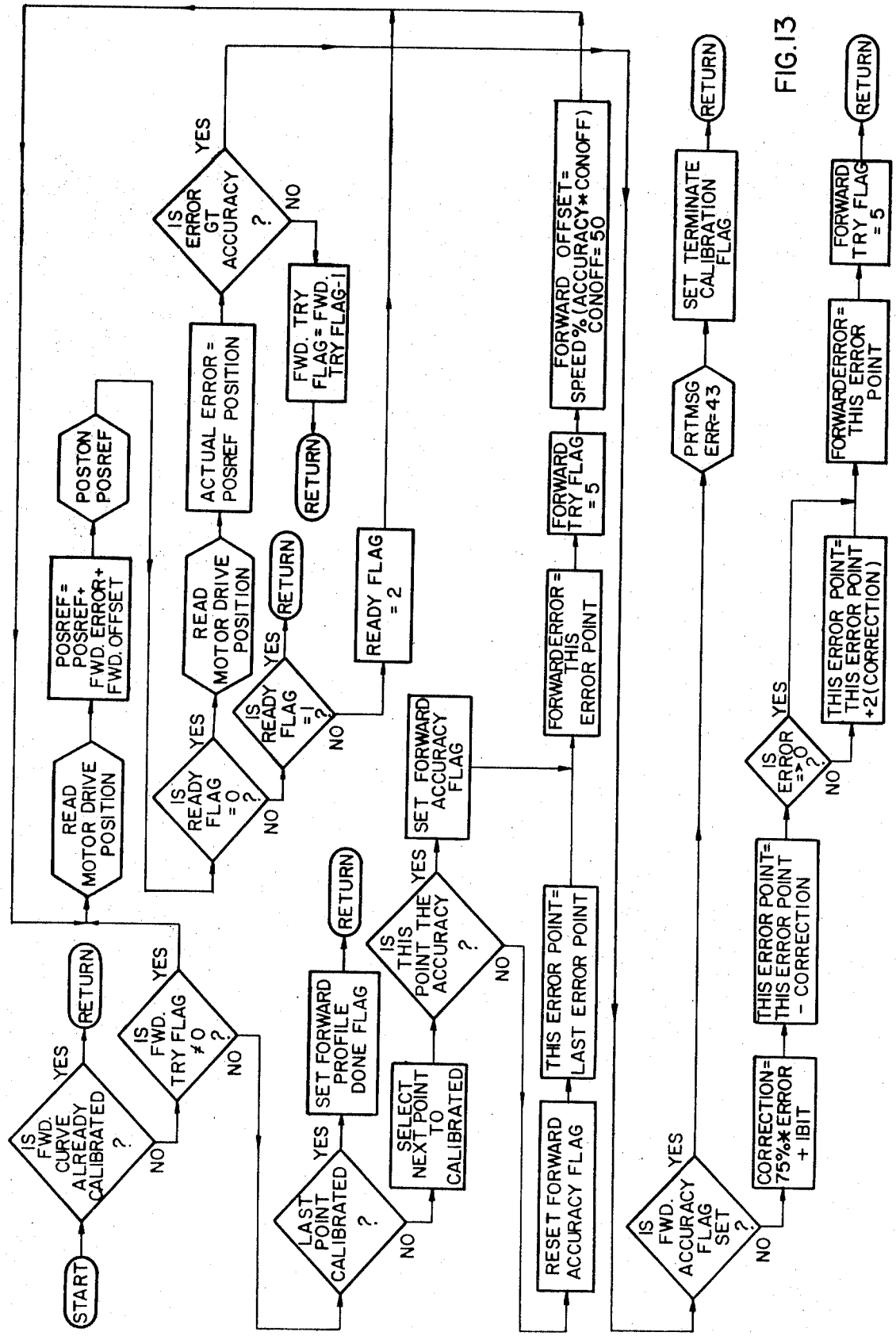
FIG. 13 shows an illustrative functional flow chart of the forward slowdown profile modification routine program FWDDO called by the distance optimization program and in accordance with PROGRAM LISTING TWELVE.

PROGRAM LISTING TWELVE at the end of the specification illustrates a suitable FWDDO program in accordance with the flow chart of FIG. 13.

Figure 14:
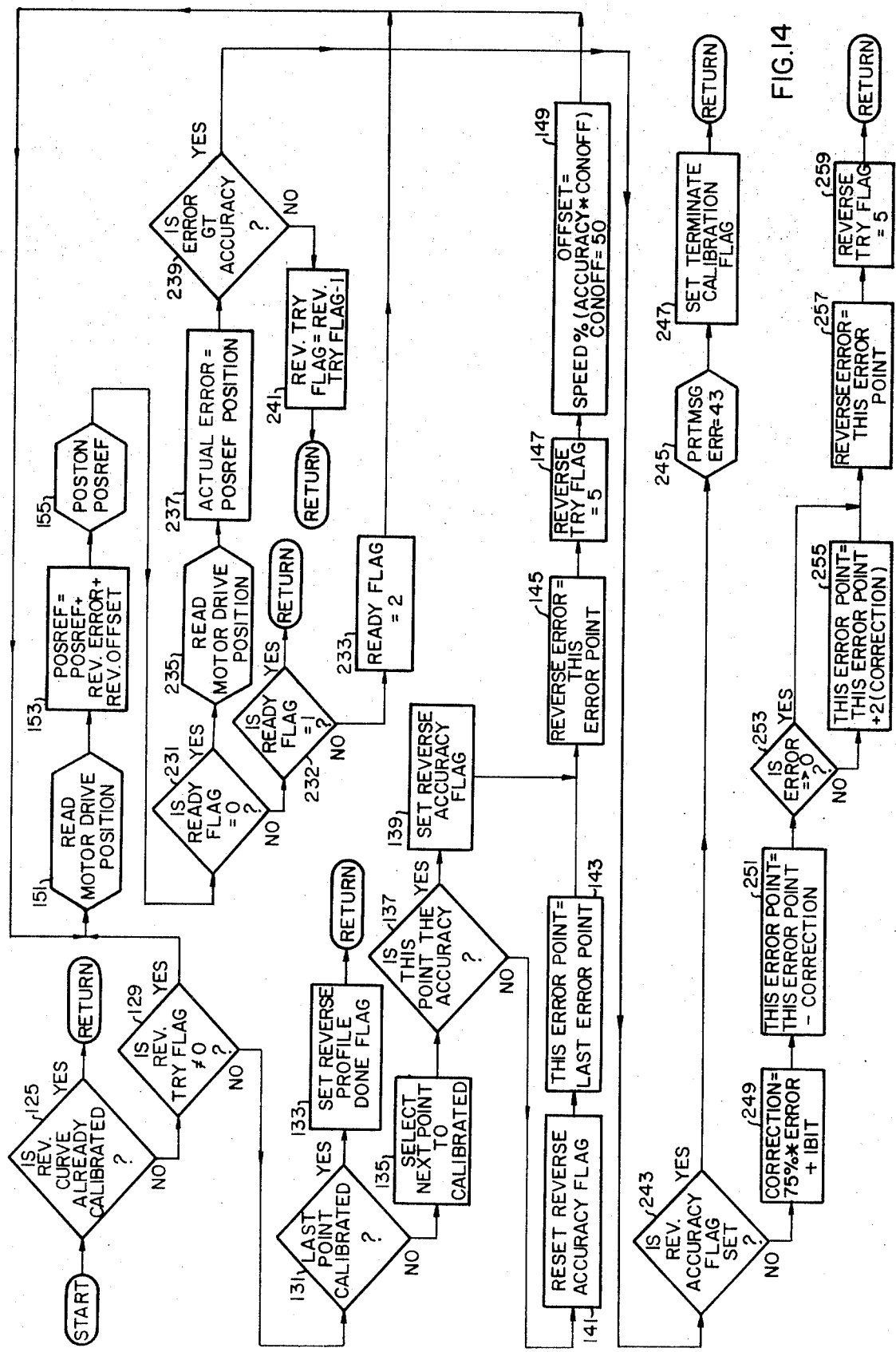
FIG. 14 shows an illustrative functional flow chart of the reverse slowdown profile modification routine program REVDO called by the distance optimization program and in accordance with PROGRAM LISTING THIRTEEN.

PROGRAM LISTING THIRTEEN at the end of the specification illustrates a suitable REVDO program in accordance with the flow chart of FIG. 14.

Figure 15:
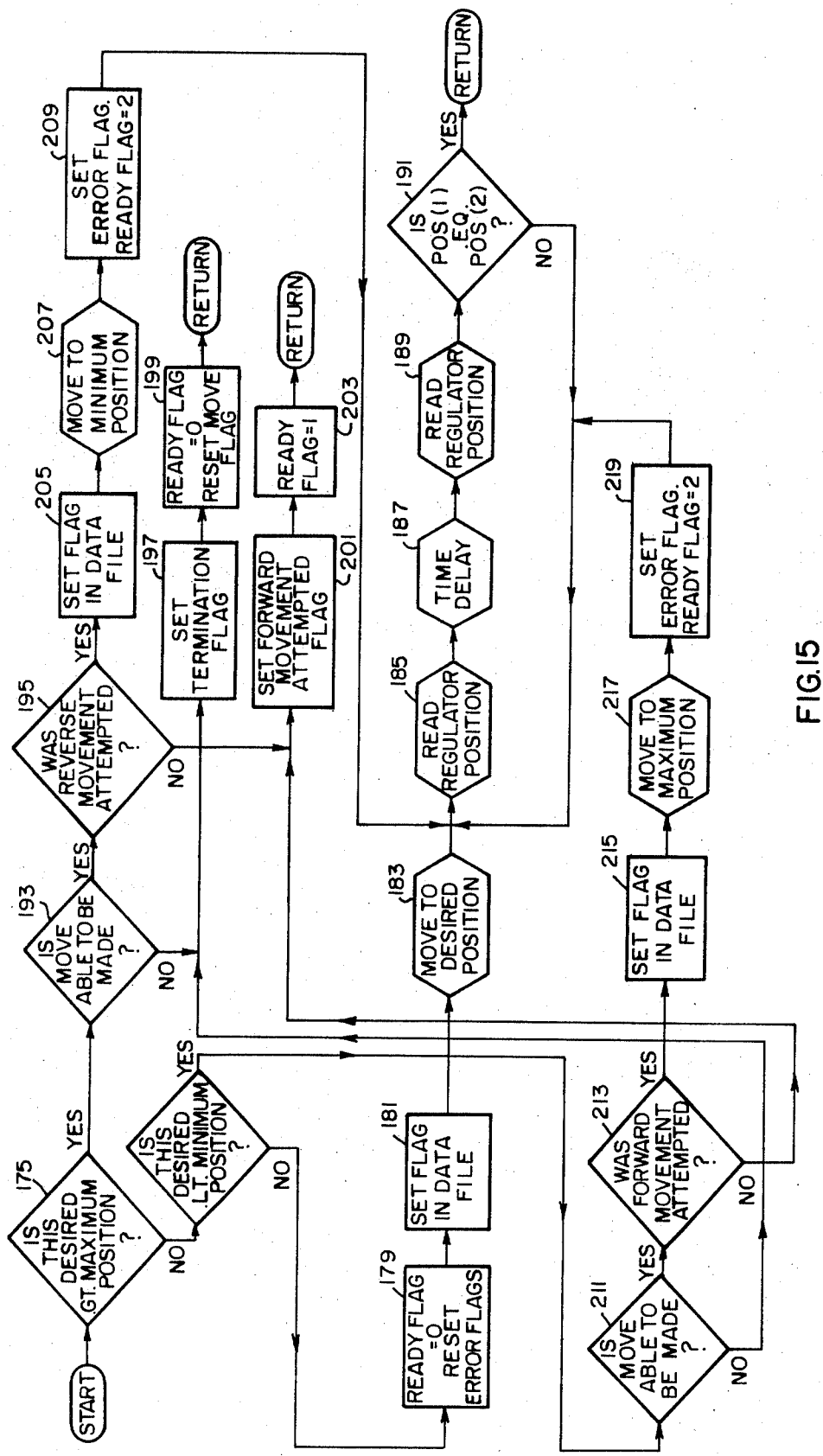
FIG. 15 shows an illustrative functional flow chart of the position routine program POSTON called by each of the FWDDO program and the REVDO program and in accordance with PROGRAM LISTING FOURTEEN.

PROGRAM LISTING FOURTEEN at the end of the specification illustrates a suitable POSTON program in accordance with the flow chart of FIG. 15.

DESCRIPTION OF A PREFERRED EMBODIMENT

The present invention relates to the calibration of position regulated motor drive systems, and more particularly to the calibration of the operation of such a motor drive system suitable for use with a metal rolling mill stand.

In the operation of a metal reversing or tandem metal rolling mill stand, the unloaded roll opening and the speed of that stand are set up by an operator or by a programmed digital computer control system to produce workpiece reductions resulting in delivered work product at the desired thickness. Since the set up conditions can be in error and since certain mill parameters affect the stand loaded roll opening during the actual workpiece rolling operation and after set up conditions have been established, a stand gauge control system is employed to control the stand delivery gauge or thickness. For the purpose of the desired operation of the stand gauge control system, it is important that a reliable and accurate position regulated screwdown motor drive system be operative for the purpose of accurately positioning the work rolls of each stand in accordance with the desired reference position of those work rolls for the purpose of reducing a workpiece during each pass of the workpiece between the rolls in accordance with a desired reduction schedule.

Figure 1:
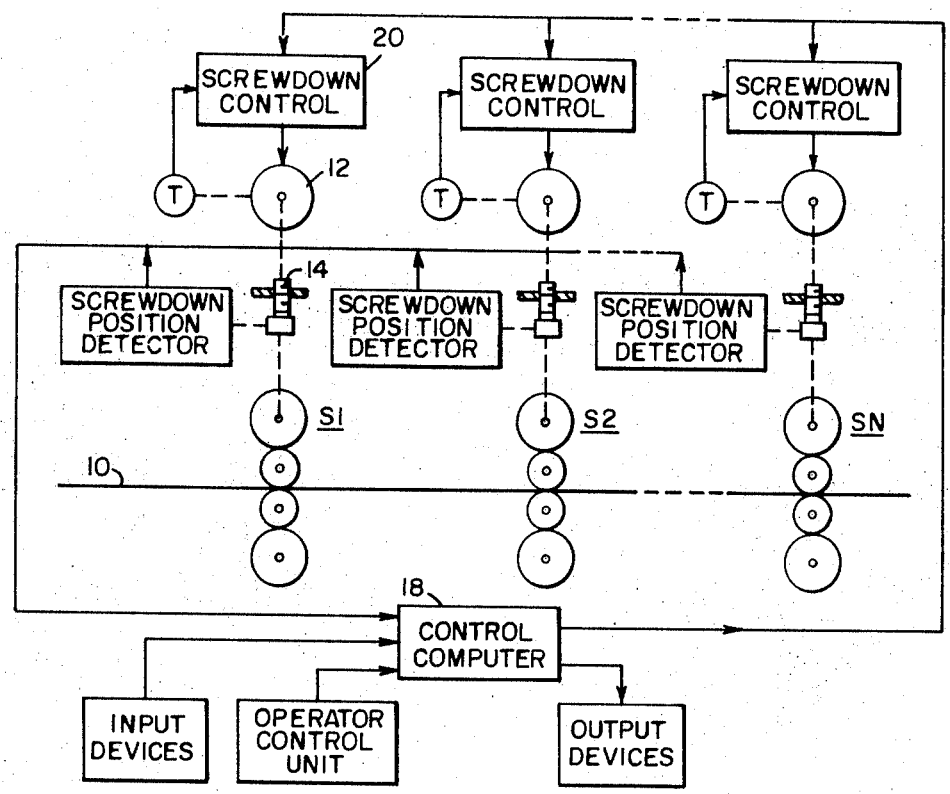
FIG. 1 is a schematic showing of a tandem rolling mill including a screwdown control, operative to determining the operation of a screwdown motor for adjusting the roll spacing of each mill stand, and a screwdown position detector for each said mill stand operative with a control computer for determining the operation of the position regulated screwdown motor drive system for each such stand.

In FIG. 1 there is shown a tandem rolling mill including a series of reduction rolling stands S1, S2 through Sn, with only three of the stands being shown. However, it should be understood that five or six or even seven stands may be included. A workpiece 10 enters the rolling mill at the entry end and is elongated as it is transported through the successive stands S1 through Sn to the delivery end of the mill. The entry workpiece would have a known steel grade and known thickness and would have a known width. The delivered workpiece would have approximately the same width, with the delivery gauge or thickness being based upon the production order for which the workpiece is intended. Each stand produces a predetermined reduction or draft, such that the total mill draft reduces the entry workpiece to a desired final delivery thickness. Each stand is conventionally provided with a pair of work rolls between which the workpiece 10 is passed. A large DC drive motor is controllably energized at each stand to drive the corresponding work rolls at a predetermined speed.

To vary the unloaded work roll opening at each stand, a pair of screwdown motors 12, which operate in conjunction with each other to form a screwdown motor drive system as shown in FIG. 1, are provided at each stand. The respective screwdown mechanisms 14 clamp the opposite ends of the backup rolls and thereby apply pressure to the work rolls at each stand. Normally the two screwdown mechanisms 14 at a particular stand would be in identical positions, but they can be located at different positions for the purpose of strip guidance during threading or for other purposes. It should be noted that the provision of an electric motor 12 driving a screwdown mechanism 14 to control the stand roll opening can be replaced by a hydraulic positioning servo system or a hydraulic motor operated with a screwdown mechanism if desired.

A screwdown position detector 16 provides an electrical signal representation of the screwdown controlled roll opening position at each roll stand.

A programmed digital control computer 18 is provided to automatically control the operation of the tandem mill, including each position regulated screwdown motor drive system as may be desired. Preferably the control computer 18 comprises a programmed process control digital computer which is interfaced with the various mill sensors and the various mill control devices to provide control over many of the various functions involved in operating the tandem mill shown in FIG. 1. According to the user preference, the control computer 18 can also include conventional manual and/or automatic analog controls for backup operation in performing preselected mill functions. The control computer 18 can include a central integrated process control or set up processor with associated input/output equipment, such as is included in the PRODAC 2000 (P2000) control computer system currently sold in the open marketplace by the Westinghouse Electric Corp.

The computer processor is associated with predetermined input systems not specifically illustrated in FIG. 1, which typically include a conventional contact closure input system to scan contacts or other signals representing the status of various process conditions, a conventional analog input system which scans and converts process analog signals, operator controlled and other information input devices such as paper tape, teletypewriters and dial input devices. Various kinds of input information are entered into the digital computer system through the input devices including, for example, desired strip delivery gauge from each of the rolling mill stands and workpiece temperature, workpiece strip entry thickness and width by entry detectors if desired, grade of steel being rolled, any selected workpiece plasticity tables, hardware oriented programs and control programs for the programming system associated with the control computer and so forth. The contact closure input system and the analog input system interface the control computer system with the controlled process through the medium of measured or detected variables. In addition, contact closure output systems can be associated with the various control devices operated in response to control actions calculated or determined by execution of the control programs in the control computer 18. To effect these determined control actions, the control devices are operated directly by means of output system contact closures or by means of analog signals derived from output system contact closures through a digital to analog converter. One such control action includes the screwdown positioning system commands, which are applied to the respective screwdown controls 20 for each of the rolling mill stands for controlling the operation of the associated screwdown motor drives 12 for the desired screwdown movement of the respective rolling mill stands. Display and print out equipment can be included such as teletypewriter systems associated with the output of the control computer 18, in order to keep the mill operator generally informed about the mill operation, and in order to signal the operator regarding an event or alarm condition which may require some action on his part.

Figure 2:
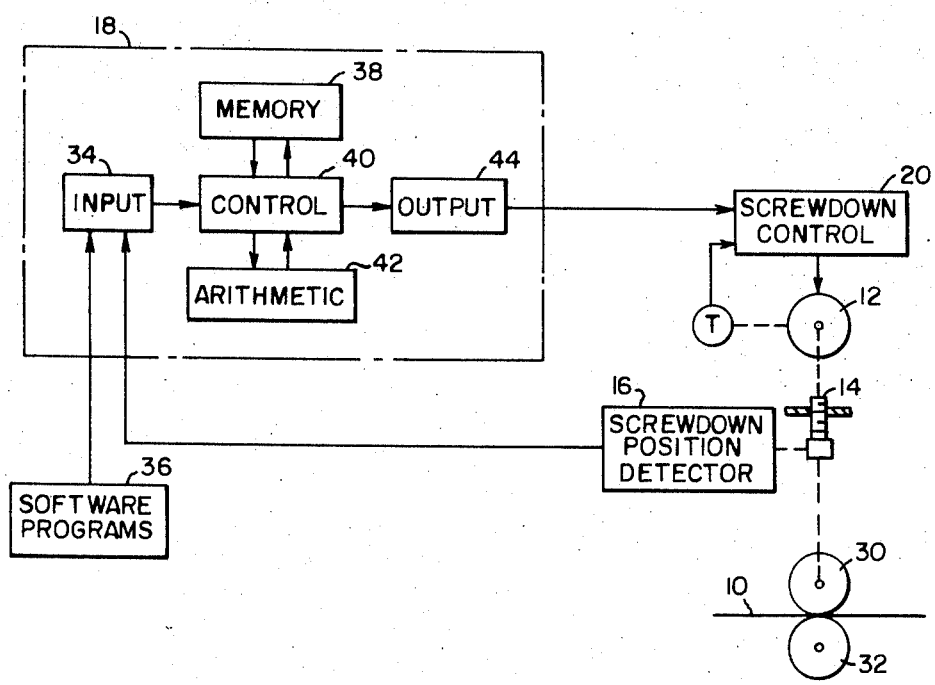
FIG. 2 is a schematic illustration of the position regulated motor drive system operative with a typical rolling mill stand, with the control computer being illustrated for functioning as a position controller in accordance with an optimum distance calibration program applied to the control computer.

In FIG. 2 there is schematically shown a position regulated motor drive system for controlling the roll opening of a typical rolling mill stand, which can be the single stand of a reversing slab mill. The screwdown drive motor 12 is operated with a screwdown control 20 for controlling the operation of the screwdown mechanism 14 as required to adjust the unloaded roll opening between the rolls 30 and 32 of the rolling mill stand operative with a workpiece 10. The encoded signal from the screwdown position detector 16 in accordance with the unloaded roll opening between the rolls 30 and 32 is supplied through an input section 34 of the control computer 18 through which all input signals are applied, including the information generated by the associated software control programs 36. The control computer 18 conventionally also includes a memory section 38, a control section 40, an arithmetic section 42 and an output section 44, as well known to persons skilled in the operation of programmed digital computers. The output section 44 supplies the desired screwdown reference position signal to the screwdown control 20.

A prior art publication of interest for a more detailed background understanding of the hardware and software operation of the PRODAC 2000 Control Computer System is the PRODAC 2000 Computer Systems Reference Manual, which has been published and made available by the Westinghouse Electric Corp.

For a typical reversing single stand slab mill the screwdown movements are usually in the range of 1 to 30 inches, however, the most common movements, which may include about 80 percent of all movements, are in the order of 1½ to 3 inches. The total screwdown travel for a typical slab mill may be in the order of 5 inches to 60 inches, and considering the movement of the rolls from the time that the workpiece first enters the work rolls on a first pass, until the workpiece has left the rolls after the last pass, a total movement in the order of 30 inches may be involved. Most of the movements for the succeeding passes follow generalized patterns between 1½ and 3 inches for each movement. Accordingly, it is desirable to minimize the time required to make the more common screw movements, such as a three inch movement between successive passes or a 2 inch movement between successive passes or a 1½ inch movement between successive passes. The maximum edge and flat draft passes are typically 3 inches and 2 inches and a torque limited pass would probably be less than 2 inches and in the order of 1½ inches.

The optimum distance calibration in accordance with the teachings of the present invention has substantial value in regard to these most commonly made movements of 1½ inches, 2 inches and 3 inches. For this purpose, a determination is made of the maximum operating speed of the position regulated screwdown motor drive system when a predetermined position error movement or distance movement is to be made. For example, if it is desired to lower a particular calibrated distance error point, such as from 1.75 to 1.45, the operator could lower the corresponding defined speed point of 20 percent to something like 17 percent and then recalibrate the distance error point accordingly. This operation can be repeated as necessary until the calibrated distance error point of about 1.45 is realized. It is very common in the actual operation of a reversing single stand mill for the speed of movement of the screwdown motor drive system to be a limiting factor relative to the time required for the operation of the mill in relation to the making of successive passes. For a tandem strip mill the screwdown motor drive system speed is perhaps less of a limitation than it is for a reversing single stand mill.

For predetermined position movements S1, S2 through SN, and utilizing a substantially constant deceleration after a previous substantially constant acceleration for the purpose of effecting these desired travel or position movements, the screwdown motor drive system should in theory for optimum operation first accelerate at a substantially constant and maximum acceleration until the substantially constant and maximum deceleration curve is reached, and the screwdown motor drive would subsequently follow the deceleration curve until the work rolls arrived at the desired reference position. The constant acceleration curve and the constant deceleration curve are predetermined as substantially the maximum available movement curves for the motor drive system to follow.

In accordance with the present invention, the characteristic position error movements or travel distances S1, S2 through SN are selected in advance and each optimized individually in relation to the minimum time requirements to effect the desired movement in the position of the work rolls, to change the spacing between the unloaded rolls in accordance with the defined travel movement or position error. The fastest manner for making the desired change in position is to follow the maximum acceleration curve until it intersects with the maximum deceleration curve without the requirement for any interval of movement at a substantially constant velocity.

The practice of the present invention typically will allow the saving of two-tenths or three-tenths of a second in the positioning of the screwdown motor drive system for a given position error. Considering the number of such changes that are made in the course of a normal 8 hour rolling mill stand work shift, a substantial amount of operating time is saved to thereby permit a substantial increase in the quantity of work product passing through the rolling mill stand. The typical screwdown motor drive system may require in the order of 1 second to go from zero to full speed in its normal operation. In the operation of a typical reversing single stand mill, the workpiece is passed through the mill stand and then must wait a sufficient time interval for a desired position error movement or adjustment to be made in the spacing between the rolls of the stand before the workpiece can be passed through the rolls a succeeding time. One purpose of the present invention is to decrease the time duration of this waiting period that the workpiece must undertake before the rolling mill stand is ready for a succeeding pass of the workpiece between the rolls.

When the distance optimization data file for a given mill stand is determined by the control computer in accordance with the teachings of the present invention, better data is available for controlling the operation of the mill stand than is available when a manual slowdown calibration is attempted. A human operator has to make one setting of the screwdown position control parameter and then watch the resultant movement of the rolls by means of an oscilloscope or the like; the human operator cannot accomplish the optimum distance movement profile calibration such as can be accomplished with the programmed control computer system in accordance with the teachings of the present invention. In addition, the latter distance movement profile calibration will extend over three-fourths of the entire adjustment range of the rolling mill stand. Also, the programmed control computer utilizes an iterative method which permits a very small increase or change in the screwdown motor drive system operating speed for succeeding position adjustments in an effort to reach the optimum profile for the distance slowdown curve. A human operator may require in the order of one-half of a day to a full day to calibrate the screwdown motor drive system for a single rolling mill stand, and the end result of the human operator calibration is not as good as the end result of the calibration in accordance with the present invention. In comparison, the method and apparatus of the present invention will require only about 5 minutes to provide a more precise position movement calibration of the screwdown motor drive system.

The present slowdown profile calibration technique requires less time for the actual calibration and in addition provides a more optimum slowdown control profile for each position movement made by the screwdown motor drive system during the workpiece rolling operation of the mill stand such that a substantially improved operation of the position regulated motor drive system also results from the practice of the present invention. The accumulated time saving provided by two-tenths or three-tenths of a second less time being required for the making of each pass of a workpiece through the calibrated rolling mill stand over the usable life of that rolling mill stand provides a considerable and valuable saving in time. A typical initial pass with a given workpiece 6 feet long may take one second to 1½ seconds to complete the pass. Whereas, the final pass with the same workpiece in the order of 50 feet long will take considerably longer for completion. It is the reversal time between the tail end of the workpiece leaving the mill stand on a given pass and the head end of the workpiece entering the same mill stand moving in the opposite direction on a succeeding pass which is reduced by two-tenths or three-tenths of a second, and this reversal time may be typically in the order of 2 seconds.

Figure 18:
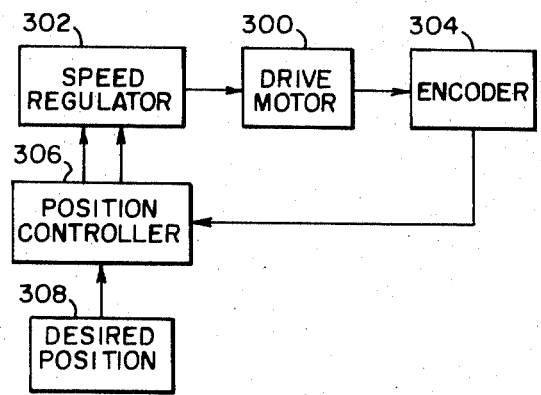
FIG. 18 is a schematic illustration of a well known position regulated motor drive system operative for controlling the position of a drive motor, such as the screwdown motor for a rolling mill stand.

The distance movement optimization control program of the present invention functions with a defined or established speed of operation for each desired position error point. The control program incrementally changes the position error point for a given defined speed to find an optimum position error point for operation at that defined speed without an overshoot or undershoot occurring in the final position of the screwdown motor drive system. The distance error point is initially made smaller for the purpose of intentionally getting an overshoot and then is incrementally brought back toward the desired position error point until an overshoot or undershoot does not occur, which in effect provides a vernier change in the definition of the position error point relative to a previously established or defined speed point. The overshoot is corrected in accordance with a predetermined factor, such as three-fourths, of the resulting overshoot plus one bit increment, to determine the incremental change that will be made in the position error point to remove the overshoot condition of operation and the substantially constant and maximum acceleration and deceleration curves are utilized as was previously described. The selection of the speed points by the operator should be such as to provide the speed reference signal from the position controller to the speed regulator of the motor drive system (as shown in FIG. 18) for maximum optimum speed of operation of the screwdown motor drive system for effecting a desired position change for each distance error point without an overshoot or undershoot condition occurring.

One practical purpose of the present distance optimization program is to find for each defined speed point for the operation of the motor drive system, the minimum distance error point for suitable operation of the motor drive system to in effect increase the operating speed of the screwdown motor drive system as much as can be realized without an overshoot or undershoot in the resulting position setting for the screwdown mechanism and still be within the permissible zero error tolerance band. For each defined speed point it is desired to find the minimum position error point for which the screwdown motor drive system can operate at the defined speed point without an overshoot or undershoot occurring in the resulting position setting of the screwdown mechanism. A fundamental limitation on the operation of the screwdown motor drive is the predetermined maximum acceleration curve MA and the predetermined maximum deceleration curve MD for the motor drive system, as generally set forth in FIG. 20.

The teachings of the present invention include the operation of a motor drive system position optimization control program, for the calibration of a position regulated motor drive system, such as a screwdown motor drive system operative for determining the roll opening between the work rolls of a rolling mill stand. A LOADER program is operative as a part of this control program, as well as a plurality of predetermined function programs and common subroutine programs for accomplishing this desired calibration purpose. The control computer operative with the control program is initially supplied with desired process parameters in regard to where each particular mill stand roll opening is presently set and so forth. The control program, for the here described calibration of each motor drive, is initialized through the provided programmer's console by the operator. The control program then requests the desired function program number and the motor drive system number which is to be position optimized in regard to the calibration of the position movement slowdown profile curves. According to what is input at this stage of the operation by the operator, for example, the first function program might be the ACQUIR program which is address identified by a 1 (for the ACQUIR function program) followed by a comma and then the particular stand drive identification number (such as 01, 02, 03 and so forth). A branch operation would then be taken from the LOADER program to the desired function program. It is the purpose of the LOADER program to bring in each function program or subroutine program as may be desired.

For each particular rolling mill stand, the present position error, which is the actual position compared to the desired reference position, is the position movement requested and will determine the speed of operation of the position regulated screwdown motor drive system in relation to defined operation speeds of the screwdown motor drive system. An initial predetermined table of distance error points versus motor drive system operating speed points, such as shown in TABLE TWO, is provided by the mill stand operator in accordance with the desired operation to be provided for each position regulated screwdown motor drive system for the respective stands of the rolling mill. Each motor drive system has a data file associated with it and one of the bases of information in that data file is the speed versus distance curve relationship to define the desired position regulated operation of the motor drive system. If for example the desired accuracy band of the final positioning of the screwdown motor drive system is equal to 0.10 inch, the defined operating speed corresponding to this accuracy band of the position regulated screwdown motor drive system may be 5 percent of full speed, with full speed being in the order of 10 inches per second. For a position error greater than 0.25 inch, the defined operating speed may be 10 percent of full speed. For a position error greater than 0.75 inch, the defined operating speed may be 15 percent of full speed. For a position error greater than 1.75 inches, the defined operating speed may be 20 percent of full speed. For a position error greater than 2.75 inches, the defined operating speed may be 30 percent of full speed. For a position error greater than 20.00 inches, the defined operating speed may be 60 percent of full speed. For a position error greater than 57.75 inches, the defined operating speed may be 100 percent of full speed in a direction to correct the established position error. It should be understood, that the latter speed versus distance relationships are not the same for every motor drive system, but rather are merely illustrative of a typical speed distance profile defined for a screwdown position motor drive system, and correspond to the down direction profile curve set forth in TABLE TWO for a particular rolling mill stand. The operator usually provides the defined operating speed points, such as 5, 10, 15, 20, 30, 60 and 100 percent respectively, and in the actual running operation of each screwdown motor drive system the position error points of interest are initially established empirically, such as set forth in TABLE TWO. In other words, if it is desired by the operator that if the actual position error is greater than 57.75 inches the screwdown motor drive system operates at 100 percent of full speed until the 57.75 inches defined position error is reached, at which time the screwdown motor drive system operates at 60 percent of full speed until the position error becomes 20.00 inches, at which time the speed reference to the screwdown motor drive system is changed to 30 percent of full speed until the position error becomes 2.75 inches, at which time the speed reference is changed to 20 percent of full speed until the position error becomes 1.75 inches, at which time the speed reference for the screwdown drive system becomes 15 percent of full speed until the position error becomes 0.75 inch, at which time the speed reference for the screwdown drive system becomes 10 percent of full speed until the position error becomes 0.25 inch, at which time the speed reference is changed to 5 percent of full speed until the position error becomes 0.01 inch, at which time the speed reference is changed to zero percent of full speed and the motor drive system stops. The position error distances at which the changes in speed reference should be effected are initially determined empirically in the field.

Figure 3:
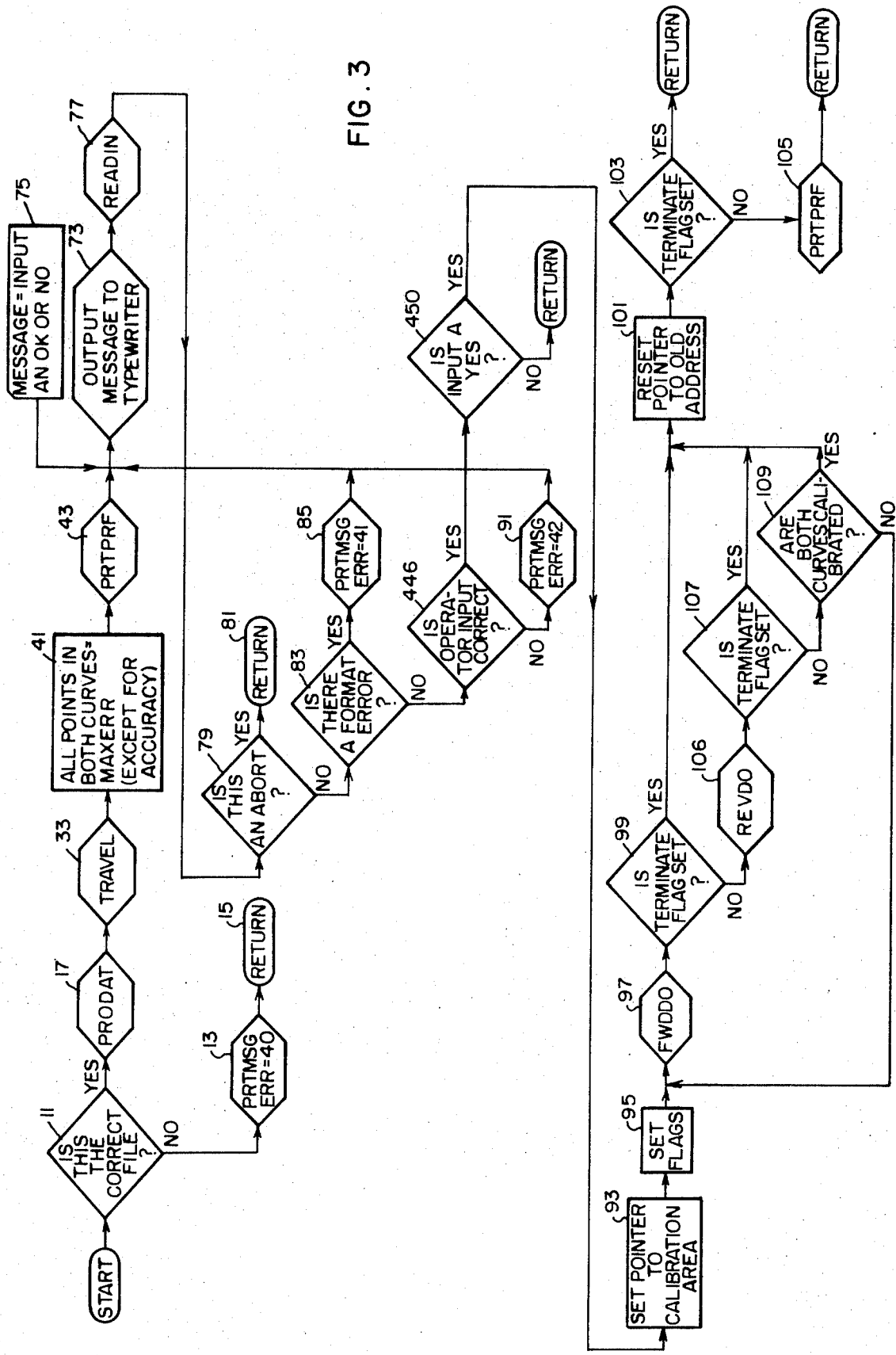
FIG. 3 shows an illustrative functional flow chart of calibrated distance optimization program DSTOPT in accordance with the teachings of the present invention and PROGRAM LISTING TEN.

In FIG. 3 there is shown a flow chart for the distance optimization function program. The data file for a particular stand would have been previously acquired through operation of the ACQUIR function program and moved into the desired calibration area of core storage where it could be utilized and perhaps modified without disturbing the initial form of the data file which is still retained in the original and operating core storage area. The speed versus distance profile curve is known, and its location in the data file is known from certain defined parameters in the data file. At block 11 of FIG. 3 a check is made to be certain that the correct stand data file has been selected. The distance optimization function program shown in FIG. 3 is called from the LOADER PROGRAM. The system operator typed into the provided operator's control unit the routine desired function program number and the number identifying the particular stand data file that is desired. This function program is called by an operator and not by the happening of some operation of the rolling mill; initially, it could be done upon start-up of the rolling mill stand and in addition, if desired, it could be initiated upon each change of rolls for a given stand of the rolling mill. When a check is made in FIG. 3 to see if the correct data file is present in the calibration area of core storage, if it is not an error message is printed at block 13 by the subroutine PRTMSG program to indicate that the wrong data file is in the calibration area. The error message ERR=40 indicates that the error relates to the distance optimization function program operation which is identified by 4, and the 0 indicates the type of error. The program then goes to block 15 which returns to the control of the LOADER program. On the other hand, if this is the correct stand data file, the program goes to block 17 where a subroutine program called PRODAT is entered into. The flow chart for this latter subroutine is shown in FIG. 12; this program is intended to set up desired profile data information in regard to the maximum forward movement and the maximum reverse movement as well as the minimum forward and minimum reverse movements that are permitted and desired for the position regulated motor drive system calibration operation.

The PRODAT subroutine program locates the slowdown curve information within the data file, and in addition it sets up some desired pointers. In reference to the flow chart shown in FIG. 12, at block 19 the forward and reverse slowdown curves are located within the data file. A forward direction file and a reverse direction file are provided since the operation of the stand screwdown motor drive system may change and be different when moving in a forward direction as compared to a reverse direction. At block 21 a pointer is located for the maximum forward position being equal to the largest forward position error. At block 23 a pointer is located for the maximum reverse position being equal to the largest reverse position error. At block 25 a pointer is located pointing to the minimum end of the forward slowdown curve equal to the forward direction accuracy error band, and at block 27 a pointer is set at the minimum end of the reverse direction slowdown curve equal to the reverse direction accuracy error band. Each of these data files for the forward direction and reverse direction are substantially large areas of information storage and these pointers are provided to locate particular sections of the respective data files. Block 29 is provided to increment by two, these pointers each time a pass through the flow chart is made. At the block 31 a return is made to DSTOPT function program, which advances to the block 33 shown in FIG. 3 to enter the TRAVEL subroutine program shown in FIG. 11.

The TRAVEL subroutine program performs calculations needed to determine the allowable travel of the motor drive system for the calibration of the data file. At block 35 of the TRAVEL subroutine program shown in FIG. 11 a maximum error is determined as 75 percent of the total available travel of the position regulated screwdown motor drive system. It is desired for calibration purposes to position the motor drive system only within 75 percent of the total travel distance for the reason that is not desired to bring the rolls together too rapidly and further it is desired to provide some overshoot to enable a more accurate position regulation. A location in the file contains the information on the total available travel of this particular stand motor drive system. The total travel here would be from a position where the rolls are touching to the opposite position where they are maximum open. The maximum position error is defined as 75 percent of this total theoretical total travel distance, and is intended for the purpose of calibrating the position regulated motor drive system without causing damage to the work rolls and the associated mechanical portions of the mill stand. The general purpose of the distance optimization control program is not to optimize the final position arrived at but rather to optimize the position regulated motor drive system in relation to a given position error, such that it is not material that the defined maximum error prevents the work rolls from actually touching during the motor drive system calibration operation. In block 37 of the flow chart shown in FIG. 11, the defined minimum position POSMIN is the minimum position at which the motor drive system will position the work rolls, and in block 39 the defined maximum position POSMAX is determined at which the motor drive system will position the work rolls. The minimum position POSMIN and this maximum position POSMAX are shown in FIG. 16. The parameter B is a provided offset in the position regulated motor drive system package, and it could be a mechanical offset to provide a minimum positioning of the motor drive system such that a mechanical stop can be provided to keep the work rolls from closing more than to provide a desired minimum roll opening gap of 5 inches. This could be applicable in the case of a slabbing mill stand where it is desired to position the roll from a 5 inch minimum roll gap to a 60 inch maximum roll gap, for example. Thusly, the total theoretical travel for such a drive system would be from 5 inches to 60 inches or a total travel of 55 inches. The offset B would be stored in the data file and provided by the operator of the rolling mill. The TRAVEL subroutine program shown in FIG. 11 now returns to block 41 shown in FIG. 3.

It is assumed in regard to the slowdown profile curve that the initial one bit equal to one-tenth inch position error movement for a 5 percent of maximum speed operation of the screwdown motor drive system is correct. This is the smallest position error movement that the position regulated motor drive system can make. The maximum error MAXERR = MAXFWD or MAXREV calculated in the PRODAT subroutine program (indicated by block 17 of FIG. 3) is in effect defined as 75 percent of the total allowed travel of the position regulated motor drive system. This quantity MAXERR is now stored for the purpose of calibration in all points in the respective forward and reverse slowdown curves except for the first one bit accuracy band position error point. In other words, it the total theoretical travel of the position motor drive is 50 inches, all points in the forward slowdown curve and the reverse slowdown curve are set at 75 percent of 50 inches or 37.5 inches, other than the initial one bit accuracy band position error point. In effect this blocks out the rest of the slowdown curve points, other than the initial one bit position error point, such that for a position error greater than 0.10 inch. The screwdown motor drive operates as though the position error were a one bit value and will cause the motor drive system to operate at 5 percent of maximum speed. It should be noted that in the normal position operation of the motor drive for a position error greater than one bit, it is desired that the motor drive operate at a higher speed than 5 percent of the 100 percent speed level. However, for the purpose of calibration it is desired that the motor drive be limited in its operation to a speed of 5 percent of 100 percent speed. The program now advances to block 43, which is a print curve profile PRTPRF subroutine program, and the flow chart is shown in FIGS. 10. The purpose of the print profile subroutine program is to print out the slowdown profile curve for the benefit of the operator to make sure that the operator is satisfied with the motor drive operation slowdown profile curve now provided. The print out for the operator will identify the particular stand motor drive, such as drive 20 and will identify the motor control profile such as the slowdown operation profile. For distance error point 1, the one bit will be converted to one-tenth of an inch and the corresponding operating speed point will be printed out at 5 percent of 100 percent run speed. The same will be true for the reverse operation profile as is true for the forward operation profile. The next distance error point 2 will be now printed out as 37.5 inches and the operating speed will be defined as 10 percent of full run speed. For the additional defined speed points such as 15 percent of full speed, 20 percent of full speed, 30 percent of full speed, 60 percent of full speed and 100 percent of full speed for the forward direction movement, the position error will be defined as 37.5 inches for each of the latter speed points. The purpose of this print out is for the operator to verify that this is the desired calibration operation to be provided.

At block 45 shown in FIG. 10 some status flags are internally set for the use of the operator programmer. At block 47 a determination is made that the forward curve is complete and has been output; if the answer is not, the program advances to block 49 for calculating the next forward point reference. The program then advances to block 51 to determine if the speed pattern zero point has been determined. At the bottom of each speed pattern, a zero is provided and this step is determining that such has taken place. If the answer is yes, the program advances to block 53 where the forward speed pattern is now set to zero. If the answer is no, the program advances to block 55 where the forward speed percentage is calculated, such as the 100 percent speed point. Then the program advances to the block 10 to determine if the reverse curve is complete, similar to the determination made at block 47 relative to the forward curve. If the answer is no, the program advances to block 57 for calculating the next reverse reference similar to the operation at block 49 for the forward movement. Following this the determination is made if the speed pattern equals zero point has been determined at block 59, and the setting of the reverse speed pattern to zero at block 61. At block 63, the reverse curve complete flag is set. If the answer at block 59 is no, the program advances to block 65 for a calculation of the reverse speed percentage points. After which the program advances to block 69 for determining if the forward curve is not complete. This is somewhat of a repeat of the operation of block 47, however, at this point in the program operation a determination of this question is again needed as a reject. A similar thing happens at block 71 relative to the reverse curve, and if the forward curve is complete and the reverse curve is complete, the program returns to the flow chart block 73 shown in FIG. 3. If either the forward curve is not complete or the reverse curve is not complete, the program of FIG. 10 advances to block 32 shown in FIG. 10 to see if the heading has been output for the drive slowdown forward curve and reverse curve as shown in the program listing. If not, the program advances to block 75 where the heading is output and the program advances to block 77 where the forward reference points are output and the program advances to block 79 to output the forward speed percent and to block 81 to output the reverse reference. At block 83 the reverse speed percent is output and the program returns to block 47 shown in FIG. 10 for a repeat of the operation until the whole of the reverse direction slowdown profile curve and the whole of the forward direction slowdown profile curve is completed.

At block 73 of FIG. 3 the operator is asked to input an OK or to input a NO to indicate the operator acceptance of the slowdown profile curves so far determined. The block 73 provides an output message to the input/output typewriter for the operator. The format message statement indicated by block 75 is provided prior to the operation of the WRITE instruction at block 73. The operator types through the input/output typewriter at the operator's console the format statement OK if he accepts the slowdown profile curves so far determined, or the operator types in the format statement NO if he does not accept the slowdown profile curves so far generated. At block 77 of FIG. 3 the READIN subroutine program is called to read as input information the message provided by the operator.

The READIN subroutine program is operative to input operator information when needed. At block 80, the input message is input from the operator's input/output typewriter. At block 82, the location of the carriage return is determined. At block 84, the parity bits are anded off the data in the buffer. At block 86, a check is made for a space directly before the carriage return; if not present, the routine sets the format error indicator at block 88 for IERR = 2 to indicate a format error and returns to the calling DSTOPT function program. Otherwise, the READIN subroutine program at block 90 determines if there is an exclamation point, and if not, a format error is indicated at block 88. At block 92 a check is made to see if this is an abort; if not, at block 94 the message IERR = 1 is provided to indicate no error has taken place, if it is, at block 96 an abort input message is provided. A return is then made to the calling program. This message is stored in a buffer and returns to the DSTOPT function program.

At step 79 of FIG. 3 a check is made to see if the operator has typed in an indication that he likes the forward and reverse slowdown profile curves so far generated or not. If he did not like them and wishes an abort, the operator types an exclamation point space return (!Δ↓), which means he does not like the slowdown profile curves so far generated, and the program advances to block 81 for a return to the LOADER program, and this is effective to abort the distance optimization profile curve generation so far accomplished during the present pass through the DSTOPT function program shown in FIG. 3. If the program step 79 indicates this is not an abort, at block 83 a check is made to see if a format error has occurred. In other words, did the operator input the message correctly or is there a format error. At block 85, an error message is printed by the PRTMSG subroutine program shown by flow chart in FIG. 9, which message is ERR = 41 to indicate that it is the distance optimization program as shown by the 4, and a 1 to indicate that a format error has occurred. The program returns to the block 73 to effectively ask the operator to again input a format message either OK to indicate that he accepts the forward and reverse slowdown profile curves so far generated or a NO to indicate that he does not accept the generated profile curves. If at block 83 there is an indication that there was no format error, the program advances to block 446 to determine if the operator input message is correct in regard to misspelled words and the like. If the operator input message is not correct, the program advances to block 91 where an error message ERR = 42 is provided by the PRTMSG subroutine program, which message again is not a fatal error and the program returns to block 73 for the operator to again input a message to indicate that he accepts or does not accept the drive speed and position profile curves so far generated. If the operator input message is correct, the program advances to block 450 to determine if the operator input message was a no or a yes. If the input was a yes, then the program advances to block 93 of FIG. 3. If the input was a no, the program returns to the LOADER program. Starting with block 93 of FIG. 3, the calibration of the data files begins. In the control computer 18 there is a listing of pointers to all the data files for each stand position regulated motor drive system. Each motor drive has an information file containing all of the drive information and forward and reverse slowdown profile curve information and the like. At block 93 the pointer for the particular screwdown motor drive stand being calibrated is set to point to the calibration area since it is not desired to disturb the original information storage location for that motor drive during the calibration operation. Therefore, a duplicate of the file information for the particular motor drive being calibrated is moved to a calibration area of storage where it is operated upon by the present program to establish the desired distance optimized profile curve. The information file is transferred into the calibration area through the ACQUIR function program and this information file will now be worked on in the calibration area to provide the desired distance optimized slowdown profile curve. Some internal flags are set at block 95 for bookkeeping purposes, and the program advances to block 97 which is the FWDDO subroutine program of FIG. 13 to calibrate the forward slowdown position profile curve. The FWDDO subroutine program calibrates one position error point at a time. At block 99 a determination is made if a terminate flag is set to indicate that something wrong has happened during the operation of the FWDDO subroutine program. If the terminate flag is set, the program advances to block 101 which resets the pointer to the old information core storage address rather than the calibration area core storage address, and it terminates the distance optimization program after checking at block 103 that the terminate flag is set and the program operation returns to the LOADER program.

If the terminate flag is not set at block 99 of FIG. 3, the program advances to block 105 for the REVDO subroutine program, which calibrates the reverse direction distance optimization slowdown profile curve. At block 107 the determination is made to see if the terminate flag is set to indicate that something went wrong during the REVDO subroutine program; and if this flag is set, the program advances to block 101 to reset the pointer to the old information core storage address. If the terminate flag is not set at block 107, the program advances to block 109 for a determination to see if both the forward and reverse distance optimization slowdown curves are calibrated. If both such curves are not calibrated, the program advances to block 97 to again go through the FWDDO subroutine program and then the REVDO subroutine program at block 105 repeatedly until both slowdown curves are calibrated. When both curves are calibrated, the program advances to block 101 to reset the pointer to the old information core storage address. This also happens anytime that a terminate flag is set to indicate that something is wrong in the operation of the subroutine programs FWDDO and REVDO. At block 103 if the terminate flag is not set, the program advances to block 105 to call the PRTPRF subroutine program for printing out the slowdown profile curves as now calibrated for the reverse operation of the screwdown motor drive system and the forward operation of the screwdown motor drive system. At this time each defined position error point in each curve has been calibrated, and the program now returns to the LOADER program and the complete cycle of the distance optimized calibration is now completed.

The distance optimization DSTOPT function program shown in FIG. 3 is in effect a nesting of subroutine programs, with each of the subroutine programs being provided for a particular purpose in establishing the respective desired distance optimized position error points for the slowdown profile curve in each direction of operation for the screwdown motor drive system of each stand of the rolling mill. These individual and common subroutine programs may be used by other control programs desired for the control operation of the rolling mill, other than the distance optimization control program and for this reason they are provided as common subroutine programs. However, for the purpose of the present invention the subroutine programs have been described in relation to the distance optimization DSTOPT function program.

The FWDDO subroutine program shown in FIG. 13 is generally similar to the REVDO subroutine program shown in FIG. 14, except there may be some minor differences in the calibration calculations provided by these respective subroutine programs. The REVDO subroutine program as shown in FIG. 14 starts at block 125 where a determination is made to see if the reverse slowdown curve has already been calibrated. If it has, the program returns to the distance optimization DSTOPT function program shown in FIG. 3; this operation is provided in the event that the reverse slowdown curve is not the same length as the forward slowdown curve, since one position error point is established for each of the respective curves at a time. In the event that additional position error points are required for the forward direction slowdown curve, see TABLE TWO for example, in which case the reverse curve would be calibrated prior to the completion of the forward direction slowdown curve calibration. It is desirable to calibrate these additional position error points on the forward direction curve, and not run through the REVDO subroutine program for each of these additional position error points for which the FWDDO subroutine program is required to calibrate. For example, it may be desired to calibrate five to seven position error points on the forward direction slowdown curve, whereas the reverse direction slowdown curve may require only four or five position error points to be calibrated. This is because the down direction movement of the motor drive system requires a few more position error points than does the up direction movement. The distance optimization DSTOPT function program shown in FIG. 3 calls the FWDDO subroutine program and then the REVDO subroutine program for each position error point of the respective slowdown curves, and if the FWDDO subroutine program has two or three additional position error points to calibrate than does the REVDO subroutine program, the block 125 shown in FIG. 14 is provided to keep from running through the REVDO subroutine program after all of the reverse direction position error points have been calibrated. The operation of the latter two programs is to calibrate the same position error point for both the forward and reverse direction slowdown curves, before proceeding to the next subsequent position error point in both the forward and reverse direction, and then to the next subsequent position error point for the forward direction and the reverse direction and so forth. Thusly, each corresponding position error point for the respective forward and reverse direction slowdown curves is calibrated, and it requires from one to several efforts to calibrate a given position error point on each curve before the calibration is satisfactory. It should also be understood that the program is operative such that once a given position error point in the reverse direction curve is completed, the program advances to the next successive position error point on that curve; in this way, the distance optimization program could be operative with the fourth position error point in the reverse direction curve and still be attempting to calibrate the second position error point in the forward direction curve. However, if for example the REVDO subroutine program completes its operation for all reverse direction curve position error points prior to the FWDDO program completing its operation for all position error points in the forward direction curve, the flag 125 shown in FIG. 14 will discontinue the operation of the REVDO subroutine program and permit the FWDDO subroutine program to continue its operation for the remaining position error points of the forward movement direction curve of the screwdown motor drive system. If at block 125 it is determined that the reverse slowdown curve is calibrated, the program advances to return 127 which returns the operation to the distance optimization DSTOPT function program shown in FIG. 3. If the reverse curve is not calibrated, at block 129 a determination is made if the reverse try flag is not zero. The reverse flag is set to zero when a given position error point is calibrated such that the overshoot or undershoot condition does not occur. When the reverse try flag is set to zero, this indicates that the next subsequent position error point in the reverse slowdown curve should be calibrated. The reverse try flag is set to zero when a given position error point has been checked a predetermined number of times and found to be correct with no overshoot or undershoot. The program now advances to block 131 to determine if the last defined point in the curve was calibrated. If the last point in the curve was calibrated, the program advances to block 133 where the reverse profile done flag is set and returns to the distance optimization DSTOPT function shown in FIG. 3.

On the other hand, if block 131 determines that the last desired point in the curve was not calibrated, the program advances to block 135 for selecting the next point on the curve to calibrate. The way the error points are stored in memory is to first store a given position error point and then store the corresponding desired speed point as a percentage of full full speed for the screwdown motor drive operation associated with that same position error point; this arrangement of a typical data file is shown in TABLE FOUR. Therefore, in the operation of selecting the next point to calibrate, in effect two units are subtracted from the position in the information data file storage area where the program is operating, such that the present position error point plus its associated screwdown motor drive operating speed point is passed and the next succeeding position error point is reached. The program then advances to block 137 as shown in FIG. 14 to see if the first point or the accuracy point on the reverse slowdown curve is the one now under consideration. It is important that the operator properly type in as input information the proper operating speed point such as 5 percent of maximum speed that is desired for the screwdown motor drive system relative to the first position error point or the accuracy point. If it is the accuracy point that is now under consideration, the program advances to block 139 where the reverse curve accuracy flag is set. On the other hand, if it is not the first accuracy point, the program advances to block 141 where the reverse curve accuracy flag is reset, and for the purpose of calibration the program advances to block 143 where this point is set equal to the last error point for the purpose of calibration.

Assume that each additional position error point is made equal to 75 with the exception of the first error point of the accuracy point. The second error point which is beyond the first error point or the accuracy point, is now calibrated, and the block 143 is intended to cause the motor drive system to operate at 10 percent of maximum speed regardless of the amount of the position error actually involved. What this function accomplishes is to have the screwdown motor drive operate at a 10 percent of maximum speed for all subsequent position error points other than a one bit or 1/10 inch position error, and this will result in an overshoot of the screwdown motor drive. For example, if the screwdown motor drive was at an actual position of 10 and it was desired to move it to an actual position of 20, the position error point movement operative with the screwdown motor drive system would be 10, the difference between these actual positions, but not greater than 10. Therefore, the first speed point that the drive system would operate under would be the 5 percent of maximum speed parameter, and the first time through or the first try will be with the 5 percent speed point parameter. The second time through or the second try will be with the 10 percent speed point parameter and operating at 10 percent at full speed, and it is likely that an overshoot will result at block 143. At block 143 the intention is to take the last position error point calibrated and insert it at this location as the present error point, and the first time through the program the error point here will be the error point corresponding to the 5 percent speed parameter. The second time through the program this position error point will be increased to the error point corresponding to the 10 percent speed parameter. At block 145 the reverse error is made equal to the error point now being calibrated by the program; reverse error in this case could be a 1. At block 147 the reverse try flag is set equal to 5, which means that five efforts will be made for the purpose of position calibration relative to each defined position error point. The reverse offset at block 149 is a quantity added to the distance to be traveled to make certain that the screwdown motor drive system is moving as fast as the desired calibration speed since it is desired for the motor drive system to go a few increments at that desired calibration speed. And for this purpose an additional travel distance called the reverse offset is introduced to make sure that the screwdown motor drive does actually reach the defined speed point operating speed desired for the calibration of the present point of interest. This assures that before the position error point takes control of the screwdown motor drive, that the screwdown motor drive has reached the desired speed point operating speed in accordance with the defined speed point corresponding to the particular position error point being calibrated. Thusly, the reverse offset is added to the distance to be traveled to make certain that the desired speed of operation for calibration purposes is reached. For example, if it is desired that the screwdown motor drive operate for 10 increments of travel before beginning to slow down in accordance with the slowdown curve, the block 149 might add 5 additional increments of travel to make certain that the screwdown motor drive is operating at the desired speed point corresponding to the position error point being calibrated. This is a determination of the distance traveled and not the position error point reference for that travel. The program advances to block 151 which brings in the present actual position of the screwdown motor drive for this particular stand, in encoder units to tell where the drive presently is, for example, 40 inches. In block 153 the position reference is made equal to the present position of the drive plus the reverse position error point plus the calculated reverse offset. Thusly, if the present position is 40 and the position error point under consideration is 10 and the reverse offset is 5, the position reference would be 40 plus 10 plus 5 or 55. This accomplishes a movement of 15 increments when the error is actually 10 increments to assure that the drive system reaches calibration speed before beginning to slowdown.

The FWDDO subroutine program is substantially the same in function as the REVDO subroutine program, with the exception that some of the numbers are reversed because the movement is in the opposite direction. For example, instead of adding a certain number, instead a subtraction of that number is made.

In FIG. 16 there is provided a sketch of screwdown motor drive movement to illustrate the normal movement range, and to illustrate the desired restricted movement range for the purpose of position optimization calibration in accordance with the present invention. Normally, the motor drive is in about a center position when the calibration operation for a given position error point is begun. The calibration effort causes the motor drive to move forward and then to reverse and then again go forward and then to reverse. For the larger position error points, bigger and bigger errors are developed which require a larger movement of the screwdown motor drive, and eventually the desired calibration movement becomes such that the motor drive will be moved thereby out of the restricted movement range. The POSTON subroutine program recognizes this possibility, and causes the motor drive to move all the way to the opposite extreme position as necessary to permit continued calibration movement of the screwdown motor drive. Further it is possible when the reverse direction calibration for a given error point has been completed and the forward direction calibration is not completed, such that successive forward movement direction efforts are made for the purpose of calibration which can cause the drive to approach one of the maximum reference positions, the POSTON position subroutine program will recognize this and cause the motor drive to move to the opposite maximum position, which could be the minimum reference position, to permit continued forward successive calibration movements of the screwdown motor drive. In addition, it is within the operation of the present POSTON position program when the forward and reverse drive movements are undertaken, if a forward movement should cause the screwdown motor drive to move outside of either the defined maximum or minimum reference positions and move outside the restricted movement range, that forward movement will be cancelled such that the next movement will be a reverse error position calibration movement and the resulting position of the screwdown motor drive is then such that the forward position error calibration movement can be made without moving the screwdown drive outside of the restricted movement range. The POSTON position subroutine program is provided to avoid wasted motor drive calibration movement and in effect optimize the position error point calibration operation of the screwdown motor drive. Assuming that about 5 minutes of time is required to calibrate each stand screwdown motor drive, and if 20 such motor drives in a given rolling mill are to be so calibrated, it can be seen about 1 hour of computer time is required for the desired calibration of the 20 screwdown motor drives of the rolling mill. And this is typically done when the rolling mill is down for a very limited time period such that there is not an abundance of spare time to accomplish the screwdown motor drive calibration operation as desired. On the other hand, for a human operator to attempt to calibrate the screwdown motor drives for the stands of the same rolling mill may require 1 day or more, and he would not provide the calibration as accurate and optimum as can be accomplished by the teachings of the present invention.

The POSTON position subroutine program shown in FIG. 15 is entered when a position reference is supplied to the screwdown motor drive system for the stand being calibrated. At block 175 a check is made to see if the position desired is greater than the maximum reference position permitted by the restricted movement range for this screwdown motor drive. If the position desired is not greater than the maximum reference position, the program advances to block 177 where a check is made to see if the position desired is less than the minimum reference position, such as shown in FIG. 16, for this particular screwdown motor drive. If it is not less than the minimum reference position, then the position desired appears to be suitable for actual movement of the screwdown motor drive, and the program advances to block 179 where a ready flag is set equal to zero and the reset of the error flag takes place as an internal procedural step. At block 181 a flag is set in the data file for the screwdown motor drive of the stand being calibrated. The normal operation of a position regulated motor drive is such that if it overshoots, it begins to position back in an effort to reach the desired position and remove any remaining position error relative to the desired or reference position. If the motor drive undershoots, the actual position will be corrected by moving up a little more until the actual position corresponds to the provided position reference. It is desired in the operation of the POSTON subroutine program shown in FIG. 15 to provide one movement position and then stop the screwdown motor drive for a determination of the correctness of the resultant actual position. The flag set in the data file by step 181 is to prevent this homing in or position correction after the provided one movement of the screwdown motor drive has stopped. At block 183 the screwdown motor drive is moved in accordance with the provided position reference. At block 185, a reading is made of the actual present position of the screwdown motor drive. Assuming that the screwdown motor drive was at position 40, and it was desired to move to position 55, after the provided one movement is made, at block 185 a reading is made of the resultant actual position POS(1) of the screwdown motor drive. At this step of the program, since not much time has passed for a movement to be made, the actual position of the screwdown motor drive may be at 40½. At block 187 a predetermined time delay TIME is provided in conjunction with the control computer, and at block 189 another reading is made of the present position POS(2) of the screwdown motor drive, which by now may be at 41 or 41½. At block 191 a determination is made if the first position POS(1) is equal to the second position POS(2), and since they are not equal, a loop is closed and the program again goes to block 185 for another reading of the first position POS(1) and then another time delay is provided at block 187, and at block 189 another reading of the second position POS(2) is made. This loop operation is repeated until at block 191, the motor drive has come to rest with the first position POS(1) equal to the second position POS(2). As long as the motor drive is moving, the loop here illustrated will be followed. When the motor drive stops moving at an actual position 54½, for example, the first position POS(1) will be 54½ and the second position POS(2) will be 54½, such that the check made at block 191 will be satisfied. A return is now made back to the FWDDO subroutine program or the REVDO subroutine program that called the POSTON position program.

The other illustrated sequences in FIG. 15 are provided for the situation where the motor drive cannot move because it is too close to the maximum reference position or the minimum reference position to make the requested position error point calibration movement. Going back to block 175, if the position desired is greater than the maximum position, the program advances to block 193 for a determination to see if the move is able to be made. If the move is able to be made at block 193, at block 195 the question is asked was the reverse movement already attempted. If the move is not able to be made as determined at block 193, at block 197 the termination flag is set, and at block 199 the ready flag is set equal to zero and the move flag is reset; the program then returns to the program shown in FIG. 14 in relation to block 155. The ready flag is a return flag to inform the FWDDO program or the REVDO program what the status of the screwdown motor drive is at the present time. If the reverse movement was not already attempted, at block 195 the program advances to block 201 for setting the forward movement attempted flag to indicate that an attempt to move forward was made and it could not be done. The ready flag is changed to 1 at block 203, and a return is made to the REVDO subroutine program. If the reverse movement was already attempted, at block 195 the program advances to block 205 to set the flag in the data file to prevent the homing in operation of the screwdown motor drive. The motor drive is now too close to the permitted end position, so the program advances to the block 207 to move the motor drive to the minimum reference position routine. The reverse slowdown curve calibration is already completed, so the motor drive cannot move back otherwise. When the reverse slowdown curve data file is completed before the forward calibration slowdown curve data file, this movement effected by block 207 would move the motor drive clear down to the minimum reference position to permit the restricted movement range to be available for successive desired forward calibration movements of the screwdown motor drive. For the purpose of completing the forward direction calibration operation, the error flag and the ready flag are set at 2 at block 209 for a situation less than a similar operation occurs.

At block 211, a determination is made to see if the move is able to be made, and if it is not the termination flag is set at block 197 and the program returns to the REVDO subroutine program. If the move is able to be made, a check is made at block 213 to see if forward movement was already attempted. If the forward movement was not attempted the program advances to block 210 to set the forward movement attempted flag and the ready flag equal to 1 at block 203 and return to the REVDO subroutine program. At block 217 the position of the screwdown motor drive is moved to the maximum reference position to permit the restricted movement range to be available for a plurality of calibration movements in the direction toward the minimum reference position. At block 219 the error flag is set, and the ready flag is set equal to 2, and the program returns to block 185 for the desired calibration movement of the screwdown motor drive to take place. In effect the POSTON subroutine program shown in FIG. 15 is provided to optimize the number of moves that are made for the desired calibration of the screwdown motor drive of the particular stand being calibrated. In effect the program is given a desired position reference and the movement of the screwdown motor drive is accomplished in accordance with this reference. Now the control of the operation of the motor drive returns to the REVDO subroutine program shown in FIG. 14. At block 231 a determination is made to see if the ready flag is set to zero, which means that the desired movement of the screwdown motor drive was accomplished. On the other hand, at block 231 if the ready flag is set equal to 1, it means that the opposite movement profile calibration will be operating to move the motor drive back in the desired position for calibration purposes, and a return is made to the distance optimization DSTOPT subroutine program shown in FIG. 3. If the ready flag at block 233 of FIG. 14 is set at 2, it means that the motor drive has been moved to one extreme or the other and a new reference is desired and another attempt should be made to position the screwdown motor drive for calibration purposes. For the situation at block 231 where the ready flag is set at zero, it indicates that the motor drive is positioned too close to the end to move, this is relative to one end or the other. But the other direction profile is not yet calibrated, so this probably will move the drive back into the intermediate position as desired. For the situation at block 233 where the ready flag is set equal to 2, it means that the other direction profile curve is already calibrated so therefore the motor drive should be moved to the opposite extreme position for continued calibration movement in accordance with the present profile curve being calibrated.

For block 231 where the ready flag is set at zero, this requires a calculation to determine whether the present motor drive position is the correct and desired position or is an error position. At block 235 a reading is made of the present position of the screwdown motor drive. At block 237 the actual error is determined in relation to the absolute difference between the present position and the desired or position reference position. This step is provided to determine how close the actual position of the screwdown motor drive is compared to the desired reference position. It should be remembered that an allowable error in the order of one bit, which could be one-tenth of an inch, may be provided and the determination at block 237 is to establish if the motor drive position is within the allowable error range. At block 239 a determination is made to see if the position error is greater than the allowable accuracy band. If the actual error is greater than this permitted accuracy, this indicates an overshoot or an undershoot has occurred and it is necessary to calibrate the position error point. If the error is not greater than the accuracy band, at block 241 the reverse try flag is decremented by 1 and the operation returns to the distance optimization DSTOPT program shown in FIG. 3. The operation provided at block of FIG. 14 is to determine the calibration attempts. By decrementing the try flag, if the try flag initially starts at 5 and is decremented by 1 each time the calibration procedure provided by the REVDO subroutine program is followed, after five reverse direction calibration tries the reverse try flag is now zero and further attempts to calibrate at this position error point are discontinued. If the actual error at block 239 is greater than the provided accuracy band, the program advances to block 243 to determine if the reverse accuracy flag has been set; this flag was set earlier in the program when the work on the accuracy point was undertaken. If the reverse accuracy flag is set, a definite error has occurred, and at block 245 a print out error message is provided to indicate an error in the position optimization routine, which is coded as ERR = 43. At block 247 the terminate calibration flag is set, and the program returns to the position optimization DSTOPT subroutine program. The normal operation of the REVDO subroutine program is such that after five tries to calibrate in the reverse movement direction of the screwdown motor drive for the present stand, the desired calibration is accomplished after this number of tries. The program advances to block 249 to establish a correction factor in accordance with 75 percent of the actual error plus 1 bit. The actual error determined at block 237 is in encoded bits; so if, for example, the error is 10 bits then 75 percent of 10 bits would be 7.5 bits plus 1 bit, and this would give a correction factor of 8.5 encoder bits. At block 251 the correction factor is subtracted from the present error point. Now a determination is made to see if an addition or a subtraction of this error should be made, depending upon the motor drive overshooting or undershooting of the position reference. The correction factor is either added or subtracted to the error point that is undergoing calibration depending upon overshooting or undershooting. At block 257 the reverse error is set equal to this error point, it should be remembered that the present position is calculated in accordance with present position plus an error plus an offset, this is now set to the new stored value. At block 259 the reverse try flag is set back to five, and a return is made to the distance optimization DSTOPT subroutine program shown in FIG. 3.

Figure 17:
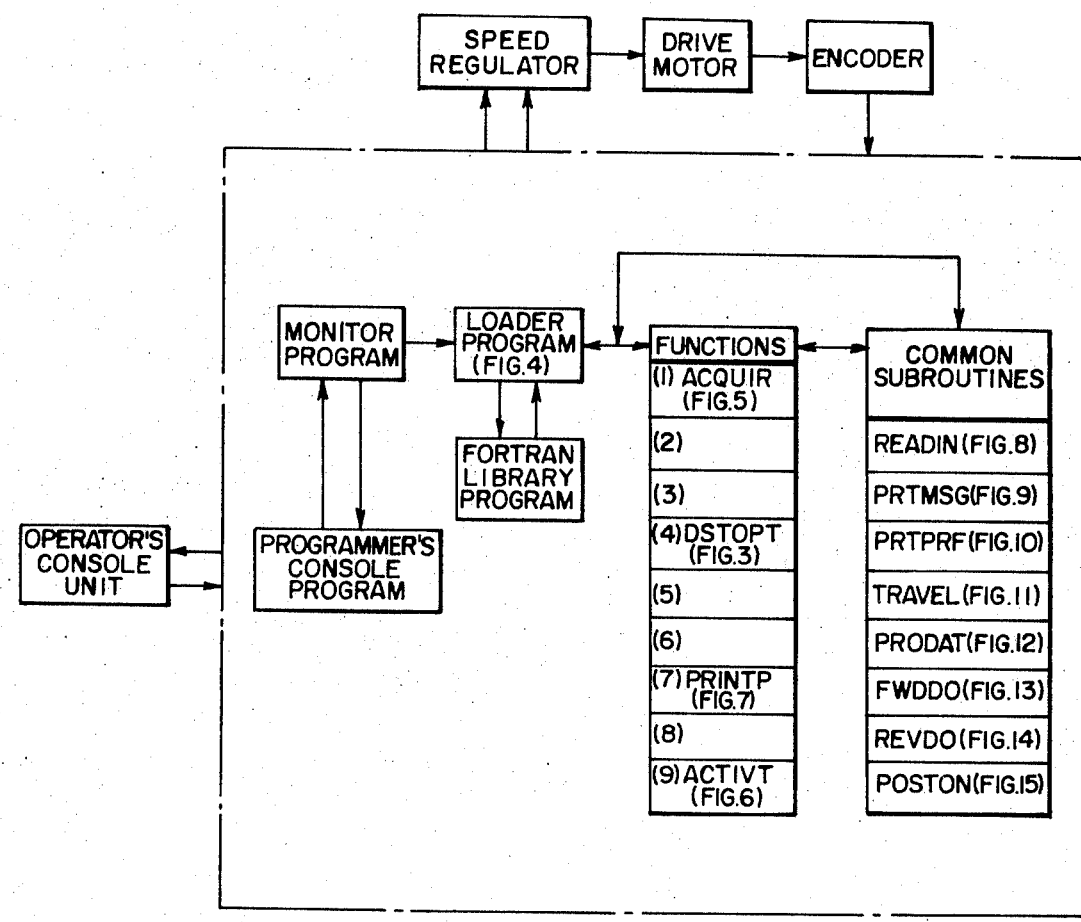
FIG. 17 is an illustrative showing of the slowdown profile calibration method and apparatus of the present invention with a control computer.

In general, and as shown in FIG. 17, the LOADER program is first initiated by the operator typing into the operator's console unit a command signal; for the distance optimization program, this signal would be 4, followed by the number of drive stand. This calls the distance optimization DSTOPT subroutine program to become operative as previously described. The distance optimization program, in its activity, in turn branches to any one of a plurality of common subroutines such as the TRAVEL subroutine, the REVDO and FWDDO subroutines and the like. The REVDO as well as the FWDDO subroutines calculate a position error point, and determine in relation to the present position of the screwdown motor drive the movement distance which must be undertaken for the purpose of calibrating the screwdown motor drive.

The LOADER program is the main task level program of the slowdown profile calibration package and through it all the available function programs and subroutine programs are initiated by the operator through request for drive and routine numbers and the like. The ACQUIR program is designed to transfer the desired position regulator drive data file into the calibration area, with the information needed for this purpose being the calibration area location and the table of starting addresses for the data files of the respective motor drive systems to be calibrated. The ACTIVT program is designed to transfer the data file contained within this calibration area to the previous operating storage area that it was obtained from. The PRINTP program is designed to print out the slowdown curves for each specified motor drive. The READIN program is used by the other programs as needed to input operator supplied information. The PRTMSG program is used by many of the other programs to output diagnostics and errors to the attention of the operator. The PRTPRF program is designed to output the slowdown curves contained within the calibration area. The TRAVEL program is designed to calculate the maximum error for the drive in the calibration area, including the maximum reference position and the minimum reference position. The PRODAT program is designed to locate the forward and reverse slowdown profiles for the drive in each calibration area, to determine the first and last point of each and set up curve pointers to point to the two locations past each minimum error or accuracy point in each curve. The DSTOPT program is designed to optimize the distance to travel between desired error points in each slowdown profile for defined speed points in the profile. The FWDDO and the REVDO programs are designed to modify the forward and reverse slowdown profile curves to optimize the distance to travel between error points for the speed patterns provided in the profiles; these programs are called from the DSTOPT program and each time they are entered they work on one position error point until it is completely calibrated and then proceed to the next position error point; when the forward and reverse profiles are completely calibrated for every position error point, these programs indicate this condition to the DSTOPT program. The POSTON program takes the provided reference position and moves the motor drive to that position.

In general the slowdown profile calibration control program package as here described is designed to aid in determining the optimum slowdown profile curve for a position regulated motor drive system, such as the screwdown motor drive for a particular rolling mill stand. The position regulated motor drive runs on a fixed time interval, such as one-tenth second, and is assumed to have a constant deceleration; the two variables in the slowdown profile curve then become the distance S and the speed V. Each position regulated motor drive can have a different characteristic mode of operation, and therefore can cause slight variations in the calibration requirements which cause different values of either the velocity or speed to be required. In general, it is desired that the motor drive is to be positioned in the minimum amount of time.

The distance optimization DSTOPT function program is operative such that the normal mode of calibration will be to input fixed or defined speed point values and then find the optimum distance error points which correspond to each of these defined speed point values.

Both constant and variable speed motors, having different forward and reverse speed characteristics, are included within position regulated motor drive systems. The selection of the speed setting to control the motor drive is determined by a slowdown profile curve table for each motor drive. This slowdown profile curve table is a table of distance yet to travel or position error points at which the speed must be reduced to effect a smooth and controlled slowdown operation and where at rest position the motor drive is within the prescribed accuracy band called the zero error position. The distance optimization DSTOPT function program is a means of optimizing these distances to travel, or position error points, to correspond to the defined speed points found in the speed portion of the slowdown profile curve. To find the optimum distance for each speed point setting, the following procedure is used, the initial slowdown profile is created so that for each speed point, except point zero, the position error is made equal to the total distance to travel. For point zero, the error is made equal to the accuracy of the system, and this accuracy is then tested to assure the distance error calibration is correct for point zero. To find the optimum distance error point one, corresponding to speed point one, the position error for the speed zero point is used to calibrate the speed point one. This results in an overshoot or undershoot in motor drive position before the motor drive is stopped, and the error point is corrected by three-quarters of the resulting error in position plus 1 bit. If the motor drive is similarly positioned N times, the overshoot is removed and the minimum distance error point is thereby found for a defined speed setting point. This calibration process is continued until all slowdown points are calibrated in both the forward and the reverse directions of the motor drive.

In FIG. 18 there is shown a general block diagram for a well known position regulated motor drive system, including a drive motor 300, the operation of which is controlled by a speed regulator 302 by varying the armature voltage applied to the drive motor 300. The shaft rotation of the drive motor 300 is applied to an encoder 304, where this shaft rotation is converted into a digital position signal which is supplied to a position controller 306. The position controller 306 receives the motor shaft rotation position signal as a feedback signal, and performs all the required logic to determine if the motor drive system actual position is the same as the desired reference position. The output speed control signal from the position controller 306 is fed to the speed regulator 302 in the form of (1) a current proportional to the speed desired for the case of a variable voltage screwdown motor drive or (2) a digital reference signal to control the speed for the case of a constant voltage drive. The speed regulator 302 receives the speed control signal from the position controller 306 proportional to the drive motor speed desired. The desired referenced position for the motor drive system is supplied to the position controller 306 from a source 308. The position controller 306 is operative to determine the resultant position error and then to select an operating speed of the drive motor which will be operative to correct this error. In this manner a controlled operation of the drive motor 300 is provided.

In general a position regulated motor drive is an apparatus operative to control the position of some device, such as one roll of a pair of rolls to determine the roll gap between the rolls of a rolling mill stand. Each device being actually positioned is given some accuracy or tolerance around the desired reference position, which is acceptable for the final actual position and which accuracy is referred to as the accuracy increment. And the zero error band which is acceptable is usually two times the accuracy increment, with the reference position being the center of the acceptable zero error band.

Figure 19:
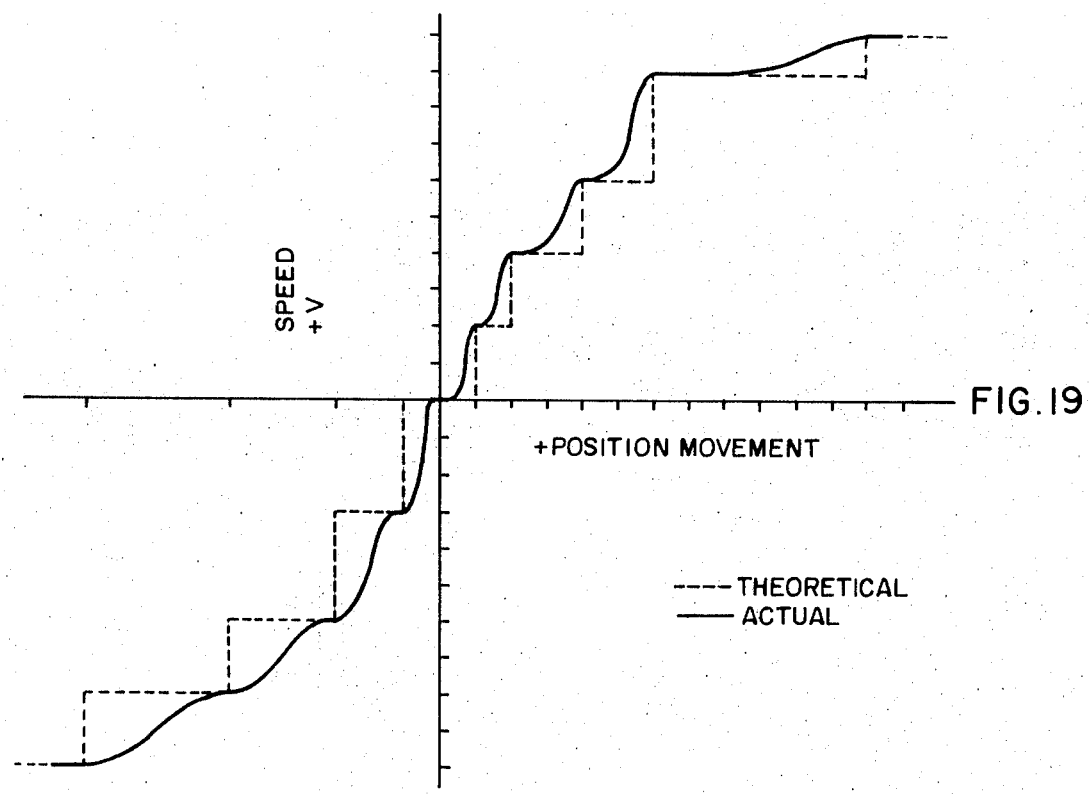
FIG. 19 is a curve illustrating the theoretical slowdown profile of a motor drive system, such as shown in FIG. 18, with the actual slowdown profile shown as a solid line of such a motor drive system in relation to the desired slowdown profile shown as a dotted line.

In FIG. 19 there is shown a typical prior art operating slowdown profile curve, including five slowdown speed points (V1 to V5) for the forward direction positioning. For the position error points greater than 12 increments, the motor drive will run at 100 percent of full speed, which is shown as speed point V5. For a position error point greater than 6 increments and less than 12 increments, the motor drive will run at 80 percent of full speed, which is speed point V4. For position error points greater than 4 increments and less than 6 increments, the motor drive will run at 60 percent of full speed, which is speed point V3. For position error points greater that 2 increments and less than 4 increments, the motor drive will run at 40 percent of full speed, which is speed point V2. For position errors greater than 1 increment and less than 2 increments, the motor drive will run at 20 percent of full speed, which is speed point V1. For position error points less than 1 increment, the motor drive will theoretically stop. Assuming a starting actual position error greater than 12 increments, the position controller 306 would send a speed control signal to the speed regulator 302 shown in FIG. 18 to raise the operating speed of the drive motor 300 to run at 100 percent of defined full speed. While this is being accomplished, the feedback signal from the encoder 304 is continuously scanned by the position controller 306. When a position error of 12 increments or less is reached, a speed control signal is sent to the speed regulator 302 to adjust the speed of the drive motor 300 to run at 80 percent of defined full speed. The theoretical slowdown operation of the drive motor 300, as far as the position controller 306 is concerned, could be shown by the dashed line shown in FIG. 19 because the drive motor will not take any action until a position error of 1 increment is reached. In practice the drive motor 300 will probably behave in accordance with the solid line shown in FIG. 19 since the slowdown operation is affected by the inertia of the motor drive system, friction in the system and the ability of the speed regulator 302 to respond to the change in speed control signal. For each slowdown position error point, a short period of substantially constant speed operation is provided after which the new speed control signal will become operative to change the speed of the drive motor; this same general operation is followed until the drive is stopped within the plus or minus one position error increment acceptance zero error band.

Figure 20:
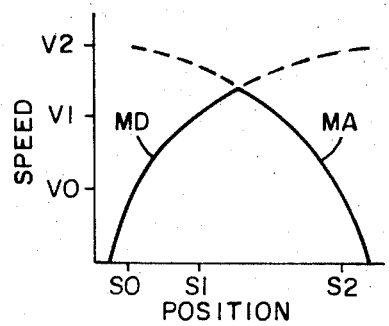
FIG. 20 illustrates the theoretical maximum acceleration followed by a maximum deceleration operation of a typical motor drive system.

FIG. 20 is an illustration of the maximum desired acceleration curve MA of a typical motor drive and the maximum desired deceleration curve MD for a position error movement greater than S2 in relation to the accuracy band −SO to +SO. It is desired that the motor drive, for any requested position movement, generally follow a similar pattern of movement for optimum operation in a minimum period of time. In relation to the more common requested position movements, in accordance with the teachings of the present invention, this pattern of movement is established.

Figure 21A:
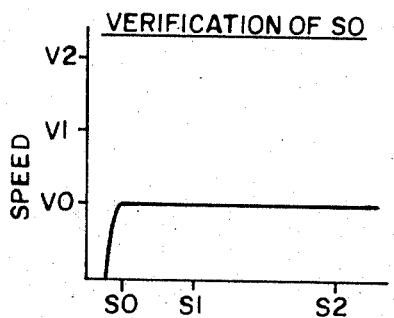
FIGS. 21A and 21B illustrate the verification of the positioning within the defined accuracy band.
Figure 21B:
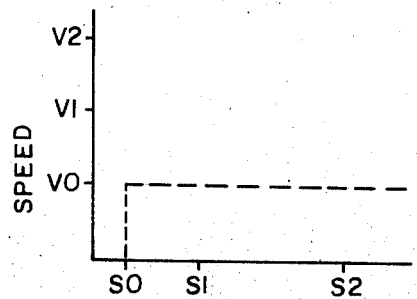

In FIG. 21 there is illustrated the verification of the accuracy band slowdown operation of the motor drive. When the motor drive is operating at defined speed point VO, to verify that, when the speed reference to the speed regulator operative with the drive motor of the motor drive system is changed to zero, the motor drive system will actually stop within the position accuracy band −SO to +SO, where SO is one-half the desired accuracy band. FIG. 21A shows the desired stopping position movement of the motor drive within the accuracy band, and FIG. 21B shows the speed reference signal supplied to the motor drive for this purpose.

Figure 22A:
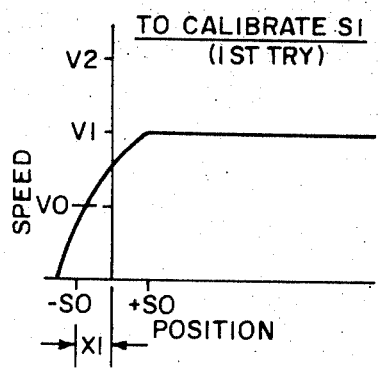
FIGS. 22A and 22B illustrate the first iteration calibration operation relative to a position error point S1.
Figure 22B:
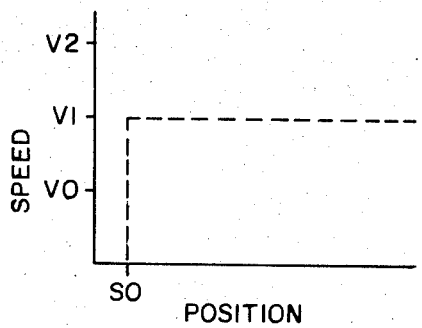

In FIG. 22A there is illustrated the calibration of a position error point S1, by running the motor drive at speed point V1 until the last previously calibrated position error point is reached. For the situation where S1 is being calibrated, the accuracy band position error point SO is employed for this purpose. As shown in FIG. 22B, the speed reference to the motor drive for all position error movement greater than SO is provided as V1, and then at position error point SO, the speed reference to the motor drive is changed to zero. As shown in FIG. 22A, if the motor drive overshoots by the distance Xi, the second calibration iteration for the motor drive relative to position error point S1 will now consist of stopping the motor drive at a new position error point S1 equal to SO + ¾ (X1) + 1 bit, with the latter 1 bit being added for the situation where an overshoot of about 1 bit occurs, such that three-quarters of 1 bit would be difficult to accomplish. This adds stability to the calibration operation here described.

Figure 23A:
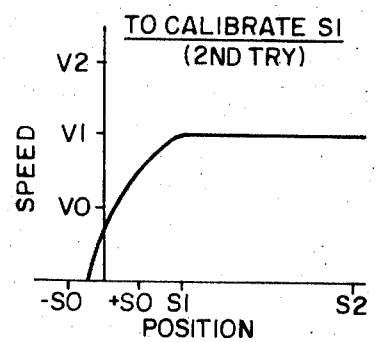
FIGS. 23A and 23B illustrate the second iteration calibration operation of the motor drive system relative to the position error point S1.
Figure 23B:
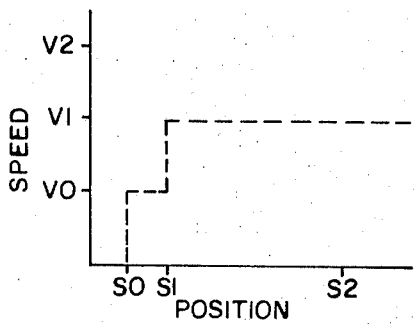

The motor drive for the second calibration iteration as shown in FIG. 23A is run at speed point V1 until the newly determined position error point S1 is reached, as shown in FIG. 23A, and the resulting position movement is now within the accuracy band. In FIG. 22B the speed reference to the motor drive is illustrated for the second calibration iteration.

The here described calibration iterations are repeated until no position overshoot or undershoot occurs. If desired the control program can include a predetermined number of verification operations for each calibrated position error point, after the calibration is completed with no overshoot or undershoot in the stopped position of the motor drive system.

Figure 24:
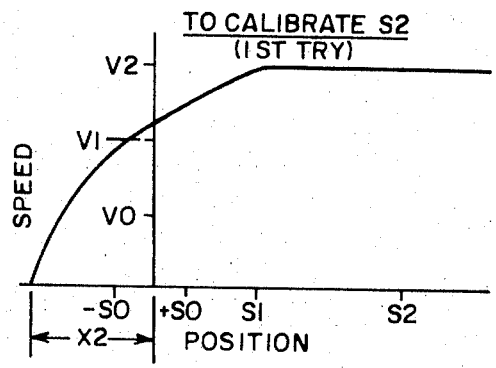
FIG. 24 illustrates the first iteration calibration operation relative to a position error point S2.
Figure 24:
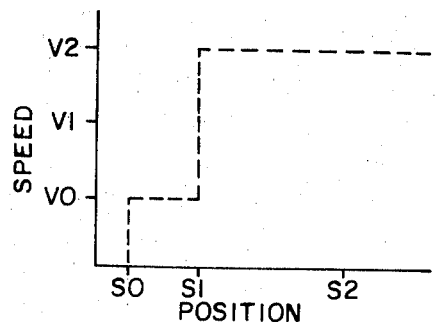

In FIG. 24A there is illustrated the first try effort to calibrate the position error point S2 relative to the defined speed point V2. The motor drive is here operated at speed reference V2, until the previously calibrated position error point S1 is reached, then the speed reference to the motor is changed to VO until the accuracy band position point SO is reached, after which the speed reference is changed to zero. In FIG. 24B the provision of the speed reference signals is illustrated. This operation will result in the overshoot X2 shown in FIG. 24A.

Figure 25:
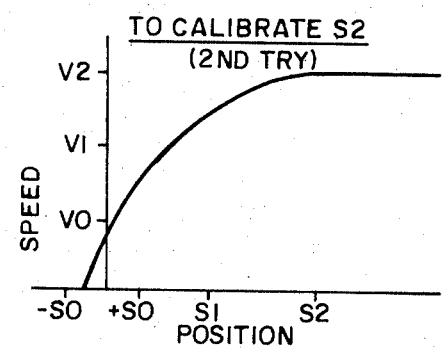
FIG. 25 illustrates the second iteration calibration operation relative to the position error point S2.
Figure 25:
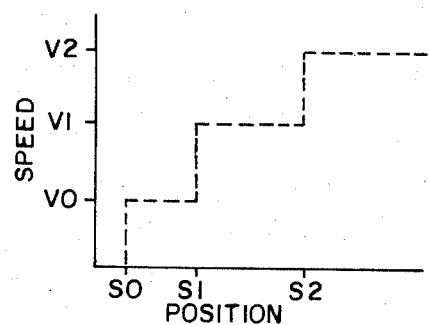

In FIG. 25A there is illustrated the second try to calibrate the position error point S2, with the so far calibrated position error point now being determined as S2 = S1 + ¾ (X2) + 1 bit. In FIG. 25B there is illustrated the second try provision of speed reference signals to the motor drive, with speed signal V2 now being provided with the so far calibrated position error point S2 is reached, then the speed signal V1 is provided until previously calibrated position error point S1 is reached, then VO is provided until the accuracy band position SO is reached, and then a zero speed signal is provided. As shown in FIG. 25A, the resulting slowdown profile position movement of the motor drive now operates to stop the motor drive within the acceptable accuracy band −SO to +SO.

In practice the predetermined slowdown profile curves for the position regulated motor drive for each stand are stored in the control computer in a drive data file table, for both the forward and the reverse directions, where forward is defined as increasing encoder reading and positive analog output. Therefore, to change any of the slowdown position error points or the corresponding speed setting points requires changing the value of the data that is stored in the drive data file table. In practice a programmed digital computer can be utilized as the position controller 306 to perform desired position regulation for a plurality of rolling mill stand screwdown motor drives. This is accomplished by time sharing the processing of the position feedback signals and the provided speed control signals between the respective motor drives.

When the distance optimization DSTOPT function program is run, using the defined speed points previously determined or provided, the optimization effects a correction to provide an improvement fine adjustment for the operation of each mill stand screwdown position regulated motor drive for the purpose of distance optimization.

The operator sitting at the console typewriter can initiate the present distance error point calibration operation by the input of a routine number and the drive number for a particular stand to be calibrated. The input/output typewriter within the operator's console unit is operative through the well known monitor program of the control computer to begin the operation of the LOADER program.

At block 401 of the LOADER program as shown in FIG. 4, this message is output to the operator's typewriter for the purpose of providing a check that the input message is correct. At block 403 the READIN subroutine program is called to read the operator provided message into the computer memory. At block 405 a check is made to see if this is an abort operation, and if it is, the program advances to exit 407. If the operator has typed in an abort signal, which in this case is an exclamation point, a space and a return, this input takes the operation of the control computer out of the present LOADER program, such as would occur when the operator desires to do something else with the control computer, other than run through the present LOADER program; a typical situation in this regard might be that the operator calls the LOADER program, and uses it for as long as he wishes and then terminates the operation of the LOADER program by the input of this abort signal. If the input is not an abort request, at block 409 a check is made to see if there occurred a format error, and if it is, at block 411 the message output PRTMSG subroutine program is called for the purpose of indicating the format error message IERR = 2. The program then returns to the beginning of the LOADER program at block 401.

In FIG. 9 the PRTMSG subroutine is started when it is called, by the block 411 in the LOADER program. The block 415 in the PRTMSG program outputs to the operator's typewriter the desired message, and a return is made to the calling program. After the operation of block 411 in the FIG. 4 LOADER program, the program operation returns to block 401 for the input of another routine number and drive number by the operator. In general, the provided error messages can be any of the 0 through 9, and each message is arbitrarily assigned a meaning such as in the case of the LOADER program IERR = 2 indicates a format error. The LOADER program then proceeds again through the already described portion of the flow chart shown in FIG. 4 until it arrives at block 417 where a determination is made to see if a valid routine number was provided. The operator when he is using the LOADER program has input a routine number, which is a 1 through 9 to select one of the designated function programs indicated to the right the LOADER program in FIG. 17. Only four of the function programs are needed for the purposes of the present invention. In addition, the operator identifies the particular stand motor drive to be calibrated by a two digit number. For example the operator would input a 1 followed by a comma and then two digits to indicate the particular stand motor drive of interest to be calibrated. Such an input message would identify the ACQUIR function program shown in block 419 in FIG. 4. At block 417 a check is made to see if the input message contains a valid routine number, and if not the program advances to block 421 where the PRTMSG subroutine program will output an error message ERR = 4 to the typewriter to indicate that an invalid routine number has been provided by the operator. At block 423 a check is made to see if a valid drive member has been provided by the operator, and if not the program advances to block 425 where the PRTMSG subroutine program will output to the typewriter the error message ERR = 3, which indicates to the operator that an invalid drive number has been provided. Assuming that at block 417 a valid routine number was found and that at block 423 a valid drive number was found, the program advances to block 427 which is a multiple branch to one of the designated function programs shown to the right in FIG. 4. In this way the same LOADER program is operative with the desired plurality of function programs. After the designated function program (such as ACQUIR) has been completed the operation returns to the beginning of the LOADER program, such that the LOADER program continues to operate in this manner until the operator provides an abort signal to be detected at block 405.

The ACQUIR function program routine shown in FIG. 5 goes out at block 431 and locates the desired data file for the particular motor drive specified by number in the input to the LOADER program, and at block 433 moves the data file into the calibration area operative with the present package of program routines. The old data file is not destroyed in relation to the original operating location area, but merely a duplicate of the data file in the original operating location is moved to the calibration area. At block 435 there are set needed common identifiers. This establishes the old address location and the new address location and things of this type. The program then advances to block 437 which is the PRTMSG subroutine program previously described relative to FIG. 9 that is called to output a message ERR = 10 which indicates that the data file has been properly moved to the calibration area as desired. The ACQUIR program then returns to the block 401 in the LOADER program and the operation of the LOADER program is repeated.

In relation to the LOADER program flow chart shown in FIG. 4 and the D2, D3, D5, D6 and D8 branch options to select function programs by the present invention, additional functions which might be provided by these options are not here needed and therefore these branch options provide a direct return to the beginning block 401 of the LOADER program.

In FIG. 7 there is shown the flow chart for the PRINTP function program, that is branched into through D7 in the LOADER program flow chart. The PRINTP function program prints out the slowdown curves for the particular motor drive being calibrated. The curves are stored in the calibration area and they are printed out by this program when desired by the operator. This will be generally in accordance with the initial slowdown profile for the particular motor drive to be calibrated as generally indicated by TABLE TWO which shows the initial distance error points established for the most usual operation of the particular motor drive, and corresponding predetermined motor drive points established in terms of percent of full speed operation for the motor drive for each of the designated distance error points to be calibrated. The PRINTP program routine can be used by the operator any time it is desired to see what the slowdown profile curves look like for a particular stand motor drive. The PRINTP program routine does not modify the established slowdown profile curves, but rather provides merely a printout for the benefit of the operator. The modification of the curves results from the operation of the distance optimization DSTOPT function program routine, and not from the PRINTP program as shown in FIG. 7.

It should be understood that the beginning of a slowdown profile curve calibration operation for a particular motor drive requires that the operator in advance establish as input data the desired initial distance error points and the desired values for the motor speed relationships or motor speed points corresponding to each of the respective distance error points, such as shown generally in TABLE TWO. This input data information is stored in the data file in the relationship of a first distance error point followed by the related speed point, a second distance error point followed by the related speed point, a third distance error point followed by the related speed point and so forth, until all of the designated distance error points and the corresponding motor speed points have been included in the data file; this data file arrangement is shown in TABLE FOUR. The last portion of the data file includes the accuracy band or the zero error band established as input data information. In TABLE FOUR there is shown an illustration of the data file for a typical stand motor drive in accordance with the down movement slowdown profile curve calibrated data shown in TABLE THREE.

In FIG. 7, the flow chart for the PRINTP program starts at block 441 and determines if the data file for the particular stand motor drive of interest is in the calibration area. This program locates the desired two slowdown profile curves for the particular stand motor drive of interest, one being in the forward direction of operation of the motor drive and the other being in the reverse direction of operation of the motor drive, and prints out the profile curves in relation to the distance error points and the speed points in percentage of full speed operation for the motor drive. In order to initiate the PRINTP program routine, the operator through his input/output typewriter will input the message 7, and the particular stand motor drive identification number. If the desired data file is not in the calibration area, at block 443 the PRTMSG program is called and types out the error message ERR = 70 to indicate that the desired data file is not in the calibration area of core storage, and the return takes the operation back to the beginning of the LOADER program as previously described. The ACQUIR function program is then utilized to acquire the desired data file into the calibration area, and the PRINTP program is again utilized to check that the right data file for the stand motor drive of interest is in the calibration area. When the data file for the motor drive of interest is in the calibration area, the program shown in FIG. 7 advances to block 445 for the PRODAT subroutine program previously described and then advances to the block 447 for the PRTPRF subroutine program previously described which provides an actual print out of the data files. The PRODAT routine locates desired portions in the data files in relation to parameters provided by the operator such as the beginning of the data files, the ending of the data files and so forth. The PRTPRF routine is the one that prints out the information shown in TABLE THREE attached at the end of the specification.

The LOADER program is the first level operation program which essentially controls the whole of the other desired functions required for the here described distance optimization of the motor drive slowdown profile curves in accordance with the teachings of the present invention. The common subroutine programs as shown in FIG. 17 can be considered common to the LOADER program as well as to the designated (1) through (9) function programs. In other words, to reach any of the function programs (1) through (9), the operator goes through the LOADER program, whereas the LOADER program can bypass the function programs (1) through (9) in the case of selected common subroutine programs, such as the READIN program and the PRTMSG program.

In FIG. 6 there is shown the ACTIVT function program in accordance with the PROGRAM LISTING THREE at the end of the specification. This program is called by the LOADER program by the (9) branch shown in FIG. 17, and is active after the distance optimization DSTOPT function program has calibrated the slowdown profile curves for both the forward and reverse direction for a particular stand motor drive of interest and the operator is satisfied with the calibrated slowdown curves and now desires to put them back into the operating storage area of the control computer system, out of the calibration area and into the operating area of core storage that is operative with the position regulated motor drive for the particular stand of interest. The ACTIVT program puts the calibrated data file into the motor drive data file operating area. The ACTIVT program flow chart shown in FIG. 6 starts a block 451 to check that the proper data file for the motor drive of interest is in fact in the calibration area. If it is not, the program goes to block 453 and calls the PRTMSG program to print out an error message ERR = 90 to indicate the wrong drive number was input, and the program returns to the beginning of the LOADER program. If the correct data file for the motor drive of interest is in the calibration area, the program advances to block 455 to determine if the length of the original data file is equal to the length of the now calibrated data file. In the distance optimization DSTOPT program operation, the length of the data file will not be modified and instead the individual distance error points in relation to the predetermined speed points will be modified. However, for other well known reasons such as including position anticipation locations or distances, for more quickly entering the workpiece back between the rolls after a given pass, the length of the data file may be increased, and in the event that the data file is now greater for some reason the program would advance to the block 457 to print out the error message ERR = 92 which indicates the lengths of the respective original and calibrated data files are not equal and a return is made to the beginning of the LOADER program. For the case of the distance optimization DSTOPT program routine, the lengths of the respective data files would be equal, so the program would advance to block 459 where the newly calibrated data file is now moved back into the old operating core storage area such that it becomes operative to control the operation of the position regulated motor drive for the particular stand of interest. The program advances to block 461 where a printout of the message ERR = 91 is made to indicate that no error exists and the newly calibrated data file is transferred to the original operating area and the transfer complete message is output and a return is again made to the beginning of the LOADER program.

The PROGRAM LISTING ELEVEN is a DATA program to input the necessary parameters for the operation of the other programs, for example how many times it is desired to try positioning a particular stand drive for the purpose of verification of the calibrated distance error points; this can be four or five times as may be desired by the operator. The DATA program is not a subroutine, but rather makes it unnecessary for the operator to sit at the console typewriter and input the desired parameter data in each of the locations where it would be.

The MONITOR program, the PROGRAMMER'S CONSOLE program and the FORTRAN LIBRARY programs as shown in FIG. 17 are per se well known to persons skilled in this particular art. In addition, an input/output typewriter is provided for the operator, as part of the OPERATOR'S CONSOLE UNIT, to input desired information into the computer system and to receive desired output information to provide operator communication with the computer system.

It is well known to persons skilled in this art that most control computer system software programs; such as the PROGRAM LISTINGS here attached, may be characterized with relatively minor faults or bugs which sometimes require long periods of operating time to detect. The correction of such faults is usually within the ordinary skill of experienced control computer programmers.

TABLE 1

| DOWN | | UP | |
|---|---|---|---|
| Distance Error Points | Motor Speed (% of full Speed) | Distance Error Points | Motor Speed (% of full Speed) |
| 0.01 | | 0.01 | |
| 0.25 | | 0.50 | |
| 0.75 | | 1.50 | |
| 1.75 | | 3.50 | |
| 2.75 | | 16.00 | |
| 20.00 | | 57.75 | |
| 57.75 | | | |

TABLE 2

| DOWN | | UP | |
|---|---|---|---|
| Distance Error Point | Motor Speed (% of full Speed) | Distance Error Point | Motor Speed (% of full Speed) |
| 0.01 | 5% | 0.01 | 5% |
| 0.25 | 10% | 0.50 | 10% |
| 0.75 | 10% | 1.50 | 15% |
| 1.75 | 20% | 3.50 | 35% |
| 2.75 | 30% | 16.00 | 60% |
| 20.00 | 60% | 57.75 | 100% |
| 57.75 | 100% | | |

TABLE 3

| DOWN | | UP | |
|---|---|---|---|
| Distance Error Point | Motor Speed (% of full Speed) | Distance Error Point | Motor Speed (% of full Speed) |
| 0.10 | 5% | 0.01 | 5% |
| 0.22 | 10% | 0.45 | 10% |
| 0.71 | 15% | 1.41 | 15% |
| 1.68 | 20% | 3.27 | 35% |
| 2.65 | 30% | 15.19 | 60% |
| 19.70 | 60% | 57.75 | 100% |
| 57.75 | | | |

TABLE 4

| First Error Point | 0.10 |
|---|---|
| First Speed Point | 5% |
| Second Error Point | 0.22 |
| Second Speed Point | 10% |
| Third Error Point | 0.71 |
| Third Speed Point | 15% |
| Fourth Error Point | 1.68 |
| Fourth Speed Point | 20% |
| Last Error Point | 57.75 |
| Last Speed Point | 100% |
| Accuracy Band | 0.10 |

PROGRAM LISTING ONE

```
0001:  C  00716   R.E.SHARPLESS    SLOWDOWN CALIBRA0965  79679
0002:  C
0003:  C                  LOADER PROGRAM
0004:  C
0005:        COMMON       /I:LO/I:LO  /IERR/IERR  /LOCEXC/LOCEXC
0006:      X              /INBUF/INBUF(156)  /IROTNM/IROTNM /ICOMMA/ICOMMA
0007:      X              /IREGNM/IREGNM  /LOCEND/LOCEND /NUMREG/NUMREG
0008:  C
0009:  C                  REQUEST OPERATOR INPUT
0010:  C
0011:   20   WRITE (I:LO,1)
       0000  0000                       DAT   X'0000'
       0001  0AFF   08 2 FF             LDB   $+X'EFFF'
       0002  1200   10 2 00       )20   LDC   $+X'0000'
       0003  1E00   18 6 00             LDG   I:LO,C
       0004  EDF4   E8 5 F4             SST   *WRF:,B
       0005  0000                       DAT   X'0000'
       0006  EDF6   E8 5 F6             SST   *NDF:,B
0012:  1    FORMAT (' INPUT ROUTINE NUMBER AND DRIVE NUMBER'//)
       0001+B 3001                 )1
       0002+B 0026
       0003+B A0C9
```

```
     0004+B   4E50
     0005+B   55D4
     0006+B   A0D2
     0007+B   CF55
     0008+B   D4C9
     0009+B   4EC5
     000A+B   A04E
     000B+B   554D
     000C+B   42C5
     000D+B   D2A0
     000E+B   414E
     000F+B   44A0
     0010+B   44D2
     0011+B   C956
     0012+B   C5A0
     0013+B   4E55
     0014+B   4D42
     0015+B   C5D2
     0016+B   1001
     0017+B   1001
     0018+B   2001
0013: C
0014: C                 READ IN OPERATOR INPUT
0015: C
0016:         CALL READIN
0017: C
0018: C                 CHECK FOR FORMAT ERROR OR AN ABORT
0019: C
     0007     EF00  E8 7 00        SST    *READIN,B
0020:         GO TO (4,2,9999),IERR
     0008     EF00  E8 7 00        SST    *GOT:,B
     0009     0004                 DAT    X'0004'
     000A     0000                 ADL    )4
     000B     0000                 ADL    )2
     000C     0000                 ADL    )9999
0021: C
0022: C                 FORMAT ERROR
0023: C
     000D     8019                 ADL    IERR
0024:  2      IERR=2
0025:         CALL PRTMSG
     001A+B   0002
     000E     2C1A  28 4 1A        LDA    *X'0002',B
     000F     1200  10 2 00        LDC    $+X'0000'
     0010     AE00  A8 6 00        STA    IERR,C
     0011     EF00  E8 7 00        SST    *PRTMSG,B
0026:         GO TO 20
0027: C
0028: C                 EXIT PROGRAM
0029: C
     0012     72EF  70 2 EF        JMP    )20
0030: 9999    CONTINUE
0031:         CALL EXIT
     0013     EDE7  E8 5 E7        SST    *EXIT,B
0032:         GO TO 20
0033: C
0034: C                 PICK UP ROUTINE NUMBER
0035: C
     0014     72ED  70 2 ED        JMP    )20
0036:  4      LOCEXC=LOCEXC+1
0037:         IROTNM=INBUF(LOCEXC)-48
0038:         IF(IROTNM.LT.1) GO TO 50
     0015     1200  10 2 00        LDC    $+X'0000'
     0016     6600  60 6 00        INC    LOCEXC,C
     0017     2E00  28 6 00        LDA    LOCEXC,C
     0018     4200  40 2 00        ADD    *X'FFFF'
     0019     AC1B  A8 4 1B        STA    #AIA,B
     001A     2D1B  28 5 1B        LDA    *#AIA,B
     001C+B   0030
     001B     4C1C  48 4 1C        SUB    *X'0030',B
```

```
       001C    1200  10 2 00           LDC    $+X'0000'
       001D    AE00  A8 6 00           STA    IROTNM,C
       001E    6805  68 0 05           DCR    X'0005'
       001F    B200  B0 2 00           PJP    $+X'0000'
       0020    751D  70 5 1D           JMP    *)50 ,B
0039:          IF(IROTNM.GT.9) GO TO 50
       0021    1205  10 2 05           LDC    $+X'0005'
       0022    2E00  28 6 00           LDA    IROTNM,C
       001F+B  0009
       0023    4C1E  48 4 1E           SUB    =X'0009' ,B
       0024    F200  F0 2 00           ZJP    $+X'0000'
       0025    BA01  B8 2 01           NJP    $+X'0001'
0040: C
0041: C                     CHECK FOR A COMMA
0042: C
       0026    751D  70 5 1D           JMP    *)50 ,B
0043:          LOCEXC=LOCEXC+1
0044:          IF (INBUF(LOCEXC).NE.ICOMMA) GO TO 2
       0027    1212  10 2 12           LDC    $+X'0012'
       0028    6600  60 6 00           INC    LOCEXC,C
       0029    2E00  28 6 00           LDA    LOCEXC,C
       002A    4212  40 2 12           ADD    =X'FFFF'
       002B    AC1B  A8 4 1B           STA    #AIA,B
       002C    2D1B  28 5 1B           LDA    *#AIA,B
       002D    1200  10 2 00           LDC    $+X'0000'
       002E    4E00  48 6 00           SUB    ICOMMA,C
       002F    F200  F0 2 00           ZJP    $+X'0000'
0045: C
0046: C                     PICK UP REGULATOR NUMBER
0047: C
       0030    72DD  70 2 DD           JMP    )2
0048:          LOCEXC=LOCEXC+1
0049:          IREGNM=INBUF(LOCEXC)-48
0050:          IF(IREGNM.LT.0) GO TO 40
       0031    120A  10 2 0A           LDC    $+X'000A'
       0032    6600  60 6 00           INC    LOCEXC,C
       0033    2E00  28 6 00           LDA    LOCEXC,C
       0034    420A  40 2 0A           ADD    =X'FFFF'
       0035    AC1B  A8 4 1B           STA    #AIA,B
       0036    2D1B  28 5 1B           LDA    *#AIA,B
       0037    4C1C  48 4 1C           SUB    =X'0030' ,B
       0038    1200  10 2 00           LDC    $+X'0000'
       0039    AE00  A8 6 00           STA    IREGNM,C
       003A    B200  B0 2 00           PJP    $+X'0000'
       003B    751F  70 5 1F           JMP    *)40 ,B
0051:          IF(IREGNM.GT.9) GO TO 40
       003C    1204  10 2 04           LDC    $+X'0004'
       003D    2E00  28 6 00           LDA    IREGNM,C
       003E    4C1E  48 4 1E           SUB    =X'0009' ,B
       003F    F200  F0 2 00           ZJP    $+X'0000'
       0040    BA01  B8 2 01           NJP    $+X'0001'
0052: C
0053: C              CHECK FOR A TWO DIGIT REGULATOR NUMBER
0054: C
       0041    751F  70 5 1F           JMP    *)40 ,B
0055:          IF(LOCEXC.EQ.LOCEND) GO TO 60
       0042    1211  10 2 11           LDC    $+X'0011'
       0043    2E00  28 6 00           LDA    LOCEXC,C
       0044    1200  10 2 00           LDC    $+X'0000'
       0045    4E00  48 6 00           SUB    LOCEND,C
       0046    F201  F0 2 01           ZJP    $+X'0001'
       0047    7200  70 2 00           JMP    $+X'0000'
       0048    7520  70 5 20           JMP    *)60 ,B
0056:          LOCEXC=LOCEXC+1
0057:          IREGNM=(IREGNM*10)+(INBUF(LOCEXC)-48)
0058: C
0059: C                     CHECK FOR A FORMAT ERROR
0060: C
0061:          IF(LOCEXC.NE.LOCEND) GO TO 2
       0049    1207  10 2 07           LDC    $+X'0007'
```

|      |      |          |         |     |              |
|------|------|----------|---------|-----|--------------|
| 004A | 6600 | 60 6 00  |         | INC | LOCEXC,C     |
| 004B | 2E00 | 28 6 00  |         | LDA | LOCEXC,C     |
| 004C | 4218 | 40 2 18  |         | ADD | =X'FFFF'     |
| 004D | AC1B | A8 4 1B  |         | STA | #AIA,B       |
| 004E | 2D1B | 28 5 1B  |         | LDA | *#AIA,B      |
| 004F | 4C1C | 48 4 1C  |         | SUB | =X'0030',B   |
| 0050 | AC21 | A8 4 21  |         | STA | #AIB,B       |
| 0051 | 1215 | 10 2 15  |         | LDC | $+X'0015'    |
| 0052 | 2E00 | 28 6 00  |         | LDA | IREGNM,C     |
| 0022+B | 000A |        |         |     |              |
| 0053 | D422 | D0 4 22  |         | MPY | =X'000A',B   |
| 0054 | 4421 | 40 4 21  |         | ADD | #AIB,B       |
| 0055 | AE00 | A8 6 00  |         | STA | IREGNM,C     |
| 0056 | 7200 | 70 2 00  |         | JMP | $+X'0000'    |
| 0057 | 0000 |          |         | DAT | X'0000'      |
| 0058 | 0000 |          |         | DAT | X'0000'      |
| 0059 | 0000 |          |         | DAT | X'0000'      |
| 005A | 0000 |          |         | DAT | X'0000'      |
| 005B | 0000 |          |         | DAT | X'0000'      |
| 005C | 0000 |          |         | DAT | X'0000'      |
| 005D | FFFF |          |         | DAT | X'FFFF'      |
| 005E | 0000 |          |         | DAT | X'0000'      |
| 005F | 0000 |          |         | DAT | X'0000'      |
| 0060 | 0000 |          |         | DAT | X'0000'      |
| 0061 | 0000 |          |         | DAT | X'0000'      |
| 0062 | 12FA | 10 2 FA  |         | LDC | $+X'FFFA'    |
| 0063 | 2E00 | 28 6 00  |         | LDA | LOCEXC,C     |
| 0064 | 12FD | 10 2 FD  |         | LDC | $+X'FFFD'    |
| 0065 | 4E00 | 48 6 00  |         | SUB | LOCEND,C     |
| 0066 | F200 | F0 2 00  |         | ZJP | $+X'0000'    |

0062: C
0063: C                CHECK FOR A VALID REGULATOR NUMBER
0064: C

|      |      |          |         |     |              |
|------|------|----------|---------|-----|--------------|
| 0067 | 72A6 | 70 2 A6  |         | JMP | )2           |

0065:   60   IF(IREGNM.LT.0) GO TO 40

|      |      |          |         |     |              |
|------|------|----------|---------|-----|--------------|
| 0068 | 12F8 | 10 2 F8  | )60     | LDC | $+X'FFF8'    |
| 0069 | 2E00 | 28 6 00  |         | LDA | IREGNM,C     |
| 006A | B200 | B0 2 00  |         | PJP | $+X'0000'    |
| 006B | 751F | 70 5 1F  |         | JMP | *)40,B       |

0066:        IF(IREGNM.GT.NUMREG) GO TO 40

|      |      |          |         |     |              |
|------|------|----------|---------|-----|--------------|
| 006C | 12F4 | 10 2 F4  |         | LDC | $+X'FFF4'    |
| 006D | 2E00 | 28 6 00  |         | LDA | IREGNM,C     |
| 006E | 1200 | 10 2 00  |         | LDC | $+X'0000'    |
| 006F | 4E00 | 48 6 00  |         | SUB | NUMREG,C     |
| 0070 | F200 | F0 2 00  |         | ZJP | $+X'0000'    |
| 0071 | BA01 | B8 2 01  |         | NJP | $+X'0001'    |

0067: C
0068: C                BRANCH TO REQUESTED ROUTINE
0069: C

|      |      |          |         |     |              |
|------|------|----------|---------|-----|--------------|
| 0072 | 751F | 70 5 1F  |         | JMP | *)40,B       |

0070:        GO TO (100,200,300,400,500,600,700,800,900),IROTNM

|      |      |          |         |     |              |
|------|------|----------|---------|-----|--------------|
| 0073 | EFE6 | E8 7 E6  |         | SST | *GOT:,B      |
| 0074 | 000A |          |         | DAT | X'000A'      |
| 0075 | 0000 |          |         | ADL | )100         |
| 0076 | 0000 |          |         | ADL | )200         |
| 0077 | 0000 |          |         | ADL | )300         |
| 0078 | 0000 |          |         | ADL | )400         |
| 0079 | 0000 |          |         | ADL | )500         |
| 007A | 0000 |          |         | ADL | )600         |
| 007B | 0000 |          |         | ADL | )700         |
| 007C | 0000 |          |         | ADL | )800         |
| 007D | 0000 |          |         | ADL | )900         |
| 007E | 8023 |          |         | ADL | IROTNM       |

0071:   100  CALL ACQUIR

|      |      |          |         |     |              |
|------|------|----------|---------|-----|--------------|
| 007F | EF00 | E8 7 00  | )100    | SST | *ACQUIR,B    |

0072:        GO TO 20

|      |      |          |         |     |              |
|------|------|----------|---------|-----|--------------|
| 0080 | 7281 | 70 2 81  |         | JMP | )20          |

0073:   200  CALL INTVER

|      |      |          |         |     |              |
|------|------|----------|---------|-----|--------------|
| 0081 | FF00 | E8 7 00  | )200    | SST | *INTVER,B    |

0074:        GO TO 20

```
0082    7524  70 5 24              JMP   *)20 ,B
0075:  300    CALL SPDOPT
0083    EF00  E8 7 00    )300      SST   *SPDOPT,B
0076:          GO TO 20
0084    7524  70 5 24              JMP   *)20 ,B
0077:  400    CALL DSTOPT
0085    FF00  E8 7 00    )400      SST   *DSTOPT,B
0078:          GO TO 20
0086    7524  70 5 24              JMP   *)20 ,B
0079:  500    CALL ONEDRT
0087    EF00  E8 7 00    )500      SST   *ONEDRT,B
0080:          GO TO 20
0088    7524  70 5 24              JMP   *)20 ,B
0081:  600    CALL ANTPNT
0089    EF00  E8 7 00    )600      SST   *ANTPNT,B
0082:          GO TO 20
008A    7524  70 5 24              JMP   *)20 ,B
0083:  700    CALL PRINTP
008B    EF00  E8 7 00    )700      SST   *PRINTP,B
0084:          GO TO 20
008C    7524  70 5 24              JMP   *)20 ,B
0085:  800    CALL PUNCHP
008D    EF00  E8 7 00    )800      SST   *PUNCHP,B
0086:          GO TO 20
008E    7524  70 5 24              JMP   *)20 ,B
0087:  900    CALL ACTIVT
008F    EF00  E8 7 00    )900      SST   *ACTIVT,B
0088:          GO TO 20
0089:  C
0090:  C                  INVALID REGULATOR NUMBER
0091:  C
0090    7524  70 5 24              JMP   *)20 ,B
0092:   40    IERR=3
0093:          CALL PRTMSG
   0025+B    0003
0091    2C25  28 4 25              LDA   =X'0003' ,B
0092    12C8  10 2 C8              LDC   $+X'FFC8'
0093    AE00  A8 6 00              STA   IERR,C
0094    EFC7  E8 7 C7              SST   *PRTMSG,B
0094:          GO TO 20
0095:  C
0096:  C                  INVALID ROUTINE NUMBER
0097:  C
0095    7524  70 5 24              JMP   *)20 ,B
0098:   50    IERR=4
0099:          CALL PRTMSG
   0026+B    0004
0096    2C26  28 4 26              LDA   =X'0004' ,B
0097    12C3  10 2 C3              LDC   $+X'FFC3'
0098    AE00  A8 6 00              STA   IERR,C
0099    EFC2  E8 7 C2              SST   *PRTMSG,B
0100:          GO TO 20
009A    7524  70 5 24              JMP   *)20 ,B
0101:          END

LPL
009B    7200  70 2 00              JMP   $+X'0030'
009C    0000                       DAT   X'0000'

009E    0000                       DAT   X'0000'
009F    0000                       DAT   X'0000'
00A0    0000                       DAT   X'0000'
00A1    0000                       DAT   X'0000'
00A2    0000                       DAT   X'0000'
00A3    0000                       DAT   X'0000'
00A4    0000                       DAT   X'0000'
00A5    0000                       DAT   X'0000'
0000    00AC                       ADL   X'00AC'
   EXT EXIT
   EXT WRF:
```

```
     EXT NDF:
     VAR I:LO    0000 IN I:LO
     VAR IERR    0000 IN IERR
     VAR LOCEXC  0000 IN LOCEXC
     ARR INBUF   0000 IN INBUF
     VAR IROTNM  0000 IN IROTNM
     VAR ICOMMA  0000 IN ICOMMA
     VAR IREGNM  0000 IN IREGNM
     VAR LOCEND  0000 IN LOCEND
     VAR NUMREG  0000 IN NUMREG
     EXT READIN
     EXT GOT:
     EXT PRTMSG
     VAR #AIA    001B IN DP
     VAR #ACQIR  0021 IN DP

EXT INTVER
     EXT SPDOPT
     EXT DSTOPT
     EXT ONEDRT
     EXT ANTPNT
     EXT PRINTP
     EXT PUNCHP
     EXT ACTIVT
PROGRAM SIZE:  0172    DATA POOL SIZE: 0039    ERROR COUNT:  0000
```

PROGRAM LISTING TWO

```
0001: C      00716 R.E. SHARPLESS  SLOWDOWN CALIBRATION PROGRAM
0002:        SUBROUTINE ACQUIR
0003: C
0004: C      THIS ROUTINE IS REQUESTED BY A ONE IN THE ROUTINE
0005: C      NUMBER INPUT BY THE OPERATOR.
0006: C      THE FILE FOR THE REGULATOR WILL BE TRANSFERRED FROM THE
0007: C      POSITION REGULATOR PROGRAM TO A WORK AREA IN THE
0008: C      SLOWDOWN CALIBRATION PROGRAM.
0009: C
0010: C
0011:        COMMON/LOCDRF/LOCDRF /IREGNM/IREGNM /IOLDAD/IOLDAD
0012:     X         /INSAVE/INSAVE /INFILE/INFILE(256) /INREG/INREG
0013:     X         /IERR/IERR
0014: C
0015: C                PICK UP FILE
0016: C
0017:        LOCFIL=LOCDRF-IREGNM
       0000  0000                      DAT    X'0000'
       0001  0000                      DAT    X'0000'
       0002  2801    28 0 01            LDA    X'0001'
       0003  0AFE    08 2 FE            LDB    $+X'FFFE'
       0004  AC01    A8 4 01            STA    X'0001',B
0018:        IOLDAD=LOCFIL
0019: S      LDA          *LOCFIL
       0005  1200    10 2 00            LDC    $+X'0000'
       0006  2E00    28 6 00            LDA    LOCDRF,C
       0007  1200    10 2 00            LDC    $+X'0000'
       0008  4E00    48 6 00            SUB    IREGNM,C
       0009  AC02    A8 4 02            STA    LOCFIL,B
       000A  1200    10 2 00            LDC    $+X'0000'
       000B  AE00    A8 6 00            STA    IOLDAD,C
       000C  2D02    28 5 02            LDA    *LOCFIL,B
0020: S      STA          INSAVE
       000D  1200    10 2 00            LDC    $+X'0000'
       000E  AE00    A8 6 00            STA    INSAVE,C
0021: S      STA          LOCFIL
       000F  AC02    A8 4 02            STA    LOCFIL,B
0022: S      LDA          *LOCFIL
       0010  2D02    28 5 02            LDA    *LOCFIL,B
0023: S      STA          INDEX
       0011  AC03    A8 4 03            STA    INDEX,B
0024:        DO 10 I=1,INDEX
     0005+B  0001
       0012  2C05    28 4 05            LDA    *X'0001',B
```

```
        0013    AC04    A8 4 04              STA    I ,B
0025: S         LDA             *LOCFIL
        0014    2D02    28 5 02              LDA    *LOCFIL,B
0026: S         STA             IWORK
        0015    AC06    A8 4 06              STA    IWORK ,B
0027:           INFILE(I)=IWORK
        0016    2C04    28 4 04              LDA    I ,B
        0017    4200    40 2 00              ADD    =X'FFFF'
        0018    AC07    A8 4 07              STA    #AIA,B
        0019    2C06    28 4 06              LDA    IWORK ,B
        001A    AD07    A8 5 07              STA    **#AIA,B
0028:   10      LOCFIL=LOCFIL+1
0029: C
0030: C                 SET REGULATOR NUMBER FOR REGULATOR NOW IN SYSTEM
0031: C
        001B    6402    60 4 02              INC    LOCFIL,B
        001C    6404    60 4 04              INC    I ,B
        001D    2C03    28 4 03              LDA    INDEX ,B
        001E    4C04    48 4 04              SUB    I ,B
        001F    B2F4    B0 2 F4              PJP    S+X'FFF4'
0032:           INREG=IREGNM
0033: C
0034: C                 OUTPUT MOVE COMPLETE MESSAGE
0035: C
0036:           IERR=10
0037:           CALL PRTMSG
        0020    1219    10 2 19              LDC    S+X'0019'
        0021    2E00    28 6 00              LDA    IREGNM,C
        0022    1200    10 2 00              LDC    S+X'0000'
        0023    AE00    A8 6 00              STA    INREG ,C
        0008+B  000A
        0024    2C08    28 4 08              LDA    =X'000A' ,B
        0025    1200    10 2 00              LDC    S+X'0000'
        0026    AE00    A8 6 00              STA    IERR,C
        0027    EF00    E8 7 00              SST    *PRTMSG,B
0038:           RETURN
        0028    0C01    08 4 01              LDB    X'0001' ,B
        0029    E401    E0 4 01              EST    X'0001' ,B
0039:           END
                                      LPL
        002A    7200    70 2 00              JMP    S+X'0000'
        002B    0000                         DAT    X'0000'
        002C    0000                         DAT    X'0000'
        002D    0000                         DAT    X'0000'
        002E    0000                         DAT    X'0000'
        002F    FFFF                         DAT    X'FFFF'
        0030    0000                         DAT    X'0000'
        0031    0000                         DAT    X'0000'
        0032    0000                         DAT    X'0000'
        0001    0039                         ADL    X'0039'
        VAR LOCDRF    0000 IN LOCDRF
        VAR IREGNM    0000 IN IREGNM
        VAR IOLDAD    0000 IN IOLDAD
        VAR INSAVE    0000 IN INSAVE
        ARR INFILE    0000 IN INFILE
        VAR INREG     0000 IN INREG
        VAR IERR      0000 IN IERR
        VAR LOCFIL    0002 IN DP
        VAR INDEX     0003 IN DP
        VAR I         0004 IN DP
        VAR IWORK     0006 IN DP
        VAR #AIA      0007 IN DP
        EXT PRTMSG
     PROGRAM SIZE: 0057    DATA POOL SIZE: 0009    ERROR COUNT: 0000
```

PROGRAM LISTING THREE

```
    0001: C   00716 R.E. SHARPLESS SLOWDOWN CALIBRATION PROGRAM
    0002:         SUBROUTINE ACTIVT
```

```
0003: C
0004: C      THIS SUBROUTINE IS REQUESTED BY A 9 IN
0005: C      THE ROUTINE NUMBER INPUT BY THE OPERATOR.
0006: C      THE ROUTINE WILL TRANSFER THE FILE IN THE
0007: C      CALIBRATION AREA INTO THE AREA OCCUPIED BY
0008: C      THE OLD FILE IF BOTH ARE THE SAME SIZE. IF
0009: C      BOTH AREN'T THE SAME SIZE. THE ROUTINE WILL
0010: C      SEARCH CORE FOR A BLANK AREA TO TRANSFER THE
0011: C      FILE INTO AND THEN MODIFY THE FILE POINTER
0012: C      IN THE POSITION REGULATOR PACKAGE TO POINT
0013: C      TO THE NEW FILE AREA. IF NO AREA IS AVAIBLE
0014: C      TO TRANSFER THE FILE A MESSAGE WILL BE OUTPUT
0015: C      INDICATING THIS CONDITION.
0016: C
0017:        COMMON/INFILE/INFILE(256)/INREG/INREG/IERR/IERR
0018:     X      /IREGNM/IREGNM /INSAVE/INSAVE
0019:        EQUIVALENCE (INFILE(1),ISIZE)
0020: C
0021: C      CHECK FOR CORRECT FILE IN CALIBRATION AREA
0022: C
0023:        IF(INREG.EQ.IREGNM ) GO TO 910
    0000    0000                      DAT    X'0000'
    0001    0000                      DAT    X'0000'
    0002    2801    28 0 01           LDA    X'0001'
    0003    0AFE    08 2 FE           LDB    $+X'FFFE'
    0004    AC01    A8 4 01           STA    X'0001' ,B
    0005    1200    10 2 00           LDC    $+X'0000'
    0006    2E00    28 6 00           LDA    INREG ,C
    0007    1200    10 2 00           LDC    $+X'0000'
    0008    4E00    48 6 00           SUB    IREGNM,C
    0009    F201    F0 2 01           ZJP    $+X'0001'
    000A    7200    70 2 00           JMP    $+X'0000'
0024: C
0025: C      WRONG REGULATOR NUMBER
0026: C
    000B    7502    70 5 02           JMP    *)910,B
0027:        IERR=90
0028:        CALL PRTMSG
    0003+B  005A
    000C    2C03    28 4 03           LDA    =X'005A' ,B
    000D    1200    10 2 00           LDC    $+X'0000'
    000E    4E00    A8 6 00           STA    IERR,C
    000F    EF00    E8 7 00           SST    *PRTMSG,B
0029:        RETURN
0030: C
0031: C      CORRECT FILE - CHECK LENGTHS
0032: C
    0010    0C01    08 4 01           LDB    X'0001' ,B
    0011    E401    E0 4 01           EST    X'0001' ,B
0033: S910   LDA    *INSAVE
    0012    1200    10 2 00    )910   LDC    $+X'0000'
    0013    2F00    28 7 00           LDA    *INSAVE,C
0034: S      STA    ITEMP
    0014    AC04    A8 4 04           STA    ITEMP ,B
0035:        IF (ITEMP.NE.ISIZE) GO TO 950
    0015    1200    10 2 00           LDC    $+X'0000'
    0016    2E00    28 6 00           LDA    ISIZE ,C
    0017    4C04    48 4 04           SUB    ITEMP ,B
    0018    F200    F0 2 00           ZJP    $+X'0000'
0036: C
0037: C      FILES SAME SIZE - MOVE NEW FILE INTO OLD FILE AREA
0038: C
    0019    7505    70 5 05           JMP    *)950,B
0039:        K=INSAVE
0040:        DO 920 I=1,ISIZE
    001A    1208    10 2 08           LDC    $+X'0008'
    001B    2E00    28 6 00           LDA    INSAVE,C
    001C    AC06    A8 4 06           STA    K ,B
    0008+B  0001
    001D    2C08    28 4 08           LDA    =X'0001' ,B
```

```
         001E    AC07   A8 4 07           STA    I ,B
0041:           ITEMP=INFILE(I)
0042: S         LDA    ITEMP
         001F    2C07   28 4 07           LDA    I ,B
         0020    4200   40 2 00           ADD    =X'FFFF'
         0021    AC09   A8 4 09           STA    #AIA,B
         0022    2D09   28 5 09           LDA    *#AIA,B
         0023    AC04   A8 4 04           STA    ITEMP ,B
         0024    2C04   28 4 04           LDA    ITEMP ,B
0043: S         STA    *K
         0025    AD06   A8 5 06           STA    *K ,B
0044:    920    K=K+1
0045: C
0046: C         OUTPUT MOVE COMPLETE MESSAGE
0047: C
         0026    6406   60 4 06           INC    K ,B
         0027    6407   60 4 07           INC    I ,B
         0028    1213   10 2 13           LDC    $+X'0013'
         0029    2E00   28 6 00           LDA    ISIZE ,C
         002A    4C07   48 4 07           SUB    I ,B
         002B    B2F3   B0 2 F3           PJP    $+X'FFF3'
0048:           IERR=91
0049:           CALL PRTMSG
         000A+B  005B
         002C    2C0A   28 4 0A           LDA    =X'005B' ,B
         002D    1220   10 2 20           LDC    $+X'0020'
         002E    AE00   A8 6 00           STA    IERR,C
         002F    EF20   E8 7 20           SST    *PRTMSG,B
0050:           RETURN
0051: C
0052: C         SEARCH CORE FOR BLANK AREA
0053: C
         0030    0C01   08 4 01           LDB    X'0001' ,B
         0031    E401   E0 4 01           EST    X'0001' ,B
0054:    950    CONTINUE
0055: C
0056: C         NO AREA AVAIABLE
0057: C
0058:           IERR=92
0059:           CALL PRTMSG
         000B+B  005C
         0032    2C0B   28 4 0B           LDA    =X'005C' ,B
         0033    1206   10 2 06           LDC    $+X'0006'
         0034    AE00   A8 6 00           STA    IERR,C
         0035    EF06   E8 7 06           SST    *PRTMSG,B
0060:           RETURN
         0036    0C01   08 4 01           LDB    X'0001' ,B
         0037    E401   E0 4 01           EST    X'0001' ,B
0061:           END
                                          LPL
         0038    7200   70 2 00           JMP    $+X'0000'
         0039    0000                     DAT    X'0000'
         003A    0000                     DAT    X'0000'
         003B    0000                     DAT    X'0000'
         003C    0000                     DAT    X'0000'
         003D    0000                     DAT    X'0000'
         003E    0000                     DAT    X'0000'
         003F    FFFF                     DAT    X'FFFF'
         0001    0046                     ADL    X'0046'
    ARR INFILE  0000 IN INFILE
    VAR INREG   0000 IN INREG
    VAR IERR    0000 IN IERR
    VAR IREGNM  0000 IN IREGNM
    VAR INSAVE  0000 IN INSAVE
    VAR ISIZE   0000 IN INFILE
    EXT PRTMSG
    VAR ITEMP   0004 IN DP
    VAR K       0006 IN DP
    VAR I       0007 IN DP
    VAR #AIA    0009 IN DP
PROGRAM SIZE:  0070    DATA POOL SIZE:  0012    ERROR COUNT:  0000
```

PROGRAM LISTING FOUR

```
0001: C      00716 R.E. SHARPLESS   SLOWDOWN CALIBRATION PROGRAM
0002:        SUBROUTINE PRINTP
0003: C
0004: C      THIS SUBROUTINE WILL PRINT THE SLOWDOWN PROFILES
0005: C      FOUND IN THE CALIBRATION AREA AFTER FIRST
0006: C      MAKING A CHECK FOR THE CORRECT DRIVE IN THE AREA.
0007: C
0008:        COMMON /INREG/INREG   /IREGNM/IREGNM   /IERR/IERR
0009: C
0010: C      CHECK FOR CORRECT FILE IN CALIBRATION AREA
0011: C
0012:        IF(INREG.EQ.IREGNM) GO TO 710
     0000   0000                       DAT   X'0000'
     0001   0000                       DAT   X'0000'
     0002   2801    28 0 01            LDA   X'0001'
     0003   0AFE    08 2 FE            LDB   $+X'FFFE'
     0004   AC01    A8 4 01            STA   X'0001',B
     0005   1200    10 2 00            LDC   $+X'0000'
     0006   2E00    28 6 00            LDA   INREG ,C
     0007   1200    10 2 00            LDC   $+X'0000'
     0008   4E00    48 6 00            SUB   IREGNM,C
     0009   F201    F0 2 01            ZJP   $+X'0001'
     000A   7200    70 2 00            JMP   $+X'0000'
0013: C
0014: C      SET ERROR FOR INCORRECT FILE
0015: C
     000B   7502    70 5 02            JMP   *)710,B
0016:        IERR=70
0017:        CALL PRTMSG
     0003+B  0046
     000C   2C03    28 4 03            LDA   =X'0046',B
     000D   1200    10 2 00            LDC   $+X'0000'
     000E   AE00    A8 6 00            STA   IERR,C
     000F   EF00    E8 7 00            SST   *PRTMSG,B
0018:        RETURN
0019: C
0020: C      CORRECT FILE IN AREA. SET UP DATA NEEDED TO
0021: C      OUTPUT CURVES.
0022: C
     0010   0C01    08 4 01            LDB   X'0001',B
     0011   E401    E0 4 01            EST   X'0001',B
0023:  710   CALL PRODAT
0024: C
0025: C      OUTPUT CURVES
0026: C
     0012   EF00    E8 7 00            SST   *PRODAT,B
0027:        CALL PRTPRF
     0013   EF00    E8 7 00            SST   *PRTPRF,B
0028:        RETURN
     0014   0C01    08 4 01            LDB   X'0001',B
     0015   E401    E0 4 01            EST   X'0001',B
0029:        END

LPL
     0016   7200    70 2 00            JMP   $+X'0000'
     0017   0000                       DAT   X'0000'
     0018   0000                       DAT   X'0000'
     0019   0000                       DAT   X'0000'
     001A   0000                       DAT   X'0000'
     001B   0000                       DAT   X'0000'
     001C   0000                       DAT   X'0000'
     0001   0023                       ADL   X'0023'
 VAR INREG   0000  IN INREG
 VAR IREGNM  0000  IN IREGNM
 VAR IERR    0000  IN IERR
 EXT PRTMSG
 EXT PRODAT
 EXT PRTPRF
PROGRAM SIZE: 0035    DATA POOL SIZE: 0004    ERROR COUNT: 0000
```

PROGRAM LISTING FIVE

```
0001: C      00716 R.E. SHARPLESS  SLOWDOWN CALIBRATION PROGRAM
0002:        SUBROUTINE READIN
0003: C      THIS ROUTINE WILL READ IN OPERATOR INPUT INTO THE
0004: C      INBUF BUFFER,DETERMINE THE LOCATION OF THE EXCLAMATION
0005: C      POINT,AND DETERMINE THE LOCATION OF THE LAST DIGIT.
0006: C      FORMAT ERRORS WILL BE INDICATED BY A 2 IN IERR.
0007: C      AN ABORT WILL BE INDICATED BY A 3 IN IERR.
0008: C      A CORRECT INPUT WILL BE INDICATED BY A 1 IN IERR.
0009: C
0010:        COMMON/INBUF/INBUF(156) /I:SI/I:SI /LOCEND/LOCEND
0011:      X      /IRETRN/IRETRN /M3F/M3F /IERR/IERR /ISPACE/ISPACE
0012:      X      /LOCEXC/LOCEXC /IEXCLM/IEXCLM
0013: C
0014:        READ (I:SI,1) INBUF
       0000   0000                          DAT    X'0000'
       0001   0000                          DAT    X'0000'
       0002   2801    28 0 01                LDA    X'0001'
       0003   0AFE    08 2 FE                LDB    $+X'FFFE'
       0004   AC01    A8 4 01                STA    X'0001',B
       0005   1200    10 2 00                LDC    $+X'0000'
       0006   1E00    18 6 00                LDG    I:SI,C
       0007   EDF3    E8 5 F3                SST    *REF:,B
       0008   0000                          DAT    X'0000'
       0009   EDF5    E8 5 F5                SST    *ARF:,B
       000A   FB20                          DAT    X'FB20'
       000B   8002                          ADL    INBUF
       000C   EDF6    E8 5 F6                SST    *NDF:,B
0015:  1    FORMAT(156R1)
    0003+B   3001                )1
    0004+B   A09C
    0005+B   0080
    0006+B   2001
0016: C
0017: C                LOOK FOR THE CARRIAGE RETURN
0018: C
0019:        DO 10 LOCEND=1,156
    0007+B   0001
       000D   2C07    28 4 07                LDA    =X'0001',B
       000E   1200    10 2 00                LDC    $+X'0000'
       000F   AE00    A8 6 00                STA    LOCEND,C
0020:        IF (INBUF(LOCEND).EQ.IRETRN) GO TO 15
       0010   1202    10 2 02                LDC    $+X'0002'
       0011   2E00    28 6 00                LDA    LOCEND,C
       0012   4200    40 2 00                ADD    =X'FFFF'
       0013   AC08    A8 4 08                STA    #AIA,B
       0014   2D08    28 5 08                LDA    *#AIA,B
       0015   1200    10 2 00                LDC    $+X'0000'
       0016   4E00    48 6 00                SUB    IRETRN,C
       0017   F201    F0 2 01                ZJP    $+X'0001'
       0018   7200    70 2 00                JMP    $+X'0000'
       0019   7509    70 5 09                JMP    *)15 ,B
0021:  10   CONTINUE
0022: C
0023: C                AND OFF PARITY BITS
0024: C
       001A   120A    10 2 0A    )10         LDC    $+X'000A'
       001B   6600    60 6 00                INC    LOCEND,C
    000A+B   009C
       001C   2C0A    28 4 0A                LDA    =X'009C',B
       001D   4E00    48 6 00                SUB    LOCEND,C
       001E   B2F1    B0 2 F1                PJP    $+X'FFF1'
0025:  15   DO 20 I=1,LOCEND
       001F   2C07    28 4 07    )15         LDA    =X'0001',B
       0020   AC0B    A8 4 0B                STA    I ,B
0026:        IWORK=INBUF(I)
0027: S      LDA         IWORK
       0021   2C0B    28 4 0B                LDA    I ,B
       0022   4210    40 2 10                ADD    =X'FFFF'
       0023   AC08    A8 4 08                STA    #AIA,B
```

```
        0024    2D08    28 5 08             LDA     *#AIA,B
        0025    AC0C    A8 4 0C             STA     IWORK,B
        0026    2C0C    28 4 0C             LDA     IWORK,B
0028: S         AND             M3F
        0027    1200    10 2 00             LDC     $+X'0000'
        0028    5E00    58 6 00             AND     M3F,C
0029: S         STA             IWORK
        0029    AC0C    A8 4 0C             STA     IWORK,B
0030:  20       INBUF(I)=IWORK
0031: C
0032: C
0033: C                 CHECK FOR FORMAT ERROR
        002A    2C0B    28 4 0B             LDA     I,B
        002B    4209    40 2 09             ADD     =X'FFFF'
        002C    AC08    A8 4 08             STA     #AIA,B
        002D    2C0C    28 4 0C             LDA     IWORK,B
        002E    AD08    A8 5 08             STA     *#AIA,B
        002F    640B    60 4 0B             INC     I,B
        0030    1216    10 2 16             LDC     $+X'0016'
        0031    2E00    28 6 00             LDA     LOCEND,C
        0032    4C0B    48 4 0B             SUB     I,B
        0033    B2ED    B0 2 ED             PJP     $+X'FFED'
0034:           LOCEND=LOCEND-1
0035:           IF(LOCEND.NE.0) GO TO 25
        0034    6E00    68 6 00             DCR     LOCEND,C
        0035    2E00    28 6 00             LDA     LOCEND,C
        0036    F200    F0 2 00             ZJP     $+X'0000'
0036: C
0037: C                         FORMAT ERROR
0038: C
        0037    750D    70 5 0D             JMP     *)25,B
0039:  21       IERR=2
0040:           RETURN
0041: C
0042: C                         CHECK FOR SPACE
0043: C
        000E+B  0002
        0038    2C0E    28 4 0E             LDA     =X'0002',B
        0039    1200    10 2 00             LDC     $+X'0000'
        003A    AE00    A8 6 00             STA     IERR,C
        003B    0C01    08 4 01             LDB     X'0001',B
        003C    E401    E0 4 01             EST     X'0001',B
0044:  25       IF(INBUF(LOCEND).NE.ISPACE) GO TO 21
        003D    120D    10 2 0D     )25     LDC     $+X'000D'
        003E    2E00    28 6 00             LDA     LOCEND,C
        003F    4214    40 2 14             ADD     =X'FFFF'
        0040    AC08    A8 4 08             STA     #AIA,B
        0041    2D08    28 5 08             LDA     *#AIA,B
        0042    1200    10 2 00             LDC     $+X'0000'
        0043    4E00    48 6 00             SUB     ISPACE,C
        0044    F200    F0 2 00             ZJP     $+X'0000'
        0045    72F2    70 2 F2             JMP     )21
0045:  30       LOCEND=LOCEND-1
0046:           IF(LOCEND.EQ.0) GO TO 21
        0046    1209    10 2 09             LDC     $+X'0009'
        0047    6E00    68 6 00             DCR     LOCEND,C
        0048    2E00    28 6 00             LDA     LOCEND,C
        0049    F201    F0 2 01             ZJP     $+X'0001'
        004A    7200    70 2 00             JMP     $+X'0000'
0047: C
0048: C                 LOOK FOR EXCLAMATION POINT
0049: C
        004B    72EC    70 2 EC             JMP     )21
0050:           LOCEXC=LOCEND
        004C    1206    10 2 06             LDC     $+X'0006'
        004D    2E00    28 6 00             LDA     LOCEND,C
        004E    1200    10 2 00             LDC     $+X'0000'
        004F    AE00    A8 6 00             STA     LOCEXC,C
0051:  35       IF(INBUF(LOCEXC).NE.IEXCLM) GO TO 40
        0050    1202    10 2 02     )35     LDC     $+X'0002'
```

```
0051    2E00    28 6 00              LDA     LOCEXC,C
0052    4213    42 2 13              ADD     =X'FFFF'
0053    AC28    A8 4 28              STA     *AIA,B

LPL
0054    7200    70 2 00              JMP     $+X'0000'
0055    0000                         DAT     X'0000'
0056    0000                         DAT     X'0000'
0057    FFFF                         DAT     X'FFFF'
0058    0000                         DAT     X'0000'
0059    0000                         DAT     X'0000'
005A    0000                         DAT     X'0000'
005B    0000                         DAT     X'0000'
005C    0000                         DAT     X'0000'
005D    2D28    28 5 28              LDA     **AIA,B
005E    1200    10 2 00              LDC     $+X'0000'
005F    4E00    48 6 00              SUB     IEXCLM,C
0060    F200    F0 2 00              ZJP     $+X'0000'
0052: C
0053: C                   EXCLAMATION POINT FOUND
0054: C
0061    750F    70 5 0F              JMP     *)40 ,B
0055:           IERR=1
0056: C
0057: C                   CHECK FOR AN ABORT
0058: C
0059:           IF(LOCEND.EQ.LOCEXC) IERR=3
0062    2C07    28 4 07              LDA     =X'0001' ,B
0063    12F7    10 2 F7              LDC     $+X'FFF7'
0064    AE00    A8 6 00              STA     IERR,C
0065    12F1    10 2 F1              LDC     $+X'FFF1'
0066    2E00    28 6 00              LDA     LOCEND,C
0067    12F5    10 2 F5              LDC     $+X'FFF5'
0068    4E00    48 6 00              SUB     LOCEXC,C
0069    F201    F0 2 01              ZJP     $+X'0001'
006A    7200    70 2 00              JMP     $+X'0000'
0010+B  0003
006B    2C10    28 4 10              LDA     =X'0003' ,B
006C    12EE    10 2 EE              LDC     $+X'FFEE'
006D    AE00    A8 6 00              STA     IERR,C
0060:           RETURN
006E    0C01    08 4 01              LDB     X'0001' ,B
006F    E401    E0 4 01              EST     X'0001' ,B
0061:   40      LOCEXC=LOCEXC-1
0062:           IF(LOCEXC.EQ.0) GO TO 21
0070    12EC    10 2 EC              LDC     $+X'FFEC'
0071    6E00    68 6 00              DCR     LOCEXC,C
0072    2E00    28 6 00              LDA     LOCEXC,C
0073    F201    F0 2 01              ZJP     $+X'0001'
0074    7200    70 2 00              JMP     $+X'0000'
0075    72C2    70 2 C2              JMP     )21
0063:           GO TO 35
0076    72D9    70 2 D9              JMP     )35
0064:           END

LPL
0077    7200    70 2 00              JMP     $+X'0000'
0078    0000                         DAT     X'0000'
0001    007F                         ADL     X'007F'
EXT REF:
EXT ARF:
EXT NDF:
ARR INBUF    0000 IN INBUF
VAR I:SI     0000 IN I:SI
VAR LOCEND   0000 IN LOCEND
VAR IRETRN   0000 IN IRETRN
VAR M3F      0000 IN M3F
VAR IERR     0000 IN IERR
VAR ISPACE   0000 IN ISPACE
VAR LOCEXC   0000 IN LOCEXC
```

```
   VAR IEXCLM   0000 IN IEXCLM
   VAR #AIA    0008 IN DP
   VAR I       000B IN DP
   VAR IWORK   000C IN DP
PROGRAM SIZE: 0127    DATA POOL SIZE: 0017    ERROR COUNT: 0000
```

PROGRAM LISTING SIX

```
0001: C      00716 R.E. SHARPLESS  SLOWDOWN CALIBRATION PROGRAM
0002:        SUBROUTINE PRTMSG
0003: C
0004: C      THIS SUBROUTINE WILL PRINT DIAGNOSTICS IN
0005: C      THE FORM - MESSAGE XX
0006: C
0007:        COMMON      /I:LO/I:LO /IERR/IERR
0008: C
0009:        WRITE(I:LO,1) IERR
     0000    0000                     DAT    X'0000'
     0001    0000                     DAT    X'0000'
     0002    2801    28 0 01          LDA    X'0001'
     0003    0AFE    08 2 FE          LDB    S+X'FFFE'
     0004    AC01    A8 4 01          STA    X'0001',B
     0005    1200    10 2 00          LDC    S+X'0000'
     0006    1E00    18 6 00          LDG    I:LO,C
     0007    EDF4    E8 5 F4          SST    *WRF:,B
     0008    0000                     DAT    X'0000'
     0009    EDF5    E8 5 F5          SST    *ARF:,B
     000A    0008                     DAT    X'0008'
     000B    8002                     ADL    IERR
     000C    EDF6    E8 5 F6          SST    *NDF:,B
0010:  1     FORMAT(' MESSAGE',2X,I2//)
     0003+B  3001                     )1
     0004+B  0008
     0005+B  A04D
     0006+B  C553
     0007+B  5341
     0008+B  47C5
     0009+B  6002
     000A+B  8001
     000B+B  0100
     000C+B  1001
     000D+B  1001
     000E+B  2001
0011:        RETURN
     000D    AC01    08 4 01          LDB    X'0001',B
     000E    E401    E0 4 01          EST    X'0001',B
0012:        END

LPL
     000F    7200    70 2 00          JMP    S+X'0000'
     0010    0000                     DAT    X'0000'
     0001    0017                     ADL    X'0017'
   EXT WRF:
   EXT ARF:
   EXT NDF:
   VAR I:LO   0000 IN I:LO
   VAR IERR   0000 IN IERR
PROGRAM SIZE: 0023    DATA POOL SIZE: 0015    ERROR COUNT: 0000
```

PROGRAM LISTING SEVEN

```
0001: C      00716 R.E. SHARPLESS SLOWDOWN CALIBRATION PROGRAM
0002:        SUBROUTINE PRTPRF
0003: C
0004: C
0005: C      THIS ROUTINE WILL PRINT SLOWDOWN PROFILES
0006: C      USING THE FILE IN THE SLOWDOWN CALIBRATION
0007: C      PROGRAM AREA.
0008: C
0009: C
0010:        COMMON/INFILE/INFILE(256) /IFWIDX/IFWIDX /IRVIDX/IRVIDX
0011:     X    /FWREF/FWREF /FWPAT/FWPAT /M7F/M7F /M1/M1
0012:     X    /RVREF/RVREF /M4000/M4000 /RVPAT/RVPAT /M40/M40
```

```
0013:       X           /I:LO/I:LO /CCONFC/CCONFC
0014:       X           /MFF/MFF
0015:       EQUIVALENCE (INFILE(29),ACONFC),(INFILE(31),BCONFC)
0016: C
0017: C     CALCULATE C CONVERSION FACTOR
0018: C
0019:       CCONFC=1./ACONFC
      0000  0000                          DAT    X'0000'
      0001  0000                          DAT    X'0000'
      0002  2801    28 0 01                LDA    X'0001'
      0003  0AFE    08 2 FE                LDB    $+X'FFFE'
      0004  AC01    A8 4 01                STA    X'0001',B
0020:       IHEAD=1
0021:       I=IFWIDX
0022:       J=IRVIDX
0023:       IFWFLG=1
0024:       IRVFLG=1
0025: C
0026: C     CALCULATE FORWARD REFERENCE AND SPEED
0027: C
    0007+B  4180
    0008+B  0000
    0005    2C08    28 4 08                LDA    =X'4180',B
    0006    2407    20 4 07                LDE    =X'4180',B
    0007    EDFD    E8 5 FD                SST    *D11:,B
    0008    8009                           ADL    ACONFC
    0009    1200    10 2 00                LDC    $+X'0000'
    000A    AE01    A8 6 01                STA    CCONFC,C
    000B    A600    A0 6 00                STE    CCONFC,C
    000A+B  0001
    000C    2C0A    28 4 0A                LDA    =X'0001',B
    000D    AC02    A8 4 02                STA    IHEAD,B
    000E    1200    10 2 00                LDC    $+X'0000'
    000F    2E00    28 6 00                LDA    IFWIDX,C
    0010    AC03    A8 4 03                STA    I,B
    0011    1200    10 2 00                LDC    $+X'0000'
    0012    2E00    28 6 00                LDA    IRVIDX,C
    0013    AC04    A8 4 04                STA    J,B
    0014    2C0A    28 4 0A                LDA    =X'0001',B
    0015    AC05    A8 4 05                STA    IFWFLG,B
    0016    AC06    A8 4 06                STA    IRVFLG,B
0028:  1    IF(IFWFLG.NE.1) GO TO 10
    0017    2C05    28 4 05    )1          LDA    IFWFLG,B
    0018    6805    68 0 05                DCR    X'0005'
    0019    F200    F0 2 00                ZJP    $+X'0000'
    001A    7508    70 5 0B                JMP    *)10,B
0029:       FWREF=CCONFC*FLOAT(INFILE(I))
0030:       I=I+1
0031:       ITEST=INFILE(I)
0032:       ITEMP=INFILE(I)
0033:       I=I+1
0034: C
0035: C     CHECK FOR ANTICIPATE PATTERN
0036: C
0037: S     LDA   ITEST
    001B    2C03    28 4 03                LDA    I,B
    001C    4200    40 2 00                ADD    =X'FFFF'
    001D    AC0E    A8 4 0E                STA    #AIA,B
    001E    EF00    E8 7 00                SST    *FLOAT,B
    001F    800E                           ADL    #AIA
    0020    EDEC    E8 5 EC                SST    *M11:,B
    0021    800F                           ADL    CCONFC
    0022    1200    10 2 00                LDC    $+X'0000'
    0023    AE01    A8 6 01                STA    FWREF,C
    0024    A600    A0 6 00                STE    FWREF,C
    0025    6403    60 4 03                INC    I,B
    0026    2C03    28 4 03                LDA    I,B
    0027    AC10    A8 4 10                STA    #AIB,B
    0028    420C    40 2 0C                ADD    =X'FFFF'
    0029    AC11    A8 4 11                STA    #AIC,B
```

```
        002A    2D11    28 5 11            LDA    *#AIC,B
        002B    AC0C    A8 4 0C            STA    ITEST ,B
        002C    2C10    28 4 10            LDA    #AIB,B
        002D    4205    40 2 05            ADD    =X'FFFF'
        002E    AC12    A8 4 12            STA    #AID,B
        002F    2D12    28 5 12            LDA    *#AID,B
        0030    AC0D    A8 4 0D            STA    ITEMP ,B
        0031    6403    60 4 03            INC    I ,B
        0032    2C0C    28 4 0C            LDA    ITEST ,B
0038: S                 AND    M4000
        0033    1200    10 2 00            LDC    $+X'0000'
        0034    5E00    58 6 00            AND    M4000 ,C
0039: S                 STA    ITEST
        0035    AC0C    A8 4 0C            STA    ITEST ,B
0040:            IF(ITEST.EQ.0) GO TO 4
        0036    2C0C    28 4 0C            LDA    ITEST ,B
        0037    F201    F0 2 01            ZJP    $+X'0001'
        0038    7200    70 2 00            JMP    $+X'0000'
0041: C
0042: C         POINT IS AN ANTICIPATE POINT
0043: C
        0039    7513    70 5 13            JMP    *)4,B
0044:            IFWANT=2
0045:            GO TO 10
    0015+B      0002
        003A    2C15    28 4 15            LDA    =X'0002' ,B
        003B    AC14    A8 4 14            STA    IFWANT,B
0046: C
0047: C         CHECK FOR ZERO IN SPEED PATTERN
0048: C
        003C    750B    70 5 0B            JMP    *)10 ,B
0049:    4       IF(ITEMP.NE.0) GO TO 6
        003D    2C0D    28 4 0D    )4     LDA    ITEMP ,B
        003E    F200    F0 2 00            ZJP    $+X'0000'
        003F    7516    70 5 16            JMP    *)6,B
0050:            FWPAT=0.0
0051:            IFWFLG=2
0052:            GO TO 10
    0017+B      0000
    0018+B      0000
        0040    2C18    28 4 18            LDA    =X'0000' ,B
        0041    2417    20 4 17            LDE    =X'0000' ,B
        0042    1200    10 2 00            LDC    $+X'0000'
        0043    AE01    A8 6 01            STA    FWPAT ,C
        0044    A600    A0 6 00            STE    FWPAT ,C
        0045    2C15    28 4 15            LDA    =X'0002' ,B
        0046    AC05    A8 4 05            STA    IFWFLG,B
0053: C
0054: C         CALCULATE SPEED PERCENTAGE
0055: C
        0047    750B    70 5 0B            JMP    *)10 ,B
0056: S6        LDA             ITEMP
        0048    2C0D    28 4 0D    )6     LDA    ITEMP ,B
0057: S         AND             MFF
        0049    1200    10 2 00            LDC    $+X'0000'
        004A    5E00    58 6 00            AND    MFF ,C
0058: S         STA             ITEMP
        004B    AC0D    A8 4 0D            STA    ITEMP ,B
0059:           ITEST=ITEMP
0060: S         LDA    ITEST
        004C    2C0D    28 4 0D            LDA    ITEMP ,B
        004D    AC0C    A8 4 0C            STA    ITEST ,B
        004E    2C0C    28 4 0C            LDA    ITEST ,B
0061: S         AND    M40
        004F    1200    10 2 00            LDC    $+X'0000'
        0050    5E00    58 6 00            AND    M40 ,C
0062: S         STA    ITEST
        0051    AC0C    A8 4 0C            STA    ITEST ,B
0063:           IF(ITEST.EQ.0) GO TO 8
        0052    2C0C    28 4 0C            LDA    ITEST ,B
```

```
        0053   F201   F0 2 01           ZJP   S+X'0001'
        0054   7200   70 2 00           JMP   S+X'0000'
        0055   7519   70 5 19           JMP   *)8,B
0064: S        LDA    ITEMP
        0056   2C0D   28 4 0D           LDA   ITEMP ,B
0065: S        AND    M7F
        0057   1200   10 2 00           LDC   S+X'0000'
        0058   5E00   58 6 00           AND   M7F .C
0066: S        EOR    M7F
        0059   1202   10 2 02           LDC   S+X'0002'
        005A   5600   50 6 00           EOR   M7F .C
0067: S        ADD    M1
        005B   1200   10 2 00           LDC   S+X'0000'
        005C   4600   40 6 00           ADD   M1,C

LPL
        005D   7200   70 2 00           JMP   S+X'0000'
        005E   0000                     DAT   X'0000'
        005F   0000                     DAT   X'0000'
        0060   0000                     DAT   X'0000'
        0061   0000                     DAT   X'0000'
        0062   FFFF                     DAT   X'FFFF'
        0063   0000                     DAT   X'0000'
        0064   0000                     DAT   X'0000'
        0065   0000                     DAT   X'0000'
        0066   0000                     DAT   X'0000'
        0067   0000                     DAT   X'0000'
        0068   0000                     DAT   X'0000'
        0069   0000                     DAT   X'0000'
0068: S        STA    ITEMP
        006A   AC0D   A8 4 0D           STA   ITEMP ,B
0069:   S      FWPAT=FLOAT(ITEMP)/64.0*100.0
0070:   C
0071:   C      CALCULATE REVERSE REFERENCE AND SPEED
0072:   C
        006B   EFF6   E8 7 F6           SST   *FLOAT ,B
        006C   000D                     ADL   ITEMP
        006D   EDED   E8 5 ED           SST   *D11:,B
        001A+B 4780
        001B+B 0000
        006E   001A                     ADL   =X'4780'
        006F   EDEC   E8 5 EC           SST   *M11:,B
        001C+B 47C8
        001D+B 0000
        0070   001C                     ADL   =X'47C8'
        0071   12F4   10 2 F4           LDC   S+X'FFF4'
        0072   AE01   A8 6 01           STA   FWPAT .C
        0073   A600   A0 6 00           STE   FWPAT .C
0073:   10     IF(IRVFLG.NE.1) GO TO 30
        0074   2C06   28 4 06           LDA   IRVFLG,B
        0075   6805   68 0 05           DCR   X'0005'
        0076   F200   F0 2 00           ZJP   S+X'0000'
        0077   751E   70 5 1E           JMP   *)30 ,B
0074:          RVREF=CCONFC*FLOAT(INFILE(J))
0075:          J=J+1
0076:          ITEST=INFILE(J)
0077:          ITEMP=INFILE(J)
0078:          J=J+1
0079:   C
0080:   C      CHECK FOR AN ANTICIPATE PATTERN
0081:   C
0082: S        LDA    ITEST
        0078   2C04   28 4 04           LDA   J ,B
        0079   42E9   40 2 E9           ADD   =X'FFFF'
        007A   AC0E   A8 4 0E           STA   #AIA,B
        007B   EFE6   E8 7 E6           SST   *FLOAT ,B
        007C   800E                     ADL   #AIA
        007D   EDEC   E8 5 EC           SST   *M11:,B
        007E   800F                     ADL   CCONFC
        007F   1200   10 2 00           LDC   S+X'0000'
```

```
        0080    AE01   A8 6 01           STA    RVREF ,C
        0081    A600   A0 6 00           STE    RVREF ,C
        0082    6404   60 4 04           INC    J ,B
        0083    2C04   28 4 04           LDA    J ,B
        0084    AC10   A8 4 10           STA    #AIB,B
        0085    42DD   40 2 DD           ADD    =X'FFFF'
        0086    AC11   A8 4 11           STA    #AIC,B
        0087    2D11   28 5 11           LDA    *#AIC,B
        0088    AC0C   A8 4 0C           STA    ITEST ,B
        0089    2C10   28 4 10           LDA    #AIB,B
        008A    42D8   40 2 D8           ADD    =X'FFFF'
        008B    AC12   A8 4 12           STA    #AID,B
        008C    2D12   28 5 12           LDA    *#AID,B
        008D    AC0D   A8 4 0D           STA    ITEMP ,B
        008E    6404   60 4 04           INC    J ,B
        008F    2C0C   28 4 0C           LDA    ITEST ,B
0083: S         AND    M4000
        0090    12D4   10 2 D4           LDC    $+X'FFD4'
        0091    5E00   58 6 00           AND    M4000 ,C
0084: S         STA    ITEST
        0092    AC0C   A8 4 0C           STA    ITEST ,B
0085:           IF(ITEST.EQ.0) GO TO 14
        0093    2C0C   28 4 0C           LDA    ITEST ,B
        0094    F201   F0 2 01           ZJP    $+X'0001'
        0095    7200   70 2 00           JMP    $+X'0000'
0086: C

0087: C         POINT IS AN ANTICIPATE POINT
0088: C
        0096    751F   70 5 1F           JMP    *)14 ,B
0089:           IRVANT=2
0090:           GO TO 30
        0097    2C15   28 4 15           LDA    =X'0002' ,B
        0098    AC20   A8 4 20           STA    IRVANT,B
0091: C
0092: C         CHECK FOR ZERO IN SPEED PATTERN
0093: C
        0099    751E   70 5 1E           JMP    *)30 ,B
0094:   14      IF(ITEMP.NE.0) GO TO 16
        009A    2C0D   28 4 0D    )14    LDA    ITEMP ,B
        009B    F200   F0 2 00           ZJP    $+X'0000'
        009C    7521   70 5 21           JMP    *)16 ,B
0095:           RVPAT=0.0
0096:           IRVFLG=2
0097:           GO TO 30

009D    2C18   28 4 18           LDA    =X'0000' ,B
        009E    2417   20 4 17           LDE    =X'0000' ,B
        009F    1200   10 2 00           LDC    $+X'0000'
        00A0    AE01   A8 6 01           STA    RVPAT ,C
        00A1    A600   A0 6 00           STE    RVPAT ,C
        00A2    2C15   28 4 15           LDA    =X'0002' ,B
        00A3    AC06   A8 4 06           STA    IRVFLG,B
0098: C
0099: C         CALCULATE SPEED PERCENTAGES
0100: C
        00A4    751E   70 5 1E           JMP    *)30 ,B
0101: S16       LDA          ITEMP
        00A5    2C0D   28 4 0D    )16    LDA    ITEMP ,B
0102: S         AND          MFF
        00A6    12C0   10 2 C0           LDC    $+X'FFC0'
        00A7    5E00   58 6 00           AND    MFF ,C
0103: S         STA          ITEMP
        00A8    AC0D   A8 4 0D           STA    ITEMP ,B
0104:           ITEST=ITEMP
0105: S         LDA    ITEST
        00A9    2C0D   28 4 0D           LDA    ITEMP ,B
        00AA    AC0C   A8 4 0C           STA    ITEST ,B
        00AB    2C0C   28 4 0C           LDA    ITEST ,B
0106: S         AND    M40
        00AC    12BB   10 2 BB           LDC    $+X'FFBB'
```

```
        00AD    5E00    58 6 00                 AND     M40 ,C
0107: S         STA     ITEST
        00AE    AC0C    A8 4 0C                 STA     ITEST ,B
0108:           IF (ITEST.EQ.0) GO TO 18
        00AF    2C0C    28 4 0C                 LDA     ITEST ,B
        00B0    F201    F0 2 01                 ZJP     $+X'0001'
        00B1    7200    70 2 00                 JMP     $+X'0000'
        00B2    7522    70 5 22                 JMP     *)18 ,B
0109: S         LDA     ITEMP
        00B3    2C0D    28 4 0D                 LDA     ITEMP ,B
0110: S         AND     M7F
        00B4    12B4    10 2 B4                 LDC     $+X'FFB4'
        00B5    5E60    58 6 00                 AND     M7F ,C
0111: S         EOR     M7F
        00B6    12B2    10 2 B2                 LDC     $+X'FFB2'
        00B7    5600    50 6 00                 EOR     M7F ,C
0112: S         ADD     M1
        00B8    12B1    10 2 B1                 LDC     $+X'FFB1'
        00B9    4600    40 6 00                 ADD     M1,C
0113: S         STA     ITEMP
        00BA    AC0D    A8 4 0D                 STA     ITEMP ,B
0114:   18      RVPAT=FLOAT(ITEMP)/64.0*100.0
0115: C
0116: C         OUTPUT SLOWDOWN PROFILES
0117: C
        00BB    EFA6    E8 7 A6                 SST     *FLOAT ,B
        00BC    000D                            ADL     ITEMP
        00BD    EDED    E8 5 ED                 SST     *D11:,B
        00BE    001A                            ADL     =X'4780'
        00BF    EDEC    E8 5 EC                 SST     *M11:,B
        00C0    001C                            ADL     =X'47C8'
        00C1    1222    10 2 22                 LDC     $+X'0022'
        00C2    AE01    A8 6 01                 STA     RVPAT ,C
        00C3    A600    A0 6 00                 STE     RVPAT ,C
0118:   30      IF(IFWFLG.NE.2) GO TO 32
        00C4    2C05    28 4 05     )30         LDA     IFWFLG,B
        00C5    4C15    48 4 15                 SUB     =X'0002' ,B
        00C6    F200    F0 2 00                 ZJP     $+X'0000'
        00C7    7523    70 5 23                 JMP     *)32 ,B
0119:           IF(IRVFLG.NE.2) GO TO 32
        00C8    2C06    28 4 06                 LDA     IRVFLG,B
        00C9    4C15    48 4 15                 SUB     =X'0002' ,B
        00CA    F200    F0 2 00                 ZJP     $+X'0000'
        00CB    7523    70 5 23                 JMP     *)32 ,B
0120:           RETURN
0121: C
0122: C         OUTPUT HEADING
0123: C
        00CC    0C01    08 4 01                 LDB     X'0001' ,B
        00CD    E401    E0 4 01                 EST     X'0001' ,B
0124:   32      IF(IHEAD.NE.1) GO TO 34
        00CE    2C02    28 4 02     )32         LDA     IHEAD ,B
        00CF    6805    68 0 05                 DCR     X'0005'
        00D0    F200    F0 2 00                 ZJP     $+X'0000'
        00D1    7524    70 5 24                 JMP     *)34 ,B
0125:           IHEAD=2
0126:           WRITE(I:LO,33)
        00D2    2C15    28 4 15                 LDA     =X'0002' ,B
        00D3    AC02    A8 4 02                 STA     IHEAD ,B
        00D4    1200    10 2 00                 LDC     $+X'0000'
        00D5    1E00    18 6 00                 LDG     I:LO,C
        00D6    EDF4    E8 5 F4                 SST     *WRF:,B
        00D7    0000                            DAT     X'0000'
        00D8    EDF6    E8 5 F6                 SST     *NDF:,B
0127:   33      FORMAT(6X,'SLOWDOWN PROFILE'//
        0025+B  3001                )33
        0026+B  6006
        0027+B  0010
        0028+B  53CC
        0029+B  CFD7
```

```
       002A+B   44CF
       002B+B   D74E
       002C+B   A050
       002D+B   D2CF
       002E+B   C6C9
       002F+B   CCC5
       0030+B   1001
       0031+B   1001
0128:           X4X,'FORWARD',15X,'REVERSE'//)
       0033+B   0004

0034+B   C6CF
       0035+B   D2D7
       0036+B   41D2
       0037+B   44A0
       0038+B   600F
       0039+B   0007
       003A+B   D2C5
       003B+B   56C5
       003C+B   D253
       003D+B   C5A0
       003E+B   1001
       003F+B   1001
       0040+B   2001
0129:  C
0130:  C        OUTPUT PROFILES
0131:  C
0132:   34      WRITE(I:LO,35) FWREF
       00D9    1205    10 2 05    )34     LDC     $+X'0005'
       00DA    1E00    18 6 00            LDG     I:LO,C
       00DB    EDF4    E8 5 F4            SST     *WRF:,B
       00DC    0000                       DAT     X'0000'
       00DD    EDF5    E8 5 F5            SST     *ARF:,B
       00DE    0009                       DAT     X'0009'
       00DF    8041                       ADL     FWREF

LPL
       00E0    7200    70 2 00            JMP     $+X'0000'
       00E1    0000                       DAT     X'0000'
       00E2    0000                       DAT     X'0000'
       00E3    0000                       DAT     X'0000'
       00E4    EDF6    E8 5 F6            SST     *NDF:,B
0133:   35      FORMAT(4X,F7.2,2X)
       0042+B   3001               )35
       0043+B   6004
       0044+B   E001
       0045+B   0382
       0046+B   6002
       0047+B   2001
0134:           IF(IFWANT.NE.2) GO TO 38
       00E5    2C14    28 4 14            LDA     IFWANT,B
       00E6    4C15    48 4 15            SUB     =X'0002',B
       00E7    F200    F0 2 00            ZJP     $+X'0000'
       00E8    7548    70 5 48            JMP     *)38 ,B
0135:           IFWANT=1
0136:           WRITE(I:LO,36)
       00E9    2C0A    28 4 0A            LDA     =X'0001',B
       00EA    AC14    A8 4 14            STA     IFWANT,B
       00EB    12F8    10 2 F8            LDC     $+X'FFF8'
       00EC    1E00    18 6 00            LDG     I:LO,C
       00ED    EDF4    E8 5 F4            SST     *WRF:,B
       00EE    0000                       DAT     X'0000'
       00EF    EDF6    E8 5 F6            SST     *NDF:,B
0137:   36      FORMAT('+',4X,'A')
       0049+B   3001               )36
       004A+B   0001
       004B+B   2BA0
       004C+B   6004
       004D+B   0001
       004E+B   41A0
```

```
       004F+B   2001
0138:           GO TO 42
       00F0     7550    70 5 50                JMP    *)42 ,B
0139:  38       WRITE(I:LO,39) FWPAT
       00F1     12F2    10 2 F2     )38        LDC    $+X'FFF2'
       00F2     1E00    18 6 00                LDG    I:LO,C
       00F3     EDF4    E8 5 F4                SST    *WRF:,B
       00F4     0000                           DAT    X'0000'
       00F5     EDF5    E8 5 F5                SST    *ARF:,B
       00F6     0009                           DAT    X'0009'
       00F7     8051                           ADL    FWPAT
       00F8     EDF6    E8 5 F6                SST    *NDF:,B
0140:  39       FORMAT(I+I,F4.0,'X')
       0052+B   3001                )39
       0053+B   0001
       0054+B   2BA0
       0055+B   E001
       0056+B   0200
       0057+B   0001
       0058+B   A5A0
       0059+B   2001
0141:  42       WRITE(I:LO,43) RVREF
       00F9     12EA    10 2 EA     )42        LDC    $+X'FFEA'
       00FA     1E00    18 6 00                LDG    I:LO,C
       00FB     EDF4    E8 5 F4                SST    *WRF:,B
       00FC     0000                           DAT    X'0000'
       00FD     EDF5    E8 5 F5                SST    *ARF:,B
       00FE     0009                           DAT    X'0009'
       00FF     805A                           ADL    RVREF
       0100     EDF6    E8 5 F6                SST    *NDF:,B
0142:  43       FORMAT(I+I,8X,F7.2,2X)
       005B+B   3001                )43
       005C+B   0001
       005D+B   2BA0
       005E+B   6008
       005F+B   E001
       0060+B   0382
       0061+B   6002
       0062+B   2001
0143:           IF(IRVANT.NE.2) GO TO 48
       0101     2C20    28 4 20                LDA    IRVANT,B
       0102     4C15    48 4 15                SUB    =X'0002' ,B
       0103     F200    F0 2 00                ZJP    $+X'0000'
       0104     7563    70 5 63                JMP    *)48 ,B
0144:           IRVANT=1
0145:           WRITE(I:LO,44)
       0105     2C0A    28 4 0A                LDA    =X'0001' ,B
       0106     AC20    A8 4 20                STA    IRVANT,B
       0107     12DC    10 2 DC                LDC    $+X'FFDC'
       0108     1E00    18 6 00                LDG    I:LO,C
       0109     EDF4    E8 5 F4                SST    *WRF:,B
       010A     0000                           DAT    X'0000'
       010B     EDF6    E8 5 F6                SST    *NDF:,B
0146:  44       FORMAT(I+I,4X,'A'//)
       0064+B   3001                )44
       0065+B   0001
       0066+B   2BA0
       0067+B   6004
       0068+B   0001
       0069+B   41A0
       006A+B   1001
       006B+B   1001
       006C+B   2001
0147:           GO TO 1
       010C     756D    70 5 6D                JMP    *)1,B
0148:  48       WRITE(I:LO,49) RVPAT
       010D     12D6    10 2 D6     )48        LDC    $+X'FFD6'
       010E     1E00    18 6 00                LDG    I:LO,C
       010F     EDF4    E8 5 F4                SST    *WRF:,B
       0110     0000                           DAT    X'0000'
```

```
0111    EDF5   E8 5 F5              SST   *ARF:.B
0112    0009                        DAT   X'0009'
0113    806E                        ADL   RVPAT
0114    FDF6   E8 5 F6              SST   *NDF:.B
0149:  49     FORMAT('+',F4.0,'X'//)
006F+B  3001                    )49
0070+B  0001
0071+B  2BA0
0072+B  E001
0073+B  0200
0074+B  0001
0075+B  A5A0
0076+B  1001
0077+B  1001
0078+B  2001
0150:          GO TO 1
0115    756D   70 5 6D              JMP   *)1,B
0151:          END
0001    011C                        ADL   X'011C'
EXT M11:
EXT D11:
EXT WRF:
EXT ARF:
EXT NDF:
ARR INFILE  0000 IN INFILE
VAR IFWIDX  0000 IN IFWIDX
VAR IRVIDX  0000 IN IRVIDX
VAR FWREF   0000 IN FWREF
VAR FWPAT   0000 IN FWPAT
VAR M7F     0000 IN M7F
VAR M1      0000 IN M1
VAR RVREF   0000 IN RVREF
VAR M4000   0000 IN M4000
VAR RVPAT   0000 IN RVPAT
VAR M40     0000 IN M40
VAR I:LO    0000 IN I:LO
VAR CCONFC  0000 IN CCONFC
VAR MFF     0000 IN MFF
VAR ACONFC  001C IN INFILE
VAR BCONFC  001E IN INFILE
VAR IHEAD   0002 IN DP
VAR I       0003 IN DP
VAR J       0004 IN DP
VAR IFWFLG  0005 IN DP
VAR IRVFLG  0006 IN DP
EXT FLOAT
VAR ITEST   000C IN DP
VAR ITEMP   000D IN DP
VAR #AIA    000E IN DP
VAR #AIB    0010 IN DP
VAR #AIC    0011 IN DP
VAR #AID    0012 IN DP
VAR IFWANT  0014 IN DP
VAR IRVANT  0020 IN DP
PROGRAM SIZE: 0284    DATA POOL SIZE: 0121    ERROR COUNT: 0000
```

PROGRAM LISTING EIGHT

```
0001: C     00716 R.E. SHARPLESS   SLOWDOWN CALIBRATION PROGRAM
0002:       SUBROUTINE TRAVEL
0003: C
0004: C     THIS SUBROUTINE WILL CALCULATE THE MAXIMUM
0005: C     ERROR, MAXIMUM POSITION, AND MINIMUM POSITION
0006: C     FOR THE DRIVE IN THE CALIBRATION AREA.
0007: C
0008:       COMMON   /INFILE/INFILE(256)  /CCONFC/CCONFC
0009:      X      /CONTRV/CONTRV/IFWIDX/IFWIDX/MAXERR/MAXERR
0010:      X          /POSMAX/POSMAX       /POSMIN/POSMIN
0011:       EQUIVALENCE (INFILE(29),ACONFC),(INFILE(31),BCONFC)
0012: C
0013: C     CALCULATE MAXIMUM ERROR
```

```
0014: C
0015:       MAXERR=IFIX(CONTRV*FLOAT(INFILE(IFWIDX-1)))
      0000  0000                      DAT   X'0000'
      0001  0000                      DAT   X'0000'
      0002  2801   28 0 01             LDA   X'0001'
      0003  0AFE   08 2 FE             LDB   $+X'FFFE'
      0004  AC01   A8 4 01             STA   X'0001',B
0016: C
0017: C     CALCULATE MAXIMUM REFERENCE POSITION
0018: C
0019:       CCONFC=1./ACONFC
0020:       POSMAX=CCONFC*(FLOAT(MAXERR)+(.5*FLOAT(INFILE(IFWIDX-1)
0021:      X         -MAXERR)))+BCONFC
0022: C
0023: C     CALCULATE MINIMUM REFERENCE POSITION
0024: C
0025:       POSMIN=CCONFC*(.5*FLOAT(INFILE(IFWIDX-1)-MAXERR))
0026:      X         +BCONFC
      0005  1200   10 2 00             LDC   $+X'0000'
      0006  2E00   28 6 00             LDA   IFWIDX,C
      0007  AC02   A8 4 02             STA   #AIA,B
      0008  4200   40 2 00             ADD   =X'FFFE'
      0009  AC03   A8 4 03             STA   #AIB,B
0027:       RETURN

000A  EF00   E8 7 00             SST   *FLOAT ,B
      000B  8003                       ADL   #AIB
      000C  EDEC   E8 5 EC             SST   *M1:,B
      000D  8004                       ADL   CONTRV
      000E  AC06   A8 4 06             STA   #ARC,B
      000F  A405   A0 4 05             STE   #ARC,B
      0010  EF00   E8 7 00             SST   *IFIX,B
      0011  0005                       ADL   #ARC
      0012  1200   10 2 00             LDC   $+X'0000'
      0013  AE00   A8 6 00             STA   MAXERR,C
      0007+B 4180
      0008+B 0000
      0014  2C08   28 4 08             LDA   =X'4180' ,B
      0015  2407   20 4 07             LDE   =X'4180' ,B
      0016  EDED   E8 5 ED             SST   *D1:,B
      0017  8009                       ADL   ACONFC
      0018  1200   10 2 00             LDC   $+X'0000'
      0019  AE01   A8 6 01             STA   CCONFC,C
      001A  A600   A0 6 00             STE   CCONFC,C
      001B  2C02   28 4 02             LDA   #AIA,B
      001C  4214   40 2 14             ADD   =X'FFFE'
      001D  AC0A   A8 4 0A             STA   #AID,B
      001E  2D0A   28 5 0A             LDA   *#AID,B
      001F  120D   10 2 0D             LDC   $+X'000D'
      0020  4E00   48 6 00             SUB   MAXERR,C
      0021  AC0B   A8 4 0B             STA   #AIE,B
      0022  EF18   E8 7 18             SST   *FLOAT ,B
      0023  000B                       ADL   #AIE
      0024  EDEC   E8 5 EC             SST   *M1:,B
      000C+B 4080
      000D+B 0000
      0025  000C                       ADL   =X'4080'
      0026  AC0F   A8 4 0F             STA   #ARF,B
      0027  A40E   A0 4 0E             STE   #ARF,B
      0028  EF06   E8 7 06             SST   *FLOAT ,B
      0029  8010                       ADL   MAXERR
      002A  EDEA   E8 5 EA             SST   *A1:,B
      002B  000E                       ADL   #ARF
      002C  EDEC   E8 5 EC             SST   *M1:,B
      002D  8011                       ADL   CCONFC
      002E  EDEA   E8 5 EA             SST   *A1:,B
      002F  8012                       ADL   BCONFC
      0030  1200   10 2 00             LDC   $+X'0000'
      0031  AE01   A8 6 01             STA   POSMAX,C
      0032  A600   A0 6 00             STE   POSMAX,C
```

```
0033   2C02   28 4 02        LDA    #AIA,B
0034   4218   40 2 18        ADD    =X'FFFE'
0035   AC13   A8 4 13        STA    #AIG,B
0036   2D13   28 5 13        LDA    **#AIG,B
0037   1218   12 2 18        LDC    $+X'0018'
0038   4E00   48 6 00        SUB    MAXERR,C
0039   AC14   A8 4 14        STA    #AIH,B
003A   EF12   E8 7 12        SST    *FLOAT ,B
003B   0014                  ADL    #AIH
003C   EDEC   E8 5 EC        SST    *M11:,B
003D   000C                  ADL    =X'4080'
003E   EDEC   E8 5 EC        SST    *M11:,B
003F   8011                  ADL    CCONFC
0040   EDEA   E8 5 EA        SST    *A11:,B
0041   8012                  ADL    BCONFC
0042   1220   12 2 20        LDC    $+X'0020'
0043   AE01   A8 6 01        STA    POSMIN,C
0044   A600   A0 6 00        STC    POSMIN,C
0045   0C01   0B 4 01        LDB    X'0001' ,B
0046   E401   E0 4 01        EST    X'0001' ,B
0028:                        END

LPL
0047   7200   70 2 00        JMP    $+X'0000'
0048   0000                  DAT    X'0000'
0049   0000                  DAT    X'0000'
004A   0000                  DAT    X'0000'
004B   FFFE                  DAT    X'FFFE'
004C   0000                  DAT    X'0000'
004D   0000                  DAT    X'0000'
004E   0000                  DAT    X'0000'
004F   0000                  DAT    X'0000'
0001   0056                  ADL    X'0056'
       EXT  A11:
       EXT  M11:
       EXT  D11:
       ARR  INFILE   0000 IN INFILE
       VAR  CCONFC   0000 IN CCONFC
       VAR  CONTRV   0000 IN CONTRV
       VAR  IFWIDX   0000 IN IFWIDX
       VAR  MAXERR   0000 IN MAXERR
       VAR  POSMAX   0000 IN POSMAX
       VAR  POSMIN   0000 IN POSMIN
       VAR  ACONFC   001C IN INFILE
       VAR  BCONFC   001E IN INFILE
       EXT  IFIX
       EXT  FLOAT
       VAR  #AIA     0002 IN DP
       VAR  #AIB     0008 IN DP
       VAR  #AIE     000B IN DP
       VAR  #ARF     000E IN DP
       VAR  #AIG     0013 IN DP
       VAR  #AIH     0014 IN DP
PROGRAM SIZE: 0086    DATA POOL SIZE: 0021    ERROR COUNT: 0000
```

PROGRAM LISTING NINE

```
0001: C       00716 R.E. SHARPLESS  SLOWDOWN CALIBRATION PROGRAM
0002:         SUBROUTINE PRODAT
0003: C
0004: C       THIS SUBROUTINE WILL SET UP THE DATA NEEDED
0005: C       TO DETERMINE THE FIRST,LAST,AND WORKING POINT
0006: C       FOR THE PROFILES.
0007: C
0008:         COMMON/INFILE/INFILE(256)/MFF/MFF/IFWIDX/IFWIDX
0009:       X       /IRVIDX/IRVIDX/MAXFWD/MAXFWD/MAXREV/MAXREV
0010:       X       /MINFWD/MINFWD/MINREV/MINREV/IFWPNT/IFWPNT
0011:       X       /IRVPNT/IRVPNT
0012:         EQUIVALENCE(INFILE(2),IFWARD),(INFILE(3),IREVRS)
0013: C
```

```
0014: C          CALCULATE INDEXES FOR PROFILES
0015: C
0016: S          LDA     IFWARD
       0000      0000                            DAT     X'0000'
       0001      0000                            DAT     X'0000'
       0002      2801      28 0 01               LDA     X'0001'
       0003      0AFE      08 2 FE               LDB     $+X'FFFE'
       0004      AC01      A8 4 01               STA     X'0001',B
       0005      1200      10 2 00               LDC     $+X'0000'
       0006      2E01      28 6 01               LDA     IFWARD,C
0017: S          AND     MFF
       0007      1200      10 2 00               LDC     $+X'0000'
       0008      5E00      58 6 00               AND     MFF ,C
0018: S          STA     IFWIDX
       0009      1200      10 2 00               LDC     $+X'0000'
       000A      AE00      A8 6 00               STA     IFWIDX,C
0019: S          INC     IFWIDX
       000B      1202      10 2 02               LDC     $+X'0002'
       000C      6600      60 6 00               INC     IFWIDX,C
0020: S          LDA     IREVRS
       000D      1208      10 2 08               LDC     $+X'0008'
       000E      2E02      28 6 02               LDA     IREVRS,C
0021: S          AND     MFF
       000F      1208      10 2 08               LDC     $+X'0008'
       0010      5E00      58 6 00               AND     MFF ,C
0022: S          STA     IRVIDX
       0011      1200      10 2 00               LDC     $+X'0000'
       0012      AE00      A8 6 00               STA     IRVIDX,C
0023: S          INC     IRVIDX
       0013      1202      10 2 02               LDC     $+X'0002'
       0014      6600      60 6 00               INC     IRVIDX,C
0024: C
0025: C          SET POINTERS FOR MAXIMUM ERROR POINTS IN CURVES
0026: C
0027:            MAXFWD=IFWIDX
0028:            MAXREV=IRVIDX
0029: C
0030: C          FIND LAST POINT IN EACH CURVE AND SET POINTERS
0031: C          FOR MINIMUM ERROR POINTS IN CURVES.
0032: C
0033:            I=IFWIDX
       0015      120A      10 2 0A               LDC     $+X'000A'
       0016      2E00      28 6 00               LDA     IFWIDX,C
       0017      1200      10 2 00               LDC     $+X'0000'
       0018      AE00      A8 6 00               STA     MAXFWD,C
       0019      1206      10 2 06               LDC     $+X'0006'
       001A      2E00      28 6 00               LDA     IRVIDX,C
       001B      1200      10 2 00               LDC     $+X'0000'
       001C      AE00      A8 6 00               STA     MAXREV,C
       001D      1208      10 2 08               LDC     $+X'0008'
       001E      2E00      28 6 00               LDA     IFWIDX,C
       001F      AC02      A8 4 02               STA     I ,B
0034:  10        IF(INFILE(I).EQ.0) GO TO 20
       0020      2C02      28 4 02      )10      LDA     I ,B
       0021      4200      40 2 00               ADD     =X'FFFF'
       0022      AC03      A8 4 03               STA     #AIA,B
       0023      2D03      28 5 03               LDA     *#AIA,B
       0024      F201      F0 2 01               ZJP     $+X'0001'
       0025      7200      70 2 00               JMP     $+X'0000'
       0026      7504      70 5 04               JMP     *)20 ,B
0035:            I=I+2
0036:            GO TO 10
       0027      2C02      28 4 02               LDA     I ,B
       0005+B    0002
       0028      4405      40 4 05               ADD     =X'0002' ,B
       0029      AC02      A8 4 02               STA     I ,B
       002A      72F5      70 2 F5               JMP     )10
0037:  20        MINFWD=I-2
0038:            I=IRVIDX
       002B      2C02      28 4 02               LDA     I ,B
```

```
        002C    4C05    48 4 05              SUB    =X'0002',B
        002D    1200    10 2 00              LDC    $+X'0000'
        002E    AE00    A8 6 00              STA    MINFWD,C
        002F    1216    10 2 16              LDC    $+X'0016'
        0030    2E00    28 6 00              LDA    IRVIDX,C
        0031    AC02    A8 4 02              STA    I ,B
0039:  30       IF(INFILE(I).EQ.0) GO TO 40
        0032    2C02    28 4 02      )30     LDA    I ,B
        0033    4212    40 2 12              ADD    =X'FFFF'
        0034    AC03    A8 4 03              STA    #AIA,B
        0035    2D03    28 5 03              LDA    *#AIA,B
        0036    F201    F0 2 01              ZJP    $+X'0001'
        0037    7200    70 2 00              JMP    $+X'0000'
        0038    7506    70 5 06              JMP    *)40 ,B
0040:           I=I+2
0041:           GO TO 30
        0039    2C02    28 4 02              LDA    I ,B
        003A    4405    40 4 05              ADD    =X'0002',B
        003B    AC02    A8 4 02              STA    I ,B
        003C    72F5    70 2 F5              JMP    )30
0042:  40       MINREV=I-2
0043: C
0044: C         SET OPERATING POINTERS FOR CURVES
0045: C
0046:           IFWPNT=MINFWD+2
0047:           IRVPNT=MINREV+2
0048:           RETURN
        003D    2C02    28 4 02              LDA    I ,B
        003E    4C05    48 4 05              SUB    =X'0002',B
        003F    1200    10 2 00              LDC    $+X'0000'
        0040    AE00    A8 6 00              STA    MINREV,C
        0041    1214    10 2 14              LDC    $+X'0014'
        0042    2E00    28 6 00              LDA    MINFWD,C
        0043    4405    40 4 05              ADD    =X'0002',B
        0044    1200    10 2 00              LDC    $+X'0000'
        0045    AE00    A8 6 00              STA    IFWPNT,C
        0046    1207    10 2 07              LDC    $+X'0007'
        0047    2E00    28 6 00              LDA    MINREV,C
        0048    4405    40 4 05              ADD    =X'0002',B
        0049    1200    10 2 00              LDC    $+X'0000'
        004A    AE00    A8 6 00              STA    IRVPNT,C
        004B    0C01    08 4 01              LDB    X'0001',B
        004C    E401    E0 4 01              EST    X'0001',B
0049:           END

LPL
        004D    7200    70 2 00              JMP    $+X'0000'
        004E    0000                         DAT    X'0000'
        004F    0000                         DAT    X'0000'
        0050    0000                         DAT    X'0000'
        0051    0000                         DAT    X'0000'
        0052    0000                         DAT    X'0000'
        0053    0000                         DAT    X'0000'
        0054    FFFF                         DAT    X'FFFF'
        0055    0000                         DAT    X'0000'
        0056    0000                         DAT    X'0000'
        0057    0000                         DAT    X'0000'
        0058    0000                         DAT    X'0000'
        0001    005F                         ADL    X'005F'
   ARR INFILE   0000 IN INFILE
   VAR MFF      0000 IN MFF
   VAR IFWIDX   0000 IN IFWIDX
   VAR IRVIDX   0000 IN IRVIDX
   VAR MAXFWD   0000 IN MAXFWD
   VAR MAXREV   0000 IN MAXREV
   VAR MINFWD   0000 IN MINFWD
   VAR MINREV   0000 IN MINREV
   VAR IFWPNT   0000 IN IFWPNT
   VAR IRVPNT   0000 IN IRVPNT
   VAR IFWARD   0001 IN INFILE
```

```
VAR IREVRS    0002 IN INFILE
VAR I         0002 IN DP
VAR MAIA      0003 IN DP
PROGRAM SIZE: 0095    DATA POOL SIZE: 0007    ERROR COUNT: 0000
```

PROGRAM LISTING TEN

```
0001: C      H0716  R.E. SHARPLESS    SLOWDOWN CALIBRATION PROGRAM
0002:        SUBROUTINE DSTOPT
0003: C
0004: C      THIS SUBROUTINE IS THE PROFILE DISTANCE
0005: C      OPTIMIZATION. THE ROUTINE IS REQUESTED BY
0006: C      A"4" IN THE ROUTINE NUMBER OF THE OPERATOR
0007: C      INPUT.
0008: C
0009:        COMMON/INREG/INREG /IREGNM/IREGNM /IERR/IERRQ
0010:     X       /I:LO/I:LO/LOCEND/LOCEND/MINFWD/MINFWD
0011:     X       /MINREV/MINREV/MAXFWD/MAXFWD/MAXREV/MAXREV
0012:     X       /M4000/M4000/MAXERR/MAXERR/LOCEXC/LOCEXC
0013:     X       /I:OLTR/I:OLTR/I:NLTR/I:NLTR/I:KLTR/I:KLTR
0014:     X       /INFILE/INFILE(256)/IPROFG/IPROFG
0015:     X       /INSAVE/INSAVE/INLOC/INLOC/IOLDAD/IOLDAD
0016:     X       /INBUF/INBUF(156)
0017:     X       /IRVFLG/IRVFLG /IFWFLG/IFWFLG /IFWTRY/IFWTRY
0018:     X       /IRVTRY/IRVTRY /ITERM/ITERM
0019: C
0020: C      CHECK FOR CORRECT FILE IN CALIBRATION AREA
0021: C
0022:        IF (INREG.EQ.IREGNM) GO TO 410
     0000   0000                       DAT     X'0000'
     0001   0000                       DAT     X'0000'
     0002   2801    28 0 01             LDA     X'0001'
     0003   0AFE    08 2 FE             LDB     $+X'FFFE'
     0004   AC01    A8 4 01             STA     X'0001' ,B
     0005   1200    10 2 00             LDC     $+X'0000'
     0006   2E00    28 6 00             LDA     INREG ,C
     0007   1200    10 2 00             LDC     $+X'0000'
     0008   4E00    48 6 00             SUB     IREGNM,C
     0009   F201    F0 2 01             ZJP     $+X'0001'
     000A   7200    70 2 00             JMP     $+X'0000'
0023: C
0024: C      SET ERROR INDICATOR
0025: C
     000B   7502    70 5 02             JMP     *)410,B
0026:        IERR=40
0027:        CALL PRTMSG
   0003+B   0028
     000C   2C03    28 4 03             LDA     =X'0028' ,B
     000D   1200    10 2 00             LDC     $+X'0000'
     000E   AE00    A8 6 00             STA     IERR,C
     000F   EF00    E8 7 00             SST     *PRTMSG,B
0028:        RETURN
0029: C
0030: C      CORRECT FILE IN CALIBRATION AREA. SET UP DATA
0031: C      FOR CALIBRATION.
0032: C
     0010   0C01    08 4 01             LDB     X'0001' ,B
     0011   E401    E0 4 01             EST     X'0001' ,B
0033:   410  CALL PRODAT
0034: C
0035: C      SET UP DATA FOR MAXIMUM ERROR. MAXIMUM POSITION.
0036: C      AND MINIMUM POSITION FOR THIS DRIVE.
0037: C
     0012   EF00    E8 7 00             SST     *PRODAT,B
0038:        CALL TRAVEL
0039: C
0040: C      SET ALL POINTS IN PROFILES TO MAXERR
0041: C      EXCEPT FOR LAST AND ANTICIPATE POINTS.
0042: C
     0013   EF00    E8 7 00             SST     *TRAVEL,B
0043:        IFLAG=1
```

```
0044:          I=MAXFWD
0045:          K=MINFWD
0046:          GO TO 425
   0007+B      0001
   0014        2C07    28 4 07              LDA    =X'0001',B
   0015        AC04    A8 4 04              STA    IFLAG,B
   0016        1200    10 2 00              LDC    $+X'0000'
   0017        2E00    28 6 00              LDA    MAXFWD,C
   0018        AC05    A8 4 05              STA    I,B
   0019        1200    10 2 00              LDC    $+X'0000'
   001A        2E00    28 6 00              LDA    MINFWD,C
   001B        AC06    A8 4 06              STA    K,B
   001C        7508    70 5 08              JMP    *)425,B
0047:   419    IF(IFLAG.EQ.2) GO TO 435
   001D        2C04    28 4 04     )419     LDA    IFLAG,B
   0009+B      0002
   001E        4C09    48 4 09              SUB    =X'0002',B
   001F        F201    F0 2 01              ZJP    $+X'0001'
   0020        7200    70 2 00              JMP    $+X'0000'
   0021        750A    70 5 0A              JMP    *)435,B
0048:   420    IFLAG=2
0049:          I=MAXREV
0050:          K=MINREV
   0022        2C09    28 4 09              LDA    =X'0002',B
   0023        AC04    A8 4 04              STA    IFLAG,B
   0024        1200    10 2 00              LDC    $+X'0000'
   0025        2E00    28 6 00              LDA    MAXREV,C
   0026        AC05    A8 4 05              STA    I,B
   0027        1200    10 2 00              LDC    $+X'0000'
   0028        2E00    28 6 00              LDA    MINREV,C
   0029        AC06    A8 4 06              STA    K,B
0051:   425    IF(I.EQ.K) GO TO 419
   002A        2C05    28 4 05     )425     LDA    I,B
   002B        4C06    48 4 06              SUB    K,B
   002C        F201    F0 2 01              ZJP    $+X'0001'
   002D        7200    70 2 00              JMP    $+X'0000'
   002E        72EE    70 2 EE              JMP    )419
0052:          ITEMP=INFILE(I+1)
0053: C
0054: C        CHECK FOR ANTICIPATE POINT
0055: C
0056: S        LDA   ITEMP
   002F        2C05    28 4 05              LDA    I,B
   0030        4200    40 2 00              ADD    =X'0000'
   0031        AC0C    A8 4 0C              STA    #AIA,B
   0032        2D0C    28 5 0C              LDA    *#AIA,B
   0033        AC0B    A8 4 0B              STA    ITEMP,B
   0034        2C0B    28 4 0B              LDA    ITEMP,B
0057: S        AND   M4000
   0035        1200    10 2 00              LDC    $+X'0000'
   0036        5E00    58 6 00              AND    M4000,C
0058: S        STA   ITEMP
   0037        AC0B    A8 4 0B              STA    ITEMP,B
0059:          IF(ITEMP.NE.0) GO TO 430
   0038        2C0B    28 4 0B              LDA    ITEMP,B
   0039        F200    F0 2 00              ZJP    $+X'0000'
   003A        750D    70 5 0D              JMP    *)430,B
0060:          INFILE(I)=MAXERR
   003B        2C05    28 4 05              LDA    I,B
   003C        4200    40 2 00              ADD    =X'FFFF'
   003D        AC0C    A8 4 0C              STA    #AIA,B
   003E        1200    10 2 00              LDC    $+X'0000'
   003F        2E00    28 6 00              LDA    MAXERR,C
   0040        AD0C    A8 5 0C              STA    *#AIA,B
0061:   430    I=I+2
0062:          GO TO 425
   0041        2C05    28 4 05              LDA    I,B
   0042        4409    40 4 09              ADD    =X'0002',B
   0043        AC05    A8 4 05              STA    I,B
0063: C
```

```
0064: C       OUTPUT SLOWDOWN CURVES FOR OPERATOR INSPECTION
0065: C
     0044    72E5   70 2 E5                  JMP     )425
0066:  435   CALL PRTPRF
0067: C
0068: C       OUTPUT MESSAGE FOR OPERATOR VERIFICATION
0069: C
     0045    EF00   E8 7 00                  SST     *PRTPRF,B
0070:  440   WRITE(I:LO,441)
     0046    1200   10 2 00        )440      LDC     $+X'0000'
     0047    1E00   18 6 00                  LDG     I:LO,C
     0048    EDF4   E8 5 F4                  SST     *WRF:,B
     0049    0000                            DAT     X'0000'
     004A    EDF6   E8 5 F6                  SST     *NDF:,B
0071:  441   FORMAT(1X,'INPUT AN "OK" OR "NO" '//)
     000E+B  3001                  )441
     000F+B  6001
     0010+B  0016
     0011+B  C94E
     0012+B  5055
     0013+B  D4A0
     0014+B  414E
     0015+B  A022
     0016+B  CF4B
     0017+B  22A0
     0018+B  CFD2
     0019+B  A022
     001A+B  4ECF
     001B+B  22A0
     001C+B  1001
     001D+B  1001
     001E+B  2001
0072: C
0073: C       INPUT OPERATOR'S MESSAGE
0074: C
0075:         CALL READIN
0076: C
0077: C       CHECK FOR FORMAT ERROR OR AN ABORT
0078: C
     004B    EF00   E8 7 00                  SST     *READIN,B
0079:         GO TO (446,443,445),IERR
     004C    EF00   E8 7 00                  SST     *GOT:,B
     004D    0004                            DAT     X'0004'
     004E    0000                            ADL     )446
     004F    0000                            ADL     )443
     0050    0000                            ADL     )445
0080: C
0081: C       ABORT
0082: C
     0051    801F                            ADL     IERR
0083:  445   RETURN
0084: C
0085: C       FORMAT ERROR
0086: C
     0052    0C01   08 4 01        )445      LDB     X'0001' ,B
     0053    E401   E0 4 01                  EST     X'0001' ,B

LPL
     0054    7200   70 2 00                  JMP     $+X'0000'
     0055    0000                            DAT     X'0000'
     0056    0000                            DAT     X'0000'
     0057    0000                            DAT     X'0000'
     0058    0000                            DAT     X'0000'
     0059    0000                            DAT     X'0000'
     005A    0000                            DAT     X'0000'
     005B    0000                            DAT     X'0000'
     005C    0000                            DAT     X'0000'
     005D    0000                            DAT     X'0000'
     005E    0000                            DAT     X'0000'
     005F    0000                            DAT     X'0000'
```

```
        0060    0000                        DAT   X'0000'
        0061    FFFF                        DAT   X'FFFF'
        0062    0000                        DAT   X'0000'
        0063    0000                        DAT   X'0000'
        0064    0000                        DAT   X'0000'
        0065    0000                        DAT   X'0000'
        0066    0000                        DAT   X'0000'
0087:   443     IERR=41
        002A+B  0029            )443
        0067    2C29    28 4 29             LDA   =X'0029',B
        0068    12EF    10 2 EF             LDC   $+X'FFEF'
        0069    AE00    A8 6 00             STA   IERR,C
0088:   444     CALL PRTMSG
        006A    EFEE    E8 7 EE )444        SST   *PRTMSG,B
0089:           GO TO 440
0090: C

0091: C        CHECK OPERATOR INPUT FOR VALIDITY
0092: C
        006B    72DA    70 2 DA             JMP   )440
0093:   446     IF(INBUF(LOCEND).NE.I$OLTR) GO TO 450
        006C    1200    10 2 00 )446        LDC   $+X'0000'
        006D    2E00    28 6 00             LDA   LOCEND,C
        006E    4200    40 2 00             ADD   =X'FFFF'
        006F    AC0C    A8 4 0C             STA   #AIA,B
        0070    2D0C    28 5 0C             LDA   **#AIA,B
        0071    1200    10 2 00             LDC   $+X'0000'
        0072    4E00    48 6 00             SUB   I$OLTR,C
        0073    F200    F0 2 00             ZJP   $+X'0000'
        0074    7521    70 5 21             JMP   *)450,B
0094:           LOCEND=LOCEND-1
0095:           IF(INBUF(LOCEND).NE.I$NLTR) GO TO 448
        0075    1209    10 2 09             LDC   $+X'0009'
        0076    6E00    68 6 00             DCR   LOCEND,C
        0077    2E00    28 6 00             LDA   LOCEND,C
        0078    420A    40 2 0A             ADD   =X'FFFF'
        0079    AC0C    A8 4 0C             STA   #AIA,B
        007A    2D0C    28 5 0C             LDA   **#AIA,B
        007B    1200    10 2 00             LDC   $+X'0000'
        007C    4E00    48 6 00             SUB   I$NLTR,C
        007D    F200    F0 2 00             ZJP   $+X'0000'
        007E    7522    70 5 22             JMP   *)448,B

0096:           IF(LOCEND-1.NE.LOCEXC) GO TO 443
        007F    120A    10 2 0A             LDC   $+X'000A'
        0080    2E00    28 6 00             LDA   LOCEND,C
        0081    6805    68 0 05             DCR   X'0005'
        0082    1200    10 2 00             LDC   $+X'0000'
        0083    4E00    48 6 00             SUB   LOCEXC,C
        0084    F200    F0 2 00             ZJP   $+X'0000'
        0085    72E1    70 2 E1             JMP   )443
0097:           RETURN
0098: C
0099: C        NOT EXPECTED INPUT
0100: C
        0086    0C01    08 4 01             LDB   X'0001',B
        0087    E401    E0 4 01             EST   X'0001',B
0101:   448     IERR=42
0102:           GO TO 444
        0023+B  002A
        0088    2C23    28 4 23             LDA   =X'002A',B
        0089    12CE    10 2 CE             LDC   $+X'FFCE'

008A    AE00    A8 6 00             STA   IERR,C
        008B    72DE    70 2 DE             JMP   )444
0103:   450     IF(INBUF(LOCEND).NE.I$KLTR) GO TO 448
        008C    120D    10 2 0D )450        LDC   $+X'000D'
        008D    2E00    28 6 00             LDA   LOCEND,C
        008E    4216    40 2 16             ADD   =X'FFFF'
        008F    AC0C    A8 4 0C             STA   #AIA,B
        0090    2D0C    28 5 0C             LDA   **#AIA,B
        0091    1200    10 2 00             LDC   $+X'0000'
        0092    4E00    48 6 00             SUB   I$KLTR,C
```

```
       0093    F200  F0 2 00            ZJP    $+X'0000'
       0094    72F3  70 2 F3            JMP    )448
0104:          LOCEND=LOCEND-1
0105:          IF(INBUF(LOCEND).NE.I:OLTR) GO TO 448
       0095    1209  10 2 09            LDC    $+X'0009'
       0096    6E00  68 6 00            DCR    LOCEND,C
       0097    2E00  28 6 00            LDA    LOCEND,C
       0098    420A  40 2 0A            ADD    =X'FFFF'
       0099    AC0C  A8 4 0C            STA    #AIA,B
       009A    2D0C  28 5 0C            LDA    *#AIA,B
       009B    122A  10 2 2A            LDC    $+X'002A'
       009C    4E00  48 6 00            SUB    I:OLTR,C
       009D    F200  F0 2 00            ZJP    $+X'0000'
       009E    7248  70 2 48            JMP    )448
0106:          IF(LOCEND-1.NE.LOCEXC) GO TO 443
       009F    120A  10 2 0A            LDC    $+X'000A'
       00A0    2E00  28 6 00            LDA    LOCEND,C
       00A1    6805  68 0 05            DCR    X'0005'
       00A2    1220  10 2 20            LDC    $+X'0020'
       00A3    4E00  48 6 00            SUB    LOCEXC,C
       00A4    F200  F0 2 00            ZJP    $+X'0000'
0107: C
0108: C        START CALIBRATION - SET ADDRESS IN POSITION
0109: C        REGULATOR PACKAGE TO POINT TO INFILE.
0110: C
       00A5    72C1  70 2 C1            JMP    )443
0111: S        LDA    INLOC
       00A6    1200  10 2 00            LDC    $+X'0000'
       00A7    2E00  28 6 00            LDA    INLOC ,C
0112: S        STA    *IOLDAD
       00A8    AF00  A8 7 00            STA    *IOLDAD
0113: C
0114: C        SET FLAGS
0115: C
0116:          IRVFLG=0
0117:          IFWFLG=0
0118:          IFWTRY=0
0119:          IRVTRY=0
0120:          ITERM=0
0121:          IPROFG=0
       00AA    1200  10 2 00            LDC    $+X'0000'
       00AB    3E00  38 6 00            STZ    IRVFLG,C
       00AC    3E00  38 6 00            STZ    IFWFLG,C
       00AE    1200  10 2 00            LDC    $+X'0000'
       00AF    3E00  38 6 00            STZ    IFWTRY,C
       00B0    1200  10 2 00            LDC    $+X'0000'
       00B1    3E00  38 6 00            STZ    IRVTRY,C
       00B2    1200  10 2 00            LDC    $+X'0000'
       00B3    3E00  38 6 00            STZ    ITERM ,C
       00B4    1200  10 2 00            LDC    $+X'0000'
       00B5    3E00  38 6 00            STZ    IPROFG,C
0122:  460    CALL FWDDO
       00B6    EF00  E8 7 00   )460     SST    *FWDDO ,B
0123:          IF(ITERM.EQ.1) GO TO 470
       00B7    1205  10 2 05            LDC    $+X'0005'
       00B8    2E00  28 6 00            LDA    ITERM ,C
       00B9    6805  68 0 05            DCR    X'0005'

LPL
       00BA    7200  70 2 00            JMP    $+X'0000'
       00BB    0000                     DAT    X'0000'
       00BC    FFFF                     DAT    X'FFFF'
       00BD    0000                     DAT    X'0000'
       00BE    0000                     DAT    X'0000'
       00BF    0000                     DAT    X'0000'
       00C0    0000                     DAT    X'0000'
       00C1    0000                     DAT    X'0000'
       00C2    0000                     DAT    X'0000'
```

```
        00C3    0000                            DAT     X'0000'
        00C4    0000                            DAT     X'0000'
        00C5    0000                            DAT     X'0000'
        00C6    0000                            DAT     X'0000'
        00C7    0000                            DAT     X'0000'
        00C8    0000                            DAT     X'0000'
        00C9    0000                            DAT     X'0000'
        00CA    F201    F0 2 01                 ZJP     $+X'0001'
        00CB    7200    70 2 00                 JMP     $+X'0000'
        00CC    7524    70 5 24                 JMP     *)470,B
0124:           CALL REVDO
        00CD    EF00    E8 7 00                 SST     *REVDO ,B
0125:           IF(ITERM.EQ.1) GO TO 470
        00CE    12F9    10 2 F9                 LDC     $+X'FFF9'
        00CF    2E00    28 6 00                 LDA     ITERM ,C
        00D0    6805    68 0 05                 DCR     X'0005'
        00D1    F201    F0 2 01                 ZJP     $+X'0001'
        00D2    7200    70 2 00                 JMP     $+X'0000'
        00D3    7524    70 5 24                 JMP     *)470,B
0126:           IF(IPROFG.NE.2) GO TO 460
        00D4    12F4    10 2 F4                 LDC     $+X'FFF4'
        00D5    2E00    28 6 00                 LDA     IPROFG,C
        00D6    4C09    48 4 09                 SUB     =X'0002' ,B
        00D7    5200    50 2 00                 ZJP     $+X'0000'
                                                JMP     *)460
0127:   470     CONTINUE
0128:   C
0129:   C       CALIBRATION COMPLETE - RESET ADDRESS IN
0130:   C       POSITION REGULATOR PACKAGE FOR ORIGINAL
0131:   C       FILE.
0132:   C
0133:   S       LDA     INSAVE
        00D9    1200    10 2 00                 LDC     $+X'0000'
        00DA    2E00    28 6 00                 LDA     INSAVE,C
0134:   S       STA     *IOLDAD
        00DB    12E7    10 2 E7                 LDC     $+X'FFE7'
        00DC    AF00    A8 7 00                 STA     *IOLDAD,C
0135:           IF(ITERM.EQ.1) RETURN
        00DD    12EA    10 2 EA                 LDC     $+X'FFEA'
        00DE    2E00    28 6 00                 LDA     ITERM ,C
        00DF    6805    68 0 05                 DCR     X'0005'
        00E0    F201    F0 2 01                 ZJP     $+X'0001'
        00E1    7200    70 2 00                 JMP     $+X'0000'
0136:   C
0137:   C       OUTPUT NEW CURVES FOR OPERATOR INSPECTION
0138:   C
        00E2    0C01    08 4 01                 LDB     X'0001' ,B
        00E3    E401    E0 4 01                 EST     X'0001' ,B
0139:           CALL PRTPRF
        00E4    EF00    E8 7 00                 SST     *PRTPRF,B
0140:           RETURN
        00E5    0C01    08 4 01                 LDB     X'0001' ,B
        00E6    E401    E0 4 01                 EST     X'0001' ,B
0141:           END

LPL
        00E7    7200    70 2 00                 JMP     $+X'0000'
        00E8    0063                            ADL     X'0063'
        00E9    0000                            DAT     X'0000'
        00EA    0000                            DAT     X'0000'
        0001    00F1                            ADL     X'00F1'
    EXT WRF:
    EXT NDF:
    VAR INREG    0000 IN INREG
    VAR IREGNM   0000 IN IREGNM
    VAR IERR     0000 IN IERR
    VAR I:LO     0000 IN I:LO
    VAR LOCEND   0000 IN LOCEND
    VAR MINFWD   0000 IN MINFWD
    VAR MINREV   0000 IN MINREV
```

```
VAR MAXFWD    0000 IN MAXFWD
VAR MAXREV    0000 IN MAXREV
VAR M4000     0000 IN M4000
VAR MAXERR    0000 IN MAXERR
VAR LOCEXC    0000 IN LOCEXC
VAR I:OLTR    0000 IN I:OLTR
VAR I:NLTR    0000 IN I:NLTR
VAR I:KLTR    0000 IN I:KLTR
ARR INFILE    0000 IN INFILE
VAR IPROFG    0000 IN IPROFG
VAR INSAVE    0000 IN INSAVE
VAR INLOC     0000 IN INLOC
VAR IOLDAD    0000 IN IOLDAD
ARR INBUF     0000 IN INBUF
VAR IRVFLG    0000 IN IRVFLG
VAR IFWFLG    0000 IN IFWFLG
VAR IFWTRY    0000 IN IFWTRY
VAR IRVTRY    0000 IN IRVTRY
VAR ITERM     0000 IN ITERM
EXT PRTMSG
EXT PRODAT
EXT TRAVEL
VAR IFLAG     0004 IN DP
VAR I         0005 IN DP
VAR K         0006 IN DP
VAR ITEMP     000B IN DP
VAR IAIA      000C IN DP
EXT PRTPRF
EXT READIN
EXT GOT:
EXT FWDDO
EXT REVDO
PROGRAM SIZE: 0241   DATA POOL SIZE: 0037   ERROR COUNT:  0000
```

PROGRAM LISTING ELEVEN

```
05:       X        /M3F/M3F /ICOMMA/ICOMMA /MFF/MFF /M4000/M4000
0006:     X        /M40/M40 /M7F/M7F /M1/M1 /I:OLTR/I:OLTR
0007:     X        /I:NLTR/I:NLTR /I:KLTR/I:KLTR
0008:     X        /CONTRV/CONTRV  /CONERR/CONERR  /CONPOS/CONPOS.
0009:     X        /M8000/M8000
0010:     X        /INMTRY/INMTRY /CONOFF/CONOFF
0011:     DATA     IEXCLM/$21/,ISPACE/$20/,IRETRN/$8D/,M3F/$3F/
0012:     X.       ICOMMA/$2C/,MFF/$FF/,M4000/$4000/,M40/$40/,
0013:     X.       M7F/$7F/,M1/$1/,I:OLTR/$F/,I:NLTR/$E/
0014:     X.       I:KLTR/$B/
0015:     X.       CONTRV/.75/,CONERR/.75/,CONPOS/.75/
0016:     X.       M8000/$8000/
0017:     X.       INMTRY/5/,CONOFF/50.0/
0018:     END
VAR IEXCLM    0000 IN IEXCLM
VAR ISPACE    0000 IN ISPACE
VAR IRETRN    0000 IN IRETRN
VAR M3F       0000 IN M3F
VAR ICOMMA    0000 IN ICOMMA
VAR MFF       0000 IN MFF
VAR M4000     0000 IN M4000
VAR M40       0000 IN M40
VAR M7F       0000 IN M7F
VAR M1        0000 IN M1
VAR I:OLTR    0000 IN I:OLTR
VAR I:NLTR    0000 IN I:NLTR
VAR I:KLTR    0000 IN I:KLTR
VAR CONTRV    0000 IN CONTRV
VAR CONERR    0000 IN CONERR
VAR CONPOS    0000 IN CONPOS
VAR M8000     0000 IN M8000
VAR INMTRY    0000 IN INMTRY
VAR CONOFF    0000 IN CONOFF
PROGRAM SIZE: 0000   DATA POOL SIZE: 0000   ERROR COUNT:  0000
```

PROGRAM LISTING TWELVE

```
0001: C     00716 R.E.SHARPLESS SLOWDOWN CALIBRATION PROGRAM
0002:       SUBROUTINE FWDDO
0003: C
0004: C     THIS SUBROUTINE WILL CALIBRATE THE FORWARD
0005: C     SLOWDOWN PROFILES FOR THE DISTANCE OPTIMIZATION
0006: C     SUBROUTINE.
0007: C
0008:       COMMON/IFWFLG/IFWFLG/IFWTRY/IFWTRY/IFWPNT/IFWPNT
0009:     X       /MAXFWD/MAXFWD /IPROFG/IPROFG /M4000/M5000
0010:     X       /INFILE/INFILE(256)/MINFWD/MINFWD
0011:     X       /FPOSER/FPOSER/CCONFC/CCONFC/MAXERR/MAXERR
0012:     X       /CONERR/CONERR/POSREF/POSREF/IREADY/IREADY
0013:     X       /IERR/IERR/ITERM/ITERM
0014:     X       /INREG/INREG /CONPOS/CONPOS
0015:     X       /INMTRY/INMTRY
0016:     X        /MFF/MFF  /M40/M40  /M7F/M7F  /M1/M1
0017:     X       /CONOFF/CONOFF
0018:       EQUIVALENCE(INFILE(33),IACCUR)
0019:     X,           (INFILE(29),ACONFC)
0020: C
0021: C    CHECK FOR CURVE ALREADY CALIBRATED
0022: C
0023:       IF(IFWFLG.NE.1) GO TO 10
    0000   0000                           DAT    X'0000'
    0001   0000                           DAT    X'0000'
    0002   2801    28 0 01                LDA    X'0001'
    0003   0AFE    08 2 FE                LDB    $+X'FFFE'
    0004   AC01    A8 4 01                STA    X'0001',B
    0005   1200    10 2 00                LDC    $+X'0000'
    0006   2E00    28 6 00                LDA    IFWFLG,C
    0007   6805    68 0 05                DCR    X'0005'
    0008   F200    F0 2 00                ZJP    $+X'0000'
    0009   7502    70 5 02                JMP    *)10 ,B
0024:       RETURN
0025: C
0026: C    CHECK IF FIRST TIME THROUGH FOR THIS POINT
0027: C
    000A   0C01    08 4 01                LDB    X'0001',B
    000B   E401    E0 4 01                EST    X'0001',B
0028:  10   IF(IFWTRY.NE.0) GO TO 40
    000C   1200    10 2 00     )10        LDC    $+X'0000'
    000D   2E00    28 6 00                LDA    IFWTRY,C
    000E   F200    F0 2 00                ZJP    $+X'0000'
0029: C
0030: C    CHECK TO SEE IF LAST POINT WAS CALIBRATED
0031: C
    000F   7503    70 5 03                JMP    *)40 ,B
0032:  12   IF(IFWPNT.NE.MAXFWD) GO TO 15
    0010   1200    10 2 00     )12        LDC    $+X'0000'
    0011   2E00    28 6 00                LDA    IFWPNT,C
    0012   1200    10 2 00                LDC    $+X'0000'
    0013   4E00    48 6 00                SUB    MAXFWD,C
    0014   F200    F0 2 00                ZJP    $+X'0000'
0033: C
0034: C    CALIBRATION COMPLETE FOR FORWARD PROFILE
0035: C
    0015   7504    70 5 04                JMP    *)15 ,B
0036:       IFWFLG=1
0037:       IPROFG=IPROFG+1
0038:       RETURN
0039: C
0040: C    SELECT NEXT POINT
0041: C
    0005+B  0001
    0016   2C05    28 4 05                LDA    =X'0001',B
    0017   1212    10 2 12                LDC    $+X'0012'
    0018   AE00    A8 6 00                STA    IFWFLG,C
    0019   1200    10 2 00                LDC    $+X'0000'
    001A   6600    60 6 00                INC    IPROFG,C
```

```
     001B      0C01   08 4 01               LDB     X'0001',B
     001C      E401   E0 4 01               EST     X'0001',B
0042:   15          IFWPNT=IFWPNT-2
0043: C
0044: C           CHECK IF POINT IS AN ANTICIPATE POINT
0045: C
0046:               ITEMP=INFILE(IFWPNT+1)
0047: S         LDA    ITEMP
     001D      120D   10 2 0D               LDC     $+X'000D'
     001E      2E00   28 6 00               LDA     IFWPNT,C
     0007+B    0002
     001F      4C07   48 4 07               SUB     =X'0002',B
     0020      AE00   A8 6 00               STA     IFWPNT,C
     0021      2E00   28 6 00               LDA     IFWPNT,C
     0022      4200   40 2 00               ADD     =X'0000'
     0023      AC08   A8 4 08               STA     #AIA,B
     0024      2D08   28 5 08               LDA     *#AIA,B
     0025      AC06   A8 4 06               STA     ITEMP,B
     0026      2C06   28 4 06               LDA     ITEMP,B
0048: S         AND    M4000
     0027      1200   10 2 00               LDC     $+X'0000'
     0028      5E00   58 6 00               AND     M4000,C
0049: S         STA    ITEMP
     0029      AC06   A8 4 06               STA     ITEMP,B
0050:               IF(ITEMP.NE.0) GO TO 12
     002A      2C06   28 4 06               LDA     ITEMP,B
     002B      F200   F0 2 00               ZJP     $+X'0000'
0051: C
0052: C           CHECK IF POINT IS ACCURACY
0053: C
     002C      72E3   70 2 E3               JMP     )12
0054:               IF(IFWPNT.NE.MINFWD) GO TO 20
     002D      1210   10 2 10               LDC     $+X'0010'
     002E      2E00   28 6 00               LDA     IFWPNT,C
     002F      1200   10 2 00               LDC     $+X'0000'
     0030      4E00   48 6 00               SUB     MINFWD,C
     0031      F200   F0 2 00               ZJP     $+X'0000'
0055: C
0056: C           POINT IS ACCURACY
0057: C
     0032      7509   70 5 09               JMP     *)20,B
0058:               IFWACC=1
0059:               GO TO 21
     0033      2C05   28 4 05               LDA     =X'0001',B
     0034      AC0A   A8 4 0A               STA     IFWACC,B
     0035      750B   70 5 0B               JMP     *)21,B
0060:   20          IFWACC=0
0061: C
0062: E           SET ERROR FOR POINT
0063: C
0064:               INFILE(IFWPNT)=INFILE(IFWPNT+2)
     0036      3C0A   38 4 0A               STZ     IFWACC,B
     0037      120A   10 2 0A               LDC     $+X'000A'
     0038      2E00   28 6 00               LDA     IFWPNT,C
     0039      AC08   A8 4 08               STA     #AIA,B
     003A      4200   40 2 00               ADD     =X'FFFF'
     003B      AC0C   A8 4 0C               STA     #AIB,B
     003C      2C08   28 4 08               LDA     #AIA,B
     003D      4200   40 2 00               ADD     =X'0001'
     003E      AC0D   A8 4 0D               STA     #AIC,B
     003F      2D0D   28 5 0D               LDA     *#AIC,B
     0040      AD0C   A8 5 0C               STA     *#AIB,B
0065:   21          FPOSER=CCONFC*FLOAT(INFILE(IFWPNT))
0066: C
0067: C           SET FLAG FOR N NUMBER POSITIONING ATTEMPTS
0068: C
0069:               IFWTRY=INMTRY
0070: C
0071: C           CALCULATE OFFSET FOR THIS POINT
0072: C
```

```
0073:       ITEMP=INFILE(IFWPNT+1)
0074: S     LDA      ITEMP
   0041     120A   10 2 0A            LDC     $+X'000A'
   0042     2E00   28 6 00            LDA     IFWPNT,C
   0043     AC08   A8 4 08            STA     #AIA,B
   0044     420A   40 2 0A            ADD     =X'FFFF'
   0045     AC0C   A8 4 0C            STA     #AIB,B
   0046     EF00   E8 7 00            SST     *FLOAT ,B
   0047     800C                      ADL     #AIB
   0048     EDEC   E8 5 EC            SST     *M11:,B
   0049     800E                      ADL     CCONFC
   004A     1200   10 2 00            LDC     $+X'0000'
   004B     AE01   A8 6 01            STA     FPOSER,C
   004C     A600   A0 6 00            STE     FPOSER,C
   004D     1200   10 2 00            LDC     $+X'0000'
   004E     2E00   28 6 00            LDA     INMTRY,C
   004F     1243   10 2 43            LDC     $+X'0043'
   0050     AE00   A8 6 00            STA     IFWTRY,C

LPL
   0051     7200   70 2 00            JMP     $+X'0000'
   0052     0000                      DAT     X'0000'
   0053     0000                      DAT     X'0000'
   0054     0000                      DAT     X'0000'
   0055     0000                      DAT     X'0000'
   0056     0000                      DAT     X'0000'
   0057     0000                      DAT     X'0000'
   0058     0000                      DAT     X'0000'
   0059     0000                      DAT     X'0000'
   005A     FFFF                      DAT     X'FFFF'
   005B     0001                      DAT     X'0001'
   005C     0000                      DAT     X'0000'
   005D     0000                      DAT     X'0000'
   005E     0000                      DAT     X'0000'
   005F     2C08   28 4 08            LDA     #AIA,B
   0060     42F7   40 2 F7            ADD     =X'0000'
   0061     AC0D   A8 4 0D            STA     #AIC,B
   0062     2D0D   28 5 0D            LDA     *#AIC,B
   0063     AC06   A8 4 06            STA     ITEMP ,B
   0064     2C06   28 4 06            LDA     ITEMP ,B
0075: S     AND      MFF
   0065     1200   10 2 00            LDC     $+X'0000'
   0066     5E00   58 6 00            AND     MFF ,C
0076: S     STA      ITEMP
   0067     AC06   A8 4 06            STA     ITEMP ,B
0077:       ITEST=ITEMP
0078: S     LDA      ITEST
   0068     2C06   28 4 06            LDA     ITEMP ,B
   0069     AC0F   A8 4 0F            STA     ITEST ,B
   006A     2C0F   28 4 0F            LDA     ITEST ,B
0079: S     AND      M40
   006B     5E00   58 2 00            AND     =X'0000'

0080: S     STA      ITEST
   006D     AC0F   A8 4 0F            STA     ITEST ,B
0081:       IF(ITEST.EQ.0) GO TO 30
   006E     2C0F   28 4 0F            LDA     ITEST ,B
   006F     F201   F0 2 01            ZJP     $+X'0001'
   0070     7200   70 2 00            JMP     $+X'0000'
   0071     7510   70 5 10            JMP     *)30 ,B
0082: S     LDA      ITEMP
   0072     2C06   28 4 06            LDA     ITEMP ,B
0083: S     AND      M7F
   0073     1200   10 2 00            LDC     $+X'0000'
   0074     5E00   58 6 00            AND     M7F ,C
0084: S     EOR      M7F
   0075     1202   10 2 02            LDC     $+X'0002'
   0076     5600   50 6 00            EOR     M7F ,C
0085: S     ADD      M1
   0077     2011   0 2100             LDC     $+X'0000'
```

```
 0078      4600  40 6 00              ADD   M1,C
0086: S               STA     ITEMP
 0079      AC06  A8 4 06              STA   ITEMP,B
0087:  30             FPOSOF=((FLOAT(ITEMP)/64.0)*(FLOAT(INFILE(MINFWD))*CONOFF;
0088: C
0089: C      CALCULATE REFERENCE
0090: C
 007A      12DF  10 2 DF              LDC   $+X'FFDF'
 007B      2E00  28 6 00              LDA   MINFWD,C
 007C      42DE  40 2 DE              ADD   =X'FFFF'
 007D      AC08  A8 4 08              STA   #AIA,B
 007E      EFDE  E8 7 DE              SST   *FLOAT,B
 007F      8008                       ADL   #AIA
 0080      EDEC  E8 5 EC              SST   *M11:,B
 0081      8013                       ADL   CONOFF
 0082      AC15  A8 4 15              STA   #ARB,B
 0083      A414  A0 4 14              STE   #ARB,B
 0084      EFD8  E8 7 D8              SST   *FLOAT,B
 0085      0006                       ADL   ITEMP
 0086      EDED  E8 5 ED              SST   *D11:,B
 0016+B    4780
 0017+B    0000
 0087      0016                       ADL   =X'4780'
 0088      EDEC  E8 5 EC              SST   *M11:,B
 0089      0014                       ADL   #ARB
 008A      EDEC  E8 5 EC              SST   *M11:,B
 008B      800E                       ADL   CCONFC
 008C      AC12  A8 4 12              STA   FPOSOF,B
 008D      A411  A0 4 11              STE   FPOSOF,B
0091:  40             CALL ENCENG(INREG,POSREF)
0092:                 POSREF=POSREF+FPOSER+FPOSOF
0093: C
0094: C      CALL POSITION SUBROUTINE
0095: C
 008E      EF00  E8 7 00              SST   *ENCENG,B
 008F      8018                       ADL   INREG
 0090      8019                       ADL   POSREF
 0091      12CC  10 2 CC              LDC   $+X'FFCC'
 0092      2E01  28 6 01              LDA   FPOSER,C
 0093      2600  20 6 00              LDE   FPOSER,C
 0094      EDEA  E8 5 EA              SST   *A11:,B
 0095      8019                       ADL   POSREF
 0096      EDEA  E8 5 EA              SST   *A11:,B
 0097      0011                       ADL   FPOSOF
 0098      1200  10 2 00              LDC   $+X'0000'
 0099      AE01  A8 6 01              STA   POSREF,C
 009A      A600  A0 6 00              STE   POSREF,C
0096:  45             CALL POSTON
0097: C
0098: C      CHECK READY FLAG FOR DRIVE STATUS
0099: C
 009B      EF00  E8 7 00              SST   *POSTON,B
0100:                 IF(IREADY.EQ.0) GO TO 50
 009C      1200  10 2 00              LDC   $+X'0000'
 009D      2E00  28 6 00              LDA   IREADY,C
 009E      F201  F0 2 01              ZJP   $+X'0001'
 009F      7200  70 2 00              JMP   $+X'0000'
 00A0      751A  70 5 1A              JMP   *)50,B
0101:                 IF(IREADY.EQ.1) GO TO 46
 00A1      1205  10 2 05              LDC   $+X'0005'
 00A2      2E00  28 6 00              LDA   IREADY,C
 00A3      6805  68 0 05              DCR   X'0005'
 00A4      F201  F0 2 01              ZJP   $+X'0001'
 00A5      7200  70 2 00              JMP   $+X'0000'
 00A6      751B  70 5 1B              JMP   *)46,B
0102:                 IF(IREADY.EQ.2) GO TO 40
 00A7      1206  10 2 06              LDC   $+X'0006'
 00A8      2E00  28 6 00              LDA   IREADY,C
 00A9      4C07  48 4 07              SUB   =X'0002',B
 00AA      F201  F0 2 01              ZJP   $+X'0001'
 00AB      7200  70 2 00              JMP   $+X'0000'
```

```
0103: C
0104: C      TASK ERROR
0105: C
   00AC    72E1   70 2 E1              JMP    )40
0106:         CALL ERROR
   00AD    EDE8   E8 5 E8              SST    *ERROR ,B
0107: 46    RETURN
0108: C
0109: C      DETERMINE ACTUAL ERROR
0110: C
   00AE    0C01   08 4 01       )46    LDB    X'0001' ,B
   00AF    E401   E0 4 01              EST    X'0001' ,B
0111: 50    CALL ENCENG(INREG,POSCHK)
0112:       ERRCAL=POSREF-POSCHK
0113:       ENCERR=ABS(ERRCAL)*ACONFC
0114: C
0115: C      CHECK FOR ERROR GREATER THAN ACCURACY
0116: C
0117:       IF(ENCERR.GT.FLOAT(IACCUR)) GO TO 60
   00B0    EF22   E8 7 22              SST    *ENCENG,B
   00B1    8018                        ADL    INREG
   00B2    001C                        ADL    POSCHK
   00B3    121B   10 2 1B              LDC    $+X'001B'
   00B4    2E01   28 6 01              LDA    POSREF,C
   00B5    2600   20 6 00              LDE    POSREF,C
   00B6    EDEB   E8 5 EB              SST    *S11:,B
   00B7    001C                        ADL    POSCHK
   00B8    AC1F   A8 4 1F              STA    ERRCAL,B
   00B9    A41E   A0 4 1E              STE    ERRCAL,B
   00BA    EF00   E8 7 00              SST    *ABS ,B
   00BB    001E                        ADL    ERRCAL
   00BC    EDEC   E8 5 EC              SST    *M11:,B
   00BD    8022                        ADL    ACONFC
   00BE    AC21   A8 4 21              STA    ENCERR,B
   00BF    A420   A0 4 20              STE    ENCERR,B

LPL
   00C0    7200   70 2 00              JMP    $+X'0000'
   00C1    0000                        DAT    X'0000'
   00C2    0000                        DAT    X'0000'
   00C3    0000                        DAT    X'0000'
   00C4    0000                        DAT    X'0000'
   00C5    0000                        DAT    X'0000'
   00C6    0000                        DAT    X'0000'
   00C7    0000                        DAT    X'0000'
   00C8    0000                        DAT    X'0000'
   00C9    0000                        DAT    X'0000'
   00CA    EF92   E8 7 92              SST    *FLOAT ,B
   00CB    8023                        ADL    IACCUR
   00CC    AC25   A8 4 25              STA    #ARA,B
   00CD    A424   A0 4 24              STE    #ARA,B
   00CE    2C21   28 4 21              LDA    ENCERR,B
   00CF    2420   20 4 20              LDE    ENCERR,B
   00D0    EDEB   E8 5 EB              SST    *S11:,B
   00D1    0024                        ADL    #ARA
   00D2    F200   F0 2 00              ZJP    $+X'0000'
   00D3    BA01   B8 2 01              NJP    $+X'0001'
   00D4    7526   70 5 26              JMP    *)60 ,B
0118:       IFWTRY=IFWTRY-1
0119:       RETURN
0120: C
0121: C      CHECK IF THIS IS ACCURACY POINT
0122: C
   00D5    1200   10 2 00              LDC    $+X'0000'
   00D6    6E00   68 6 00              DCR    IFWTRY,C
   00D7    0C01   08 4 01              LDB    X'0001' ,B
   00D8    E401   E0 4 01              EST    X'0001' ,B
0123: 60    IF(IFWACC.NE.1) GO TO 70
   00D9    2C0A   28 4 0A       )60    LDA    IFWACC,B
   00DA    6805   68 0 05              DCR    X'0005'
```

```
    00DB    F200  F0 2 00              ZJP    $+X'0000'
0124: C
0125: C     OUTPUT MESSAGE FOR ACCURACY INVALID
0126: C
    00DC    7527  70 5 27              JMP    *)70 ,B
0127:       IERR=43
0128:       CALL PRTMSG
    0028+B  002B
    00DD    2C28  28 4 28              LDA    =X'002B' ,B
    00DE    1200  10 2 00              LDC    $+X'0000'
    00DF    AE00  A8 6 00              STA    IERR,C
    00E0    EF00  E8 7 00              SST    *PRTMSG,B
0129:       ITERM=1
0130:       RETURN
0131: C
0132: C     CALCULATE CORECTION
0133: C
    00E1    2C05  28 4 05              LDA    =X'0001' ,B
    00E2    1200  10 2 00              LDC    $+X'0000'
    00E3    AE00  A8 6 00              STA    ITERM ,C
    00E4    0C01  08 4 01              LDB    X'0001' ,B
    00E5    E401  E0 4 01              EST    X'0001' ,B
0134:  70   ICORCT=IFIX(CONPOS*ENCERR+1.0)
0135:       INFILE(IFWPNT)=INFILE(IFWPNT)-ICORCT
0136: C
0137: C     CHECK IF THIS WAS OVERSHOOT
0138: C
0139:       IF(ERRCAL.LT.0.0) INFILE(IFWPNT)=INFILE(IFWPNT)+ICORCT+ICORCT
    00E6    1200  10 2 00              LDC    $+X'0000'
    00E7    2E01  28 6 01              LDA    CONPOS,C
    00E8    2600  20 6 00              LDE    CONPOS,C
    00E9    EDEC  E8 5 EC              SST    *M11:,B
    00EA    0020                       ADL    ENCERR
    00EB    EDEA  E8 5 EA              SST    *A11:,B
    002A+B  4180
    002B+B  0000
    00EC    002A                       ADL    =X'4180'
    00ED    AC25  A8 4 25              STA    #ARA,B
    00EE    A424  A0 4 24              STE    #ARA,B
    00EF    EF00  E8 7 00              SST    *IFIX,B
    00F0    0024                       ADL    #ARA
    00F1    AC29  A8 4 29              STA    ICORCT,B
    00F2    1200  10 2 00              LDC    $+X'0000'
    00F3    2E00  28 6 00              LDA    IFWPNT,C
    00F4    AC0C  A8 4 0C              STA    #AIB,B
    00F5    4200  40 2 00              ADD    =X'FFFF'
    00F6    AC0D  A8 4 0D              STA    #AIC,B
    00F7    2C0C  28 4 0C              LDA    #AIB,B
    00F8    4203  40 2 03              ADD    =X'FFFF'
    00F9    AC2C  A8 4 2C              STA    #AID,B
    00FA    2D2C  28 5 2C              LDA    *#AID,B
    00FB    4C29  48 4 29              SUB    ICORCT,B
    00FC    AD0D  A8 5 0D              STA    *#AIC,B
    00FD    2C1F  28 4 1F              LDA    ERRCAL,B
    00FE    241E  20 4 1E              LDE    ERRCAL,B
    00FF    B200  B0 2 00              PJP    $+X'0000'
    0100    120E  10 2 0E              LDC    $+X'000E'
    0101    2E00  28 6 00              LDA    IFWPNT,C
    0102    AC08  A8 4 08              STA    #AIA,B
    0103    420B  40 2 0B              ADD    =X'FFFF'
    0104    AC0C  A8 4 0C              STA    #AIB,B
    0105    2C08  28 4 08              LDA    #AIA,B
    0106    4203  40 2 03              ADD    =X'FFFF'
    0107    AC0D  A8 4 0D              STA    #AIC,B
    0108    2D0D  28 5 0D              LDA    *#AIC,B
    0109    4429  40 4 29              ADD    ICORCT,B
    010A    4429  40 4 29              ADD    ICORCT,B
    010B    AD0C  A8 5 0C              STA    *#AIB,B
0140:       FPOSER=CCONFC*FLOAT(INFILE(IFWPNT))
0141:       IFWTRY=INMTRY
```

```
0142:         RETURN
      010C    120C    10 2 0C       LDC    $+X'000C'
      010D    2E00    28 6 00       LDA    IFWPNT,C
      010E    4208    40 2 08       ADD    =X'FFFF'
      010F    AC08    A8 4 08       STA    #AIA,B
      0110    EF00    E8 7 00       SST    *FLOAT ,B
      0111    8008                  ADL    #AIA
      0112    EDEC    E8 5 EC       SST    *M11:,B
      0113    800E                  ADL    CCONFC
      0114    1200    10 2 00       LDC    $+X'0000'
      0115    AE01    A8 6 01       STA    FPOSER,C
      0116    A600    A0 6 00       STE    FPOSER,C
      0117    1200    10 2 00       LDC    $+X'0000'
      0118    2E00    28 6 00       LDA    INMTRY,C
      0119    1244    10 2 44       LDC    $+X'0044'
      011A    AE00    A8 6 00       STA    IFWTRY,C
      011B    0C01    08 4 01       LDB    X'0001' ,B
      011C    E401    E0 4 01       EST    X'0001' ,B
0143:         END
                                    LPL
      011D    7200    70 2 00       JMP    $+X'0000'
      011E    0000                  DAT    X'0000'
      011F    0000                  DAT    X'0000'
      0120    FFFF                  DAT    X'FFFF'
      0121    005C                  ADL    X'005C'
      0122    0000                  DAT    X'0000'
      0123    0000                  DAT    X'0000'
      0124    0000                  DAT    X'0000'
      0125    0000                  DAT    X'0000'
      0126    0000                  DAT    X'0000'
      0127    0000                  DAT    X'0000'
      0128    0000                  DAT    X'0000'
      0001    012F                  ADL    X'012F'
EXT ERROR
EXT A11:
EXT S11:
EXT M11:
EXT D11:
VAR IFWFLG   0000 IN IFWFLG
VAR IFWTRY   0000 IN IFWTRY
VAR IFWPNT   0000 IN IFWPNT
VAR MAXFWD   0000 IN MAXFWD
VAR IPROFG   0000 IN IPROFG
VAR M4000    0000 IN M4000
ARR INFILE   0000 IN INFILE
VAR MINFWD   0000 IN MINFWD
VAR FPOSER   0000 IN FPOSER
VAR CCONFC   0000 IN CCONFC
VAR MAXERR   0000 IN MAXERR
VAR CONERR   0000 IN CONERR
VAR POSREF   0000 IN POSREF
VAR IREADY   0000 IN IREADY
VAR IERR     0000 IN IERR
VAR ITERM    0000 IN ITERM
VAR INREG    0000 IN INREG
VAR CONPOS   0000 IN CONPOS
VAR INMTRY   0000 IN INMTRY
VAR MFF      0000 IN MFF
VAR M40      0000 IN M40
VAR M7F      0000 IN M7F
VAR M1       0000 IN M1
VAR CONOFF   0000 IN CONOFF
VAR IACCUR   0020 IN INFILE
VAR ACONFC   001C IN INFILE
VAR ITEMP    0006 IN DP
VAR #AIA     0008 IN DP
VAR IFWACC   000A IN DP
VAR #AIB     000C IN DP
VAR #AIC     000C IN DP
EXT FLOAT
```

```
VAR ITEST    000F IN DP
VAR FPOSOF   0011 IN DP
VAR #ARB     0014 IN DP
EXT ENCENG
EXT POSTON
VAR POSCHK   001C IN DP
VAR ERRCAL   001E IN DP
VAR ENCERR   0020 IN DP
EXT ABS
VAR #ARA     0024 IN DP
EXT PRTMSG
VAR ICORCT   0029 IN DP
EXT IFIX
VAR #AID     002C IN DP
PROGRAM SIZE: 0303    DATA POOL SIZE: 0045    ERROR COUNT: 0000
```

PROGRAM LISTING THIRTEEN

```
0001: C     00716 R.E. SHARPLESS SLOWDOWN CALIBRATION PROGRAM
0002:       SUBROUTINE REVDO
0003: C
0004: C     THIS SUBROUTINE WILL CALIBRATE THE REVERSE
0005: C     SLOWDOWN PROFILES FOR THE DISTANCE OPTIMIZATION
0006: C     SUBROUTINE
0007: C
0008:       COMMON /IRVFLG/IRVFLG/IRVTRY/IRVTRY/IRVPNT/IRVPNT
0009:     X        /MAXREV/MAXREV/IPROFG/IPROFG/M4000/M4000
0010:     X        /INFILE/INFILE(256)/MINREV/MINREV
0011:     X        /RPOSER/RPOSER /CCONFC/CCONFC /MAXERR/MAXERR
0012:     X        /CONERR/CONERR/POSREF/POSREF/IREADY/IREADY
0013:     X        /IERR/IERR/ITERM/ITERM
0014:     X        /INREG/INREG/CONPOS/CONPOS
0015:     X        /INMTRY/INMTRY
0016:     X        /MFF/MFF  /M40/M40  /M7F/M7F  /M1/M1
0017:     X        /CONOFF/CONOFF
0018:       EQUIVALENCE (INFILE(33),IACCUR)
0019:     X,           (INFILE(29),ACONFC)
0020: C
0021: C     CHECK FOR CURVE ALREADY CALIBRATED
0022: C
0023:       IF(IRVFLG.NE.1) GO TO 10
      0000  0000                            DAT   X'0000'
      0001  0000                            DAT   X'0000'
      0002  2801  28 0 01                   LDA   X'0001'
      0003  0AFE  08 2 FE                   LDB   $+X'FFFE'
      0004  AC01  A8 4 01                   STA   X'0001',B
      0005  1200  10 2 00                   LDC   $+X'0000'
      0006  2E00  28 6 00                   LDA   IRVFLG,C
      0007  6805  68 0 05                   DCR   X'0005'
      0008  F200  F0 2 00                   ZJP   $+X'0000'
      0009  7502  70 5 02                   JMP   *)10 ,B
0024:       RETURN
0025: C
0026: C     CHECK IF FIRST TIME THROUGH FOR THIS POINT
0027: C
      000A  0C01  08 4 01                   LDB   X'0001',B
      000B  E401  E0 4 01                   EST   X'0001',B
0028: 10    IF(IRVTRY.NE.0) GO TO 40
      000C  1200  10 2 00     )10           LDC   $+X'0000'
      000D  2E00  28 6 00                   LDA   IRVTRY,C
      000E  F200  F0 2 00                   ZJP   $+X'0000'
0029: C
0030: C     CHECK TO SEE IF LAST POINT WAS CALIBRATED
0031: C
      000F  7503  70 5 03                   JMP   *)40 ,B
0032: 12    IF(IRVPNT.NE.MAXREV) GO TO 15
      0010  1200  10 2 00     )12           LDC   $+X'0000'
      0011  2E00  28 6 00                   LDA   IRVPNT,C
      0012  1200  10 2 00                   LDC   $+X'0000'
```

```
         0013    4E00  48 6 00           SUB    MAXREV,C
         0014    F200  F0 2 00           ZJP    $+X'0000'
0033: C
0034: C         CALIBRATION COMPLETE FOR REVERSE PROFILE
0035: C
         0015    7504  70 5 04           JMP    *)15 ,B
0036:            IRVFLG=1
0037:            IPROFG=IPROFG+1
0038:            RETURN
0039: C
0040: C         SELECT NEXT POINT
0041: C
       0005+B   0001
         0016    2C05  28 4 05           LDA    =X'0001' ,B
         0017    1212  10 2 12           LDC    $+X'0012'
         0018    AE00  A8 6 00           STA    IRVFLG,C
         0019    1200  10 2 00           LDC    $+X'0000'
         001A    6600  60 6 00           INC    IPROFG,C
         001B    0C01  08 4 01           LDB    X'0001' ,B
         001C    E401  E0 4 01           EST    X'0001' ,B
0042:  15        IRVPNT=IRVPNT-2
0043: C
0044: C         CHECK IF POINT IS AN ANTICIPATE POINT
0045: C
0046:            ITEMP=INFILE(IRVPNT+1)
0047: S         LDA    ITEMP
         001D    120D  10 2 0D           LDC    $+X'000D'
         001E    2E00  28 6 00           LDA    IRVPNT,C
       0007+B   0002
         001F    4C07  48 4 07           SUB    =X'0002' ,B
         0020    AE00  A8 6 00           STA    IRVPNT,C
         0021    2E00  28 6 00           LDA    IRVPNT,C
         0022    4200  40 2 00           ADD    =X'0000'
         0023    AC08  A8 4 08           STA    #AIA,B
         0024    2D08  28 5 08           LDA    *#AIA,B
         0025    AC06  A8 4 06           STA    ITEMP ,B
         0026    2C06  28 4 06           LDA    ITEMP ,B
0048: S         AND    M4000
         0027    1200  10 2 00           LDC    $+X'0000'
         0028    5E00  58 6 00           AND    M4000 ,C
0049: S         STA    ITEMP
         0029    AC06  A8 4 06           STA    ITEMP ,B
0050:            IF(ITEMP.NE.0) GO TO 12
         002A    2C06  28 4 06           LDA    ITEMP ,B
         002B    F200  F0 2 00           ZJP    $+X'0000'
0051: C
0052: C         CHECK IF POINT IS ACCURACY
0053: C
         002C    72E3  70 2 F3           JMP    )12
0054:            IF(IRVPNT.NE.MINREV) GO TO 20
         002D    1210  10 2 10           LDC    $+X'0010'
         002E    2E00  28 6 00           LDA    IRVPNT,C
         002F    1200  10 2 00           LDC    $+X'0000'
         0030    4E00  48 6 00           SUB    MINREV,C
         0031    F200  F0 2 00           ZJP    $+X'0000'
0055: C
0056: C         POINT IS ACCURACY
0057: C
         0032    7509  70 5 09           JMP    *)20 ,B
0058:            IRVACC=1
0059:            GO TO 21
         0033    2C05  28 4 05           LDA    =X'0001' ,B
         0034    AC0A  A8 4 0A           STA    IRVACC,B
         0035    750B  70 5 0B           JMP    *)21 ,B
0060:  20        IRVACC=0
0061: C
0062: C         SET ERROR FOR POINT
0063: C
0064:            INFILE(IRVPNT)=INFILE(IRVPNT+2)
         0036    3C0A  38 4 0A           STZ    IRVACC,B
```

```
         0037    120A    10 2 0A         LDC    $+X'000A'
         0038    2E00    28 6 00         LDA    IRVPNT,C
         0039    AC08    A8 4 08         STA    #AIA,B
         003A    4200    40 2 00         ADD    =X'FFFF'
         003B    AC0C    A8 4 0C         STA    #AIB,B
         003C    2C08    28 4 08         LDA    #AIA,B
         003D    4200    40 2 00         ADD    =X'0001'
         003E    AC0D    A8 4 0D         STA    #AIC,B
         003F    2D0D    28 5 0D         LDA    *#AIC,B
         0040    AD0C    A8 5 0C         STA    *#AIB,B
0065:  21        RPOSFR=CCONFC*FLOAT(INFILE(IRVPNT))
0066:  C
0067:  C         SET FLAG FOR N NUMBER OF POSITIONING ATTEMPTS
0068:  C
0069:            IRVTRY=INMTRY
0070:  C
0071:  C         CALCULATE OFFSET FOR THIS POINT
0072:  C
0073:            ITEMP=INFILE(IRVPNT+1)
0074:  S         LDA     ITEMP
         0041    120A    10 2 0A         LDC    $+X'000A'
         0042    2E00    28 6 00         LDA    IRVPNT,C
         0043    AC08    A8 4 08         STA    #AIA,B
         0044    420A    40 2 0A         ADD    =X'FFFF'
         0045    AC0C    A8 4 0C         STA    #AIB,B
         0046    EF00    E8 7 00         SST    *FLOAT ,B
         0047    800C                    ADL    #AIB
         0048    EDEC    E8 5 EC         SST    *M11:,B
         0049    800E                    ADL    CCONFC
         004A    1200    10 2 00         LDC    $+X'0000'
         004B    AE01    A8 6 01         STA    RPOSER,C
         004C    A600    A0 6 00         STE    RPOSER,C
         004D    1200    10 2 00         LDC    $+X'0000'
         004E    2E00    28 6 00         LDA    INMTRY,C
         004F    1243    10 2 43         LDC    $+X'0043'
         0050    AE00    A8 6 00         STA    IRVTRY,C

LPL
         0051    7200    70 2 00         JMP    $+X'0000'
         0052    0000                    DAT    X'0000'
         0053    0000                    DAT    X'0000'
         0054    0000                    DAT    X'0000'
         0055    0000                    DAT    X'0000'
         0056    0000                    DAT    X'0000'
         0057    0000                    DAT    X'0000'
         0058    0000                    DAT    X'0000'
         0059    0000                    DAT    X'0000'
         005A    FFFF                    DAT    X'FFFF'
         005B    0001                    DAT    X'0001'
         005C    0000                    DAT    X'0000'
         005D    0000                    DAT    X'0000'
         005E    0000                    DAT    X'0000'
         005F    2C08    28 4 08         LDA    #AIA,B
         0060    42F7    40 2 F7         ADD    =X'0000'
         0061    AC0D    A8 4 0D         STA    #AIC,B
         0062    2D0D    28 5 0D         LDA    *#AIC,B
         0063    AC06    A8 4 06         STA    ITEMP ,B
         0064    2C06    28 4 06         LDA    ITEMP ,B
0075:  S         AND     MFF
         0065    1200    10 2 00         LDC    $+X'0000'
         0066    5E00    58 6 00         AND    MFF ,C
0076:  S         STA     ITEMP
         0067    AC06    A8 4 06         STA    ITEMP ,B
0077:            ITEST=ITEMP
0078:  S         LDA     ITEST
         0068    2C06    28 4 06         LDA    ITEMP ,B
         0069    AC0F    A8 4 0F         STA    ITEST ,B
         006A    2C0F    28 4 0F         LDA    ITEST ,B
0079:  S         AND     M40
         006B    1200    10 2 00         LDC    $+X'0000'
         006C    5E00    58 6 00         AND    M40 ,C
```

```
0080: S      STA       ITEST
    006D     AC0F  A8 4 0F          STA    ITEST,B
0081:        IF(ITEST.EQ.0) GO TO 30
    006E     2C0F  28 4 0F          LDA    ITEST,B
    006F     F201  F0 2 01          ZJP    $+X'0001'
    0070     7200  70 2 00          JMP    $+X'0000'
    0071     7510  70 5 10          JMP    *)30 ,B
0082: S      LDA       ITEMP
    0072     2C06  28 4 06          LDA    ITEMP,B
0083: S      AND       M7F
    0073     1200  10 2 00          LDC    $+X'0000'
    0074     5E00  58 6 00          AND    M7F,C
0084: S      EOR       M7F
    0075     1202  10 2 02          LDC    $+X'0002'
    0076     5600  50 6 00          EOR    M7F,C
0085: S      ADD       M1
    0077     1200  10 2 00          LDC    $+X'0000'
    0078     4600  40 6 00          ADD    M1,C
0086: S      STA       ITEMP
    0079     AC06  A8 4 06          STA    ITEMP,B
0087:  30    RPOSOF=((FLOAT(ITEMP)/64.0)*(FLOAT(INFILE(MINREV))*CONOFF))*CCONFC
0088: C
0089: C      CALCULATE REFERENCE
0090: C
    007A     12DF  10 2 DF          LDC    $+X'FFDF'
    007B     2E00  28 6 00          LDA    MINREV,C
    007C     42DE  40 2 DE          ADD    =X'FFFF'
    007D     AC08  A8 4 08          STA    #AIA,B
    007E     EFDE  E8 7 DE          SST    *FLOAT ,B
    007F     8008                   ADL    #AIA
    0080     EDEC  E8 5 EC          SST    *M11:,B
    0081     8013                   ADL    CONOFF
    0082     AC15  A8 4 15          STA    #ARB,B
    0083     A414  A0 4 14          STE    #ARB,B
    0084     EFD8  E8 7 D8          SST    *FLOAT ,B
    0085     0006                   ADL    ITEMP
    0086     EDED  E8 5 ED          SST    *D11:,B
    0016+B   4780
    0017+B   0000
    0087     0016                   ADL    =X'4780'
    0088     EDEC  E8 5 EC          SST    *M11:,B
    0089     0014                   ADL    #ARB
    008A     EDEC  E8 5 EC          SST    *M11:,B
    008B     800E                   ADL    CCONFC
    008C     AC12  A8 4 12          STA    RPOSOF,B
    008D     A411  A0 4 11          STE    RPOSOF,B
0091:  40    CALL ENCENG(INREG,POSREF)
0092:        POSREF=POSREF-RPOSER-RPOSOF
0093: C
0094: C      CALL POSITION SUBROUTINE
0095: C
    008E     EF00  E8 7 00          SST    *ENCENG,B
    008F     8018                   ADL    INREG
    0090     8019                   ADL    POSREF
    0091     1200  10 2 00          LDC    $+X'0000'
    0092     2E01  28 6 01          LDA    POSREF,C
    0093     2600  20 6 00          LDE    POSREF,C
    0094     EDEB  E8 5 EB          SST    *S11:,B
    0095     801A                   ADL    RPOSER
    0096     EDEB  E8 5 EB          SST    *S11:,B
    0097     0011                   ADL    RPOSOF
    0098     AE01  A8 6 01          STA    POSREF,C
    0099     A600  A0 6 00          STE    POSREF,C
0096:  45    CALL POSTON
0097: C
0098: C      CHECK READY FLAG FOR DRIVE STATUS
0099: C
    009A     EF00  E8 7 00          SST    *POSTON,B
0100:        IF(IREADY.EQ.0) GO TO 50
    009B     1200  10 2 00          LDC    $+X'0000'
```

```
         009C    2E00    28 6 00              LDA    IREADY,C
         009D    F201    F0 2 01              ZJP    $+X'0001'
         009E    7200    70 2 00              JMP    $+X'0000'
         009F    751B    70 5 1B              JMP    *)50 ,B
0101:            IF(IREADY.EQ.1) GO TO 46
         00A0    1205    10 2 05              LDC    $+X'0005'
         00A1    2E00    28 6 00              LDA    IREADY,C
         00A2    6805    68 0 05              DCR    X'0005'
         00A3    F201    F0 2 01              ZJP    $+X'0001'
         00A4    7200    70 2 00              JMP    $+X'0000'
         00A5    751C    70 5 1C              JMP    *)46 ,B
0102:            IF(IREADY.EQ.2) GO TO 40
         00A6    1206    10 2 06              LDC    $+X'0006'
         00A7    2E00    28 6 00              LDA    IREADY,C
         00A8    4C07    48 4 07              SUB    =X'0002' ,B
         00A9    F201    F0 2 01              ZJP    $+X'0001'
         00AA    7200    70 2 00              JMP    $+X'0000'
0103: C
0104: C         TASK ERROR
0105: C
         00AB    72E2    70 2 E2              JMP    )40
0106:            CALL ERROR
         00AC    EDE8    E8 5 E8              SST    *ERROR ,B
0107:  46        RETURN
0108: C
0109: C         DETERMINE ACTUAL ERROR
0110: C
         00AD    0C01    08 4 01      )46     LDB    X'0001' ,B
         00AE    E401    E0 4 01              EST    X'0001' ,B
0111:  50        CALL ENCENG(INREG,POSCHK)
0112:            ERRCAL=POSCHK-POSREF
0113:            ENCERR=ABS(ERRCAL)*ACONFC
0114: C
0115: C         CHECK FOR ERROR GREAQER THAN ACCURACY
0116: C
0117:            IF(ENCERR.GT.FLOAT(IACCUR)) GO TO 60
         00AF    EF21    E8 7 21              SST    *ENCENG,B
         00B0    8018                         ADL    INREG
         00B1    001D                         ADL    POSCHK
         00B2    2C1E    28 4 1E              LDA    POSCHK,B
         00B3    241D    20 4 1D              LDE    POSCHK,B
         00B4    EDEB    E8 5 EB              SST    *S11:,B
         00B5    8019                         ADL    POSREF
         00B6    AC20    A8 4 20              STA    ERRCAL,B
         00B7    A41F    A0 4 1F              STE    ERRCAL,B
         00B8    EF00    E8 7 00              SST    *ABS ,B
         00B9    001F                         ADL    ERRCAL
         00BA    EDEC    E8 5 EC              SST    *M11:,B
         00BB    8023                         ADL    ACONFC
         00BC    AC22    A8 4 22              STA    ENCERR,B
         00BD    A421    A0 4 21              STE    ENCERR,B

LPL
         00BE    7200    70 2 00              JMP    $+X'0000'
         00BF    0000                         DAT    X'0000'
         00C0    0000                         DAT    X'0000'
         00C1    0000                         DAT    X'0000'
         00C2    0000                         DAT    X'0000'
         00C3    0000                         DAT    X'0000'
         00C4    0000                         DAT    X'0000'
         00C5    0000                         DAT    X'0000'
         00C6    0000                         DAT    X'0000'
         00C7    0000                         DAT    X'0000'
         00C8    EF94    E8 7 94              SST    *FLOAT ,B
         00C9    8024                         ADL    IACCUR
         00CA    AC26    A8 4 26              STA    #ARA,B
         00CB    A425    A0 4 25              STE    #ARA,B
         00CC    2C22    28 4 22              LDA    ENCERR,B
         00CD    2421    20 4 21              LDE    ENCERR,B
         00CE    EDEB    E8 5 EB              SST    *S11:,B
```

```
          00CF    0025                   ADL    #ARA
          00D0    F200  F0 2 00          ZJP    $+X'0000'
          00D1    BA01  B8 2 01          NJP    $+X'0001'
          00D2    7527  70 5 27          JMP    *)60 ,B
   0118:          IRVTRY=IRVTRY-1
   0119:          RETURN
   0120: C
   0121: C        CHECK IF THIS IS ACCURACY POINT
   0122: C
          00D3    1200  10 2 00          LDC    $+X'0000'
          00D4    6E00  68 6 00          DCR    IRVTRY,C
          00D5    0C01  08 4 01          LDB    X'0001' ,B
          00D6    E401  E0 4 01          EST    X'0001' ,B
   0123:  60      IF(IRVACC.NE.1) GO TO 70
          00D7    2C0A  28 4 0A   )60    LDA    IRVACC,B
          00D8    6805  68 0 05          DCR    X'0005'
          00D9    F200  F0 2 00          ZJP    $+X'0000'
   0124: C
   0125: C        OUTPUT MESSAGE FOR ACCURACY INVALID
   0126: C
          00DA    7528  70 5 28          JMP    *)70 ,B
   0127:          IERR=43
   0128:          CALL PRTMSG
          0029+B  002B
          00DB    2C29  28 4 29          LDA    =X'002B' ,B
          00DC    1200  10 2 00          LDC    $+X'0000'
          00DD    AE00  A8 6 00          STA    IERR,C
          00DE    EF00  E8 7 00          SST    *PRTMSG,B
   0129:          ITERM=1
   0130:          RETURN
   0131: C
   0132: C        CALCULATE CORRECTION
   0133: C
          00DF    2C05  28 4 05          LDA    =X'0001' ,B
          00E0    1200  10 2 00          LDC    $+X'0000'
          00E1    AE00  A8 6 00          STA    ITERM ,C
          00E2    0C01  08 4 01          LDB    X'0001' ,B
          00E3    E401  E0 4 01          EST    X'0001' ,B
   0134:  70      ICORCT=IFIX(CONPOS*ENCERR+1.0)
   0135:          INFILE(IRVPNT)=INFILE(IRVPNT)-ICORCT
   0136: C
   0137: C        CHECK IF THIS WAS OVERSHOOT
   0138: C
   0139:          IF(ERRCAL.LT.0.0)INFILE(IRVPNT)=INFILE(IRVPNT)+ICORCT+ICORCT
          00E4    1200  10 2 00          LDC    $+X'0000'
          00E5    2E01  28 6 01          LDA    CONPOS,C
          00E6    2600  20 6 00          LDE    CONPOS,C
          00E7    EDEC  E8 5 EC          SST    *M11:,B
          00E8    0021                   ADL    ENCERR
          00E9    EDEA  E8 5 EA          SST    *A11:,B
          002B+B  4180
          002C+B  0000
          00EA    002B                   ADL    =X'4180'
          00EB    AC26  A8 4 26          STA    #ARA,B
          00EC    A425  A0 4 25          STE    #ARA,B
          00ED    EF00  E8 7 00          SST    *IFIX,B
          00EE    0025                   ADL    #ARA
          00EF    AC2A  A8 4 2A          STA    ICORCT,B
          00F0    1200  10 2 00          LDC    $+X'0000'
          00F1    2E00  28 6 00          LDA    IRVPNT,C
          00F2    AC0C  A8 4 0C          STA    #AIB,B
          00F3    4200  40 2 00          ADD    =X'FFFF'
          00F4    AC0D  A8 4 0D          STA    #AIC,B
          00F5    2C0C  28 4 0C          LDA    #AIB,B
          00F6    4203  40 2 03          ADD    =X'FFFF'
          00F7    AC2D  A8 4 2D          STA    #AID,B
          00F8    2D2D  28 5 2D          LDA    *#AID,B
          00F9    4C2A  48 4 2A          SUB    ICORCT,B
          00FA    AD0D  A8 5 0D          STA    *#AIC,B
          00FB    2C20  28 4 20          LDA    ERRCAL,B
```

```
         00FC    241F     20  4  1F          LDE    ERRCAL,B
         00FD    B200     B0  2  00          PJP    $+X'0000'
         00FE    120E     10  2  0E          LDC    $+X'000E'
         00FF    2E00     28  6  00          LDA    IRVPNT,C
         0100    AC08     A8  4  08          STA    #AIA,B
         0101    420B     40  2  0B          ADD    =X'FFFF'
         0102    AC0C     A8  4  0C          STA    #AIB,B
         0103    2C08     28  4  08          LDA    #AIA,B
         0104    4203     40  2  03          ADD    =X'FFFF'
         0105    AC0D     A8  4  0D          STA    #AIC,B
         0106    2D0D     28  5  0D          LDA    *#AIC,B
         0107    442A     40  4  2A          ADD    ICORCT,B
         0108    442A     40  4  2A          ADD    ICORCT,B
         0109    AD0C     A8  5  0C          STA    *#AIB,B
0140:            RPOSER=CCONFC*FLOAT(INFILE(IRVPNT))
0141:            IRVTRY=INMTRY
0142:            RETURN
         010A    120C     10  2  0C          LDC    $+X'000C'
         010B    2E00     28  6  00          LDA    IRVPNT,C
         010C    4208     40  2  08          ADD    =X'FFFF'
         010D    AC08     A8  4  08          STA    #AIA,B
         010E    EF00     E8  7  00          SST    *FLOAT,B
         010F    8008                         ADL    #AIA
         0110    EDEC     E8  5  EC          SST    *M11:,B
         0111    800E                         ADL    CCONFC
         0112    1200     10  2  00          LDC    $+X'0000'
         0113    AE01     A8  6  01          STA    RPOSER,C
         0114    A600     A0  6  00          STE    RPOSER,C
         0115    1200     10  2  00          LDC    $+X'0000'
         0116    2E00     28  6  00          LDA    INMTRY,C
         0117    1244     10  2  44          LDC    $+X'0044'
         0118    AE00     A8  6  00          STA    IRVTRY,C
         0119    0C01     08  4  01          LDB    X'0001',B
         011A    E401     E0  4  01          EST    X'0001',B
0143:            END

LPL
         011B    7200     70  2  00          JMP    $+X'0000'
         011C    0000                         DAT    X'0000'
         011D    0000                         DAT    X'0000'
         011E    FFFF                         DAT    X'FFFF'
         011F    005C                         ADL    X'005C'
         0120    0000                         DAT    X'0000'
         0121    0000                         DAT    X'0000'
         0122    0000                         DAT    X'0000'
         0123    0000                         DAT    X'0000'
         0124    0000                         DAT    X'0000'
         0125    0000                         DAT    X'0000'
         0126    0000                         DAT    X'0000'
         0001    012D                         ADL    X'012D'
         EXT ERROR
         EXT A11:
         EXT S11:
         EXT M11:
         EXT D11:
         VAR IRVFLG   0000 IN IRVFLG
         VAR IRVTRY   0000 IN IRVTRY
         VAR IRVPNT   0000 IN IRVPNT
         VAR MAXREV   0000 IN MAXREV
         VAR IPROFG   0000 IN IPROFG
         VAR M4203    0000 IN M4203
         ARR INFILE   0000 IN INFILE
         VAR MINREV   0000 IN MINREV
         VAR RPOSER   0000 IN RPOSER
         VAR CCONFC   0000 IN CCONFC
         VAR MAXERR   0000 IN MAXERR
         VAR CONERR   0000 IN CONERR
         VAR POSREF   0000 IN POSREF
         VAR IREADY   0000 IN IREADY
         VAR IERR     0000 IN IERR
```

```
VAR ITERM    0000 IN ITERM
VAR INREG    0000 IN INREG
VAR CONPOS   0000 IN CONPOS
VAR INMTRY   0000 IN INMTRY
VAR MFF      0000 IN MFF
VAR M40      0000 IN M40
VAR M7F      0000 IN M7F
VAR M1       0000 IN M1
VAR CONOFF   0000 IN CONOFF
VAR IACCUR   0020 IN INFILE
VAR ACONFC   001C IN INFILE
VAR ITEMP    0006 IN DP
VAR #AIA     0008 IN DP
VAR IRVACC   000A IN DP
VAR #AIB     000C IN DP
VAR #AIC     000D IN DP
EXT FLOAT
VAR ITEST    000F IN DP
VAR RPOSOF   0011 IN DP
VAR #ARB     0014 IN DP
EXT ENCENG
EXT POSTON
VAR POSCHK   001D IN DP
VAR ERRCAL   001F IN DP
VAR ENCERR   0021 IN DP
EXT ABS
VAR #ARA     0025 IN DP
EXT PRTMSG
VAR ICORCT   002A IN DP
EXT IFIX
VAR #AID     002D IN DP
PROGRAM SIZE: 0301    DATA POOL SIZE: 0046    ERROR COUNT: 0000
```

PROGRAM LISTING FOURTEEN

```
0001: C      00716 R.E. SHARPLESS    SLOWDOWN CALIBRATION PROGRAM
0002:        SUBROUTINE POSTON
0003: C
0004: C      THIS SUBROUTINE WILL POSTION THE DRIVE
0005: C      TO THE REFERENCE SPECIFIED IN POSREF
0006: C
0007:        COMMON /POSREF/POSREF /POSMAX/POSMAX /POSMIN/POSMIN
0008:       X       /INREG/INREG /PRSPOS/PRSPOS /IREADY/IREADY
0009:       X       /ITERM/ITERM /M8000/M8000
0010:       X       /INFILE/INFILE(256)
0011:        EQUIVALENCE (INFILE(19),IPCFLG)
0012:        INTEGER   ICOUNT
0013:        DATA ICOUNT/6/
0014: C
0015: C      CHECK FOR REFERENCE GREATER THAN MAXIMUM POSITION
0016: C
0017:        IF(POSREF.GT.POSMAX) GO TO 20
      0000  0000                     DAT  X'0000'
      0001  0000                     DAT  X'0000'
      0002  2801   28 0 01           LDA  X'0001'
      0003  0AFE   08 2 FE           LDB  $+X'FFFE'
      0004  AC01   A8 4 01           STA  X'0001',B
      0005  1200   10 2 00           LDC  $+X'0000'
      0006  2E01   28 6 01           LDA  POSREF,C
      0007  2600   20 6 00           LDE  POSREF,C
      0008  EDEB   E8 5 EB           SST  *S11:,B
      0009  8003                     ADL  POSMAX
      000A  F200   F0 2 00           ZJP  $+X'0000'
      000B  BA01   B8 2 01           NJP  $+X'0001'
0018: C
0019: C      CHECK FOR REFERENCE LESS THAN MINIMUM POSITION
0020: C
      000C  7504   70 5 04           JMP  *)20 ,B
```

```
0021:          IF(POSREF.LT.POSMIN) GO TO 40
     000E    2E08   28 2 08              LDA    POSREF,C
     000F    2600   20 6 00              LDE    POSREF,C
     0010    EDEB   E8 5 EB              SST    *S11:,B
     0011    8005                        ADL    POSMIN
     0012    B200   B0 2 00              PJP    $+X'0000'
0022: C
0023: C        POSITION DRIVE - SET FLAGS
0024: C
     0013    7506   70 5 06              JMP    *)40 ,B
0025:          IREADY=0
0026:          IPCFLG=M8000
0027:          MOVFLG=0
0028:          ITRFLG=0
0029:          CALL STRTPOS(INREG,POSREF)
     0014    1200   10 2 00              LDC    $+X'0000'
     0015    3E00   38 6 00              STZ    IREADY,C
     0016    1200   10 2 00              LDC    $+X'0000'
     0017    2E00   28 6 00              LDA    M8000 ,C
     0018    1200   10 2 00              LDC    $+X'0000'
     0019    AE12   A8 6 12              STA    IPCFLG,C
     001A    3C07   38 4 07              STZ    MOVFLG,B
     001B    3C08   38 4 08              STZ    ITRFLG,B
0030: C
0031: C        CHECK FOR MOVEMENT STOPPED
0032: C
     001C    EF00   E8 7 00              SST    *STRTPOS ,B
     001D    8009                        ADL    INREG
     001E    800A                        ADL    POSREF
0033:  10     CALL ENCENG(INREG,PRSPOS)
0034:         CALL M:TD(ICOUNT)
     001F    EF00   E8 7 00              SST    *ENCENG,B
     0020    8009                        ADL    INREG
     0021    800B                        ADL    PRSPOS
0035:         CALL ENCENG(INREG,POSCHK)
     0022    EDE9   E8 5 E9              SST    *M:TD,B
     0023    0002                        ADL    ICOUNT
0036:         IF(PRSPOS.NE.POSCHK) GO TO 10
     0024    EF05   E8 7 05              SST    *ENCENG,B
     0025    8009                        ADL    INREG
     0026    000C                        ADL    POSCHK
     0027    1200   10 2 00              LDC    $+X'0000'
     0028    2E01   28 6 01              LDA    PRSPOS,C
     0029    2600   20 6 00              LDE    PRSPOS,C
     002A    EDEB   E8 5 EB              SST    *S11:,B
     002B    000C                        ADL    POSCHK
     002C    F200   F0 2 00              ZJP    $+X'0000'
     002D    72F1   70 2 F1              JMP    )10
0037:         RETURN
0038: C
0039: C        CHECK FOR ERROR
0040: C
     002E    0C01   08 4 01              LDB    X'0001' ,B
     002F    E401   E0 4 01              EST    X'0001' ,B
0041:  20     IF(MOVFLG.NE.0) GO TO 50
     0030    2C07   28 4 07      )20     LDA    MOVFLG,B
     0031    F200   F0 2 00              ZJP    $+X'0000'
0042: C
0043: C        CHECK FOR OTHER CURVE TRIED
0044: C
     0032    750E   70 5 0E              JMP    *)50 ,B
0045:         IF(ITRFLG.EQ.2) GO TO 60
     0033    2C08   28 4 08              LDA    ITRFLG,B
     000F+B   0002
     0034    4C0F   48 4 0F              SUB    *X'0002' ,B
     0035    F201   F0 2 01              ZJP    $+X'0001'
     0036    7200   70 2 00              JMP    $+X'0000'
     0037    7510   70 5 10              JMP    *)60 ,B
0046:  30     ITRFLG=ITRFLG+1
```

```
0047:           IREADY=1
0048:           RETURN
0049: C
0050: C         CHECK FOR ERROR
0051: C
     0038    6408   60 4 08              INC     ITRFLG,B
     0011+B  0001
     0039    2C11   28 4 11              LDA     =X'0001',B
     003A    1226   10 2 26              LDC     S+X'0026'
     003B    AE00   A8 6 00              STA     IREADY,C
     003C    0C01   08 4 01              LDB     X'0001',B
     003D    E401   E0 4 01              EST     X'0001',B
0052:  40     IF(MOVFLG.NE.0) GO TO 50
     003E    2C07   28 4 07    )40       LDA     MOVFLG,B
     003F    F200   F0 2 00              ZJP     S+X'0000'
0053: C
0054: C         CHECK FOR OTHER CURVE TRIED
0055: C
     0040    752E   70 5 0E              JMP     *)50 ,B
0056:           IF(ITRFLG.NE.2) GO TO 30
     0041    2C08   28 4 08              LDA     ITRFLG,B
     0042    4C0F   48 4 0F              SUB     =X'0002',B
     0043    F200   F0 2 00              ZJP     S+X'0000'
0057: C
0058: C         MOVE DRIVE TO POSMAX
0059: C
     0044    72F3   70 2 F3              JMP     )30
0060:           IPCFLG=M8000
0061:           CALL STRTPOS(INREG,POSMAX)
     0045    122F   10 2 2F              LDC     S+X'002F'
     0046    2E00   28 6 00              LDA     M8000 ,C
     0047    122F   10 2 2F              LDC     S+X'002F'
     0048    AE12   A8 6 12              STA     IPCFLG,C
0062:           GO TO 61
     0049    EF2D   E8 7 2D              SST     *STRTPOS ,B
     004A    8009                        ADL     INREG
     004B    8003                        ADL     POSMAX
0063: C
0064: C         DRIVE CANNOT BE CALIBRATED
0065: C
     004C    7512   70 5 12              JMP     *)61 ,B
0066: 50       ITERM=1
0067:          MOVFLG=0
0068:          IREADY=1
0069:          RETURN
0070: C
0071: C         MOVE DRIVE TO POSMIN
0072: C
     004D    2C11   28 4 11              LDA     =X'0001',B
     004E    1200   10 2 00              LDC     S+X'0000'
     004F    AE00   A8 6 00              STA     ITERM ,C
     0050    3C07   38 4 07              STZ     MOVFLG,B
     0051    2C11   28 4 11              LDA     =X'0001',B
     0052    1218   10 2 18              LDC     S+X'0018'
     0053    AE00   A8 6 00              STA     IREADY,C
     0054    0C01   08 4 01              LDB     X'0001',B
     0055    E401   E0 4 01              EST     X'0001',B

LPL
     0056    7200   70 2 00              JMP     S+X'0000'
     0057    0000                        DAT     X'0000'
     0058    0000                        DAT     X'0000'
     0059    0000                        DAT     X'0000'
     005A    0000                        DAT     X'0000'
     005B    0000                        DAT     X'0000'
     005C    0000                        DAT     X'0000'
     005D    0000                        DAT     X'0000'
0073)005E    IPCFLG=M8000                DAT     X'0000'

0074:          CALL STRTPOS(INREG,POSMIN)
     005F    12FA   10 2 FA              LDC     S+X'FFFA'
```

```
0060    2E00    28 6 00            LDA    M8000 ,C
0061    12F9    10 2 F9            LDC    $+X'FFF9'
    0062    AE12    A8 6 12        STA    IPCFLG,C
0075:   C
0076:   C       SET FLAGS
0077:   C
        0063    EFF8    E8 7 F8    SST    *STRTPOS ,B
        0064    8009               ADL    INREG
        0065    8005               ADL    POSMIN
0078:   61      MOVFLG=1
0079:           ITRFLG=0
0080:           IREADY=2
0081:           GO TO 10
        0066    2C11    28 4 11    LDA    =X'0001' ,B
        0067    AC07    A8 4 07    STA    MOVFLG,B
        0068    3C08    38 4 08    STZ    ITRFLG,B
        0069    2C0F    28 4 0F    LDA    =X'0002' ,B
        006A    12EE    10 2 EE    LDC    $+X'FFEE'
        006B    AE00    A8 6 00    STA    IREADY,C
        006C    72B2    70 2 B2    JMP    )10
0082:           END
        0001    0073               ADL    X'0073'
    EXT M:TD
    EXT S11:
    VAR POSREF   0000 IN POSREF
    VAR POSMAX   0000 IN POSMAX
    VAR POSMIN   0000 IN POSMIN
    VAR INREG    0000 IN INREG
    VAR PRSPOS   0000 IN PRSPOS
    VAR IREADY   0000 IN IREADY
    VAR ITERM    0000 IN ITERM
    VAR M8000    0000 IN M8000
    ARR INFILE   0000 IN INFILE
    VAR ICOUNT   0002 IN DP
    VAR IPCFLG   0012 IN INFILE
    VAR MOVFLG   0007 IN DP
    VAR ITRFLG   0008 IN DP
    EXT STRTPOS
    EXT ENCENG
    VAR POSCHK   000C IN DP
PROGRAM SIZE: 0115   DATA POOL SIZE: 0019   ERROR COUNT: 0000
```

I claim:

1. The method of calibrating the slowdown operation of a motor drive, said method including the steps of:
   providing a first operation of said motor drive to establish a desired position movement in relation to a defined operating speed for said motor drive such that a minimum period of time is required to effect said desired position movement;
   establishing the resulting position error of said motor drive in relation to a desired position accuracy band; and
   providing a second operation of said motor drive to establish a calibrated position movement in relation to a change in said desired position movement for correcting said resulting position error.

2. The method of claim 1 operative with a programmed digital control computer having a storage memory, said method including the steps of:
   establishing a first data file in said storage memory to define an initial slowdown operation of said motor drive, and
   establishing a second data file in said storage memory to define a calibrated slowdown operation in accordance with said calibrated position movement of said motor drive.

3. The method of claim 1 operative with a plurality of desired operating speeds for said motor drive, said method including the step of:
   establishing a calibrated position movement of said motor drive in relation to each of said desired operating speeds of said motor drive.

4. The method of claim 1 operative with a programmed digital control computer having a storage memory, said method including the steps of:
   providing an initial data file in an operating area of said storage memory to determine said slowdown operation of said motor drive,
   providing a calibrated data file in a calibration area of said storage memory to determine an optimum slowdown operation of said motor drive in accordance with said calibrated position movement,
   and replacing said first data file with said second data file in said operating area to control said motor drive in accordance with said optimum slowdown operation.

5. The method of claim 1 for calibrating said slowdown operation in relation to a plurality of desired operating speeds for said motor drive,
   with said steps of providing first and second operations of said motor drive being in relation to each of said desired operating speeds such that a calibrated position movement is established in relation to each of said desired operating speed.

6. The method of claim 1 being operative in relation to an initially defined slowdown profile for said motor drive in accordance with a defined operating speed for each of a plurality of desired position movements,
with said step of providing a second operation being operative to establish a calibrated position movement in relation to each defined operating speed.

7. The method of calibrating the position movement profile of a motor drive having a predetermined speed of operation in relation to each of at least two desired position movements, said method including the steps of:
establishing a first calibrated position movement of said motor drive in relation to a first predetermined speed of operation;
establishing a second calibrated position movement of said motor drive in relation to a second predetermined speed of operation with said second speed of operation being greater than said first speed of operation;
with at least one of said first and second calibrated position movements being established such that an optimum period of time is required to effect said calibrated position movement; and
with the step of establishing said second calibrated position movement having as the initial reference for establishing the second calibrated position movement the previously established first calibrated position movement.

8. The method of claim 7 operative with a programmed digital control computer having a storage memory, said method including the steps of:
establishing a first data file to define an initial position movement profile for determining the operation of said motor drive, and
establishing a second data file to define a calibrated position movement profile in accordance with said first and second calibrated position movements of said motor drive.

9. The method of claim 7 operative with a predetermined accuracy band for the stopped position of said motor drive, said method including the step of:
establishing at least one of said first and second calibrated position movements in relation to said accuracy band of said motor drive.

10. The method of claim 7 operative with a programmed digital control computer having a storage memory, said method including the steps of:
providing an initial data file in an operating area of said storage memory to determine an initial position movement profile for controlling the operation of said motor drive,
providing a calibrated data file in a calibration area of said storage memory to determine an optimum position movement profile in accordance with at least one of said first and second calibrated position movements,
and replacing said first data file with said second data file in said operating area to control the operation of said motor drive in accordance with said optimum position movement profile.

11. The method of claim 7 for calibrating said position movement profile in relation to a desired stopping position accuracy band for said motor drive,
with said step of establishing a first calibrated position movement of said motor drive being a relation to said accuracy band; and
with said step of establishing a second calibrated position movement of said motor drive being in relation to said accuracy band.

12. The method of claim 7 being operative in relation to an initially defined position movement profile for said motor drive in accordance with a defined operating speed for each of a plurality of desired position movements,
with said step of establishing a first calibrated position movement being operative to establish a calibrated position movement S1 in relation to a first predetermined operating speed V1;
and with said step of establishing a second calibrated position movement being operative to establish a calibrated position movement S2 in relation to a second predetermined operating speed S2.

13. A control system for calibrating the operation of a position regulated motor drive, in accordance with a slowdown profile curve having a plurality of predetermined speed points, said system including a programmed digital control computer having a storage memory, said control system comprising:
means for moving a predetermined initial data file from a first operating area of said storage memory for controlling the operation of said motor drive into a second calibration area of said storage memory,
means for calibrating said data file in said second calibration area and in relation to establishing an optimized position movement point for each of said speed points,
with said means for moving being operative to move the calibrated data file from said second calibration area into said first operating area of said storage memory.

14. The control system of claim 13, with said system including
means for establishing each of said optimized position movement points of said motor drive in relation to an initial desired position movement and such that a substantially optimum positioning operation of said motor drive is thereby realized in relation to each desired position movement.

15. In apparatus for calibrating a position regulated motor drive system in relation to at least one initially desired position movement and a corresponding defined operating speed for a position movement greater than said one initially desired position movement, with said apparatus including
means for providing a first operation of said motor drive system in relation to said one desired position movement and said corresponding defined operating speed,
means for determining the position error of said motor drive system in relation to the resulting actual position of said motor drive system, and
means for providing a second operation of said motor drive system in relation to the same corresponding defined operating speed and said position error for determining a calibrated position movement of said motor drive system in relation to the latter defined operating speed.

16. The control system of claim 15, with said apparatus being operative with a programmed digital control computer having a storage memory, and with said apparatus including, means for providing in a first operating portion of said storage memory a first data file in accordance with an initial slowdown profile curve including at least said one desired position movement for controlling the operation of said motor drive system, means for providing in a second calibration portion of said storage memory a calibrated second data file in accordance with at least said calibrated position movement to define an optimized slowdown profile curve for controlling the operation of said motor drive system, and means for moving said second data file from said second calibration portion into said first operating portion of said storage memory.

17. A control system for calibrating the operation of a position regulated motor drive, in accordance with an initial data file providing a slowdown profile curve having a plurality of desired position movements set forth in relation to corresponding predetermined speed points, said system including a programmed digital control computer having a storage memory, said system comprising:

means for placing said initial data file into an operating area of said storage memory for controlling the operation of said motor drive, means for moving said initial data file from said operating area of said storage memory into a calibration area of said storage memory, means for calibrating said data file in relation to establishing an optimized position movement for each of said plurality of desired position movements and corresponding to each of said speed points, with said means for moving being operative to move the calibrated data file back into said operating area of said storage memory for controlling the operation of said motor drive.

18. A control system for a position regulated motor drive system having a predetermined positioning accuracy band and a plurality of defined operating speeds, with said system including means for providing a first operation of said motor drive to establish a first position movement in relation to one of said defined operating speeds, means for comparing the resulting position of said motor drive system with said accuracy band to determine what position error is present, means for establishing a calibrated position movement for said motor drive system in accordance with said position error, and means for providing a second operation of said motor drive in relation to said calibrated position movement and in relation to said one defined operating speed.

19. The control system of claim 18, with said system being operative with a programmed digital control computer having a storage memory, and with said system including, means for providing a first data file in an operating portion of said storage memory in accordance with an initial slowdown profile curve for controlling the operation of said motor drive system, means for providing a second data file in a calibration portion of said storage memory in accordance with at least said calibrated position movement to define an optimized slowdown profile curve for controlling the operation of said motor drive system, and means for moving said second data file from said calibration portion into said operating portion of said storage memory.

20. The control system of claim 18, with said means for providing a first operation and said means for providing a second operation being operative in regard to each of said plurality of defined operating speeds.

21. The method of calibrating the operation of a position regulated actuating mechanism, said method including the steps of:

establishing a first calibrated operation of said actuating mechanism in relation to a desired first operating speed and a predetermined position accuracy band;

establishing a second calibrated operation of said actuating mechanism in relation to a desired second operating speed and said position accuracy band;

with the step of establishing said second calibrated operation having as the initial reference for establishing the second calibrated operation the first calibrated operation of said actuating mechanism.

22. The method of claim 21, for calibrating the position movement of said actuating mechanism, said method including said first calibrated operation being a first position movement S1 in relation to a first operating speed V1 and said second calibrated operation being a second position movement S2 in relation to a second operating speed V2.

23. The method of claim 21, wherein at least the step of establishing a second calibrated operation of said actuating mechanism includes the operation of a programmed digital computer to sense the operation of said actuating mechanism in relation to said first calibrated operation of said actuating mechanism.

24. The method of calibrating the slowdown profile curve of a position regulated actuating mechanism, said method including the steps of:

providing at least a first operation of said actuating mechanism to establish a first position movement in relation to a predetermined position accuracy band and in relation to a first desired speed of operation, such that said actuating mechanism is stopped within said accuracy band in a minimum period of time;

providing at least a second operation of said actuating mechanism to establish a second position movement in relation to said first position movement and in relation to a second desired speed of operation such that said actuating mechanism is stopped within said accuracy band in a minimum period of time;

with at least the step of establishing said second calibrated operation having as a position reference for establishing the second position movement the previously established first position movement of said actuating mechanism.

25. The method of claim 24, wherein at least the step of providing a second operation of said actuating mechanism includes the operation of a programmed digital computer to establish a position movement of said actuating mechanism.

* * * * *